(12) United States Patent
Morkel et al.

(10) Patent No.: US 10,235,407 B1
(45) Date of Patent: Mar. 19, 2019

(54) DISTRIBUTED STORAGE SYSTEM JOURNAL FORKING

(71) Applicant: Amazon Technologies, Inc., Seattle, WA (US)

(72) Inventors: John Michael Morkel, Seattle, WA (US); Timothy Daniel Cole, Seattle, WA (US); Andrew Wayne Ross, Seattle, WA (US); Artem Danilov, Kirkland, WA (US); Allan Henry Vermeulen, Corvallis, OR (US); Tate Andrew Certain, Seattle, WA (US); Christopher Richard Jacques De Kadt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 713 days.

(21) Appl. No.: 14/833,008

(22) Filed: Aug. 21, 2015

(51) Int. Cl.
*G06F 17/30* (2006.01)

(52) U.S. Cl.
CPC .. *G06F 17/30371* (2013.01); *G06F 17/30351* (2013.01); *G06F 17/30578* (2013.01); *G06F 17/30595* (2013.01); *G06F 17/30876* (2013.01)

(58) Field of Classification Search
CPC ....... G06F 17/30351; G06F 17/303578; G06F 17/30371; G06F 17/30595; G06F 17/30876
USPC ......................................................... 707/615
See application file for complete search history.

(56) References Cited

U.S. PATENT DOCUMENTS

| | | | |
|---|---|---|---|
| 5,335,343 A | | 8/1994 | Lampson et al. |
| 5,796,999 A | * | 8/1998 | Azagury .......... G06F 17/30371 |
| 7,127,716 B2 | | 10/2006 | Jin et al. |
| 7,668,876 B1 | | 2/2010 | Kulkarni |
| 7,730,034 B1 | | 6/2010 | Deflaux et al. |
| 7,792,693 B2 | | 9/2010 | Bultmeyer et al. |
| 7,908,311 B2 | | 3/2011 | O'Loughlin et al. |
| 7,949,662 B2 | | 5/2011 | Farber et al. |
| 8,019,849 B1 | | 9/2011 | Lopilato et al. |
| 8,055,711 B2 | | 11/2011 | Fachan et al. |
| 8,078,582 B2 | | 12/2011 | Wang et al. |
| 8,108,343 B2 | | 1/2012 | Wang et al. |
| 8,209,213 B2 | | 6/2012 | Raisanen |

(Continued)

OTHER PUBLICATIONS

Invitation to Pay Additional Fees for PCT/US2015/049470, dated Dec. 1, 2015, Amazon Technologies Inc., pp. 1-10.

(Continued)

*Primary Examiner* — James Trujillo
*Assistant Examiner* — Jessica N Le
(74) *Attorney, Agent, or Firm* — Robert C. Kowert; Meyertons, Hood, Kivlin, Kowert & Goetzel, P.C.

(57) ABSTRACT

A forking coordinator of a journal-based multi-data-store database determines that a forking criterion for a first journal has been met. The coordinator stores an indication that processing of transaction requests directed to a particular subset of the database is suspended. The coordinator instantiates a second journal for storing committed transaction entries for the particular subset. Metadata of the second journal indicates that transaction entries with sequence numbers in a particular range are stored in the first journal. The coordinator stores an indication that transaction processing associated with the particular subset of the system is to be resumed using the second journal.

22 Claims, 29 Drawing Sheets

(56) References Cited

U.S. PATENT DOCUMENTS

| | | | |
|---|---|---|---|
| 8,510,270 | B2 | 8/2013 | Pareek et al. |
| 8,548,945 | B2 | 10/2013 | Dwyer et al. |
| 8,650,155 | B2 | 2/2014 | Corbin et al. |
| 8,676,752 | B2 | 3/2014 | Kundu et al. |
| 9,838,240 | B1* | 12/2017 | Cormie .............. H04L 29/08135 |
| 2007/0162516 | A1 | 7/2007 | Thiel et al. |
| 2009/0077164 | A1 | 3/2009 | Phillips |
| 2010/0057826 | A1 | 3/2010 | Chow et al. |
| 2010/0332448 | A1 | 12/2010 | Holenstein et al. |
| 2011/0161391 | A1 | 6/2011 | Araujo et al. |
| 2011/0276977 | A1 | 11/2011 | van Velzen et al. |
| 2011/0295804 | A1* | 12/2011 | Erofeev .............. H04L 29/0854 707/634 |
| 2012/0079490 | A1 | 3/2012 | Bond et al. |
| 2012/0166407 | A1 | 6/2012 | Lee et al. |
| 2014/0304380 | A1 | 10/2014 | Waas et al. |
| 2014/0324785 | A1* | 10/2014 | Gupta .............. G06F 17/30368 707/689 |
| 2017/0046377 | A1* | 2/2017 | Barber .............. G06F 17/30377 |

OTHER PUBLICATIONS

Ozgur Ulusoy, "Processing Real-Time Transactions in a Replicated Datebase System", Distributed and Parallel Jatebases, vol. 2, No. 4, Sep. 10, 1993, pp. 405-436.
Philip A. Bernstein, et al., "Concurrency Control and Recovery in Database Systems", Retrieved from the Internet URL: https://courses.cs.washington.edu/courses/cse490h/11wi/CSE490H_files/CSE550BHG-Ch7.pdf, Jan. 1987, pp. 1-58.
U.S. Appl. No. 14/316,680, filed Jun. 26, 2014, Allan Henry Vermeulen.
U.S. Appl. No. 14/316,674, filed Jun. 26, 2014, Allan Henry Vermeulen et al.
U.S. Appl. No. 14/316,630, filed Jun. 26, 2014, Allan Henry Vermeulen.
U.S. Appl. No. 14/491,454, filed Jun. 26, 2014, Allan Henry Vermeulen et al.
U.S. Appl. No. 14/316,622, filed Jun. 26, 2015, Allan Henry Vermeulen et al.
U.S. Appl. No. 14/316,619, filed Jun. 26, 2015, Allan Henry Vermeulen.
U.S. Appl. No. 14/482,661, filed Sep. 10, 2014, Allan Henry Vermeulen.
U.S. Appl. No. 14/482,677, filed Sep. 10, 2014, Allan Henry Vermeulen et al.
U.S. Appl. No. 14/482,668, filed Sep. 10, 2014, Allan Henry Vermeulen et al.
U.S. Appl. No. 14/491,444, filed Sep. 19, 2014, Allan Henry Vermeulen et al.
U.S. Appl. No. 14/491,371, filed Sep. 19, 2014, Allan Henry Vermeulen et al.
U.S. Appl. No. 14/537,788, filed Nov. 10, 2014, Lei Ye et al.
U.S. Appl. No. 14/579,742, filed Dec. 12, 2014, Christopher Richard Jacques De Kadt et al.
U.S. Appl. No. 14/657,043, filed Mar. 13, 2015, Upendra Bhalchandra Shevade et al.
U.S. Appl. No. 14/753,475, filed Jun. 29, 2015, Allan Henry Vermeulen et al.
U.S. Appl. No. 14/753,484, filed Jun. 29, 2015, John Michael Morkel et al.
U.S. Appl. No. 14/753,495, filed Jun. 29, 2015, Timothy Daniel Cole et al.
U.S. Appl. No. 14/753,505, filed Jun. 29, 2015, Allan Henry Vermeulen et al.
U.S. Appl. No. 14/868,275, filed Sep. 28, 2015, Timothy Daniel Cole et al.
U.S. Appl. No. 14/833,001, filed Aug. 21, 2015, Timothy Daniel Cole et al.
U.S. Appl. No. 14/833,000, filed Aug. 21, 2015, Timothy Daniel Cole et al.
U.S. Appl. No. 14/833,005, filed Aug. 21, 2015, John Michael Morkel et al.
U.S. Appl. No. 14/833,003, filed Aug. 21, 2015, Timothy Daniel Cole et al.
U.S. Appl. No. 14/833,009, filed Aug. 21, 2015, Andrew Wayne Ross et al.
U.S. Appl. No. 14/868,271, filed Sep. 28, 2015, Timothy Daniel Cole et al.
Sergio Almeida, et al., "ChainReaction: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.
"Blackboard System", Wikipedia, Accessed Dec. 3, 2014, pp. 1-5.
Wikipedia, "Apache Wave", Downloaded May 8, 2015, pp. 1-9.
"Git-Rewriting History", http://gitscm.com/book/en/v2/GitToolsRewritingHistory, Downloaded May 8, 2015, pp. 1-10.
David Roundy, "Darcs User Manual", http://darcs.net/maunual/bigpage.html, Downloaded May 7, 2015, pp. 1-87.
Wikipedia, "Operational Transformation", Downloaded May 8, 2015, pp. 1-9.
"Samza", http://samza.apached.org/, Downloaded Jun. 3, 2015, p. 1.
Wikipedia, "SipHash", Downloaded May 31, 2015, pp. 1-3.
U.S. Appl. No. 14/868,267, filed Sep. 28, 2015, Timothy Daniel Cole et al.
International Search Report and Written Opinion, dated Dec. 7, 2015, Amazon Technologies, Inc., pp. 1-11.

\* cited by examiner

Untransformed-attribute-value-based partitioning 601

| Attribute A1 value set 602A | Attribute A2 value set 602B | Attribute A3 value set 602C | Partition 603 |
|---|---|---|---|
| Asia | Japan | 0 - 10000 | P1 |
| Asia | Japan | >10000 | P2 |
| Asia | China | 0 - 10000 | P3 |
| Asia | China | >10000 | P4 |

Transformation-based partitioning 660

DISTRIBUTED STORAGE SYSTEM JOURNAL FORKING

BACKGROUND

In recent years, more and more computing applications are being implemented in distributed environments. A given distributed application may, for example, utilize numerous physical and/or virtualized servers spread among several data centers of a provider network, and may serve customers in many different geographical locations. In many cases, particularly in cloud-based computing environments, a given application may involve performing reads and writes at several different data stores, such as various instances of relational databases, non-relational databases, and the like. Some commonly used data store architectures may support the traditional ACID (atomicity, consistency, isolation and durability) properties associated with the relational data model for operations within a given data store, but may not support such properties for groups of operations involving multiple data stores. Other data store architectures may not natively support the ACID property even within groups of operations directed to a single data store instance.

Developers of applications that would benefit from support for transactions that cross data store boundaries are sometimes forced to implement their own transaction management mechanisms. Such ad-hoc mechanisms are often hard to maintain, especially as the set of object types at the different data stores evolve based on changing application requirements, and as more features are added to the distributed applications themselves. In some cases, not all the data stores may provide support for the same sets of primitive types, or the same kinds of data manipulation operations, which may further complicate the task of managing complex transactions. Furthermore, given the network delays and various types of failures that may be encountered in typical distributed environments over time, some transaction management techniques may not be robust enough or scalable enough to support the service levels required for mission-critical operations.

Figure 1:
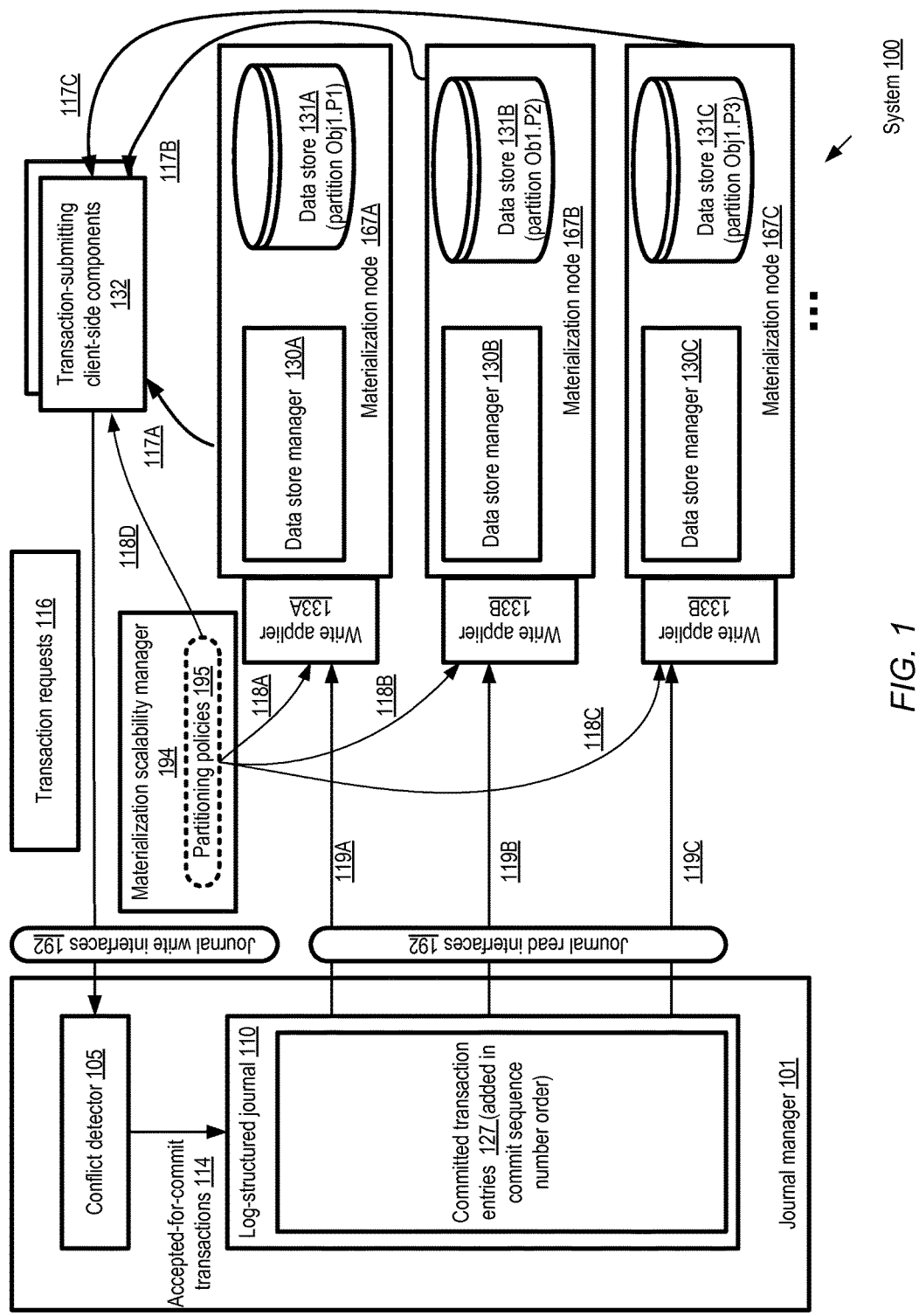
FIG. 1 illustrates an example system environment in which a journal-based multi-data-store database may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for enhancing the scalability of data materialization operations as well as commit analysis operations at a journal-based multi-data-store database are described. In at least some embodiments, a plurality of data stores, some of which may implement different data models and data manipulation languages than others, and some of which may materialize different subsets of the database content than others, may be registered as respective materialization nodes or members of the database. Client-side components of the database may prepare transaction requests representing proposed state changes to the database locally, and submit the transaction requests to a journal manager for commit analysis in accordance with an optimistic concurrency control policy. The journal manager may perform read-write conflict detection, for example, to determine whether objects read during the preparation of a transaction request may have been modified by subsequently-committed transactions (whose write sets are indicated in respective committed transaction entries appended to the journal). If no conflict is detected, the transaction request may be accepted for commit, and a new committed transaction entry corresponding to the transaction request may be appended to the journal. Each materialization node may have an associated write applier responsible for examining the entries of the journal sequentially and propagating the relevant writes (i.e., those writes which are to be recorded at that materialization node) to the materialization node.

In some environments, a multi-data-store database may be used for very high throughput applications, in which the amount of data that has to be materialized grows very rapidly. For example, in one embodiment in which at least a subset of the materialization nodes implement data models that include tables (similar to the data models of relational databases and some non-relational databases), millions or billions of distinct rows of a given table may have to be materialized over time. A single materialization node may not be able to handle such large amounts of data gracefully. Furthermore, the business logic of the application may be such that not all the data of a given object may need to be co-resident—e.g., to achieve the application's goals, different groups of the rows may be analyzed independently of each other and/or different groups of columns of the rows may be analyzed independently of each other. In various embodiments, as the transaction rate and/or the cumulative size of the materialized data set of the database increases, a partitioning policy may be implemented to spread the materialization-related workload associated with a single large data object (such as a table) or a group of data objects among multiple nodes. Any of several different algorithms may be used with respect to partitioning as described below in various embodiments—e.g., horizontal or row-based partitioning (in which values of particular attributes are used to identify partitions) may be employed in some embodiments, vertical or column-based partitioning (in which different partitions may include values of respective groups of attributes) may be employed in other embodiments, while in some embodiments both horizontal and vertical partitioning may be employed. In much of the remainder of this document, tables with rows and columns will be used as examples of the kinds of data objects for which various types of partitioning policies may be implemented. It is noted, however, that similar approaches to partitioning for the scaling of materialization operations may be implemented with regard to data objects that do not necessarily conform to a row-based or column-based data model.

The content and/or format of committed transaction entries appended to the journal itself may not have to be changed to implement partitioning in at least some embodiments. Transaction-submitting entities (such as various client-side components of the multi-data-store database) may have to take the partitioning policies into account when preparing a transaction request (e.g., to determine the appropriate materialization node from which data of the transaction's read set is to be obtained). Each write applier may examine all the journal entries sequentially in some embodiments, and may use the partitioning policy to select a subset of written data (indicated in the committed transaction entries of the journal) to be propagated to a given partition of a data object stored at a materialization node.

In some embodiments, a client of the database may establish materialization nodes for the various partitions of a given data object. In at least some embodiments, the control plane or administrative components of the multi-data-store database may include a materialization scalability manager responsible for verifying that the appropriate set of materialization nodes has been established for a given partitioning policy to be implemented and/or for a set of materialization-related performance goals to be met. The scalability manager may itself comprise one or more computing devices in various embodiments. In one implementation, a scalability manager may be responsible for determining a partitioning policy (e.g., based on system-identified triggering conditions related to database size or measured performance, and/or based on client requests) and for configuring the resources (e.g., various components of the materialization nodes, associated write appliers and the like) required for the policy. In various embodiments, the scalability manager may implement one or more sets of programmatic interfaces (e.g., application programming interfaces (APIs), web-based consoles, command-line tools, graphical user interfaces or the like) which can be used by clients to indicate various preferences and/or requirements associated with distributing materialization-related workload among several nodes or partitions.

A relatively small number of horizontal partitions of a given table may be defined in some embodiments, e.g., based on a few discrete values of one or more attributes or columns of the table. For example, if one attribute of the table (such as a part of a multi-attribute primary key of the table) can be assigned any of five distinct values (A, B, C, D or E), one partition may be defined for each of the five distinct values. In other embodiments, a different approach may be used, in which a consistent transformation function such as a selected hash function is applied to the values of one or more attributes of a given row, and the output of the transformation function indicates the partition to which that row belongs. In some embodiments, clients may programmatically indicate the details of the partition mapping algorithm for one or more data objects, while in other embodiments the scalability manager may determine the partition mapping algorithm(s). With respect to vertical partitioning, in some embodiments clients may indicate the particular combination of attributes whose values are to be materialized at each of several materialization nodes; in other embodiments, the scalability manager may select the combinations.

A given set of one or more data objects may be partitioned multiple times in some embodiments—e.g., after an initial split into two partitions P1 and P2, one or both of the partitions may be split again (e.g., into P1.1, P1.2, P2.1 and P2.2) based on client requests and/or triggering conditions. The new set of materialization nodes to which partitions are to be mapped (if new nodes are required) may be established in each iteration, and the details of the partitioning policy may be made available to transaction submitters and write appliers. In at least some embodiments as described below, a journal schema specifying various rules regarding the database content (e.g., allowed values of various data object attributes) and/or a data-store-independent language to be used for transaction requests may be defined for the database. In at least one embodiment, the partitioning policies in effect for various data objects may be indicated in the journal schema, and may be obtained from the journal schema by transaction submitters and/or write appliers.

In some embodiments, a snapshot manager of the multi-data-store database may generate compact snapshots of the journal. In a snapshot, multiple writes directed to a given data object (e.g., a row) over time may be represented via a net state change request formatted in the same language that is used for committed transaction entries of the journal, thereby enabling new materialization nodes to synchronize with the system more quickly than if all the journal entries had to be applied sequentially. Snapshots of a table may be created at the partition level and/or at the table level in various embodiments. Partition-level snapshots may be merged in some embodiments in response to client requests, or new partitions may be added to a partition snapshot. Given the flexibility of horizontal and vertical partitioning, and the ease with which new materialization nodes can be brought online using snapshots, a powerful set of materialization scaling capabilities may be implemented in various embodiments.

While partitioning may be used to scale the materialization of the data objects represented in a journal-based storage system, a different approach may be used to address the evolution and scaling of the journal itself. In at least some embodiments, new journals (with associated journal managers and journal schemas) may be forked or branched off an existing journal if certain triggering criteria are met. A forking coordinator (e.g., implemented using one or more computing devices as part of the control plane of the multi-data-store storage system) may establish a new (initially empty) journal with its own journal manager, to be used for transactions associated with a particular subset of the database. For example, a new journal could be forked for a particular horizontal partition of the journal (either a previous-defined horizontal partition, or a new horizontal partition created in conjunction with the fork operation). In at least some implementations in which each journal entry includes a respective commit sequence number indicating the order in which the corresponding commit decision was made, the newly-forked journal may include a pointer to a forking transition sequence number. Committed transaction journal entries directed to the partition for which the new journal has been forked may be found in one of two locations: entries with sequence numbers higher than the forking transition sequence number may be found in the newly-forked journal, while entries with sequence numbers less than or equal to the forking transition sequence number may be found in the original or parent journal. The forking transition sequence number may be used by various components of the multi-data-store database to perform operations which require examining entries in both journals—e.g., for conflict detection operations by the journal manager of the forked journal, or for snapshot creation by a snapshot manager. In some embodiments, different approaches to subdividing the contents of the database may be used for journal forking than are used for materialization scaling—e.g., there may not be a 1:1 mapping between the definitions of the forked subsets of the data and the definitions of materialization partitions. In general, partitioning for materialization purposed may be used independently of journal forking in various embodiments.

In at least some embodiments, the forking coordinator may maintain metadata which indicates the particular journal (either the parent/original journal, or the forked journal) at which processing of transactions directed to each subset or "fork" of the database is performed. In a phased forking algorithm which may be employed in at least some embodiments, the processing of incoming transactions directed to a given partition or subset of the data may be suspended or paused for a short time interval during which the new or forked journal is established and configured. Clients and/or write appliers associated with the target partition of the fork may pause their transaction submissions and write propagation temporarily in such embodiments, and resume their operations when the metadata is updated to indicate that the forked journal is online. Meanwhile, normal operations may continue with respect to partitions for which new journals are not being created—e.g., if the database is divided into ten partitions, transaction submissions and write propagations may continue uninterrupted for nine of the ten partitions during the phased forking of a new journal for one of the partitions. Using the combination of journal forking and partitioned materialization, in various embodiments the journal-based multi-data-store database may be scaled to handle very high transaction rates and very large data sets.

A wide variety of data store types may be registered as materialization nodes of such a journal-based system in different embodiments, including for example one or more instances of relational databases, non-relational or NoSQL databases, in-memory databases, object-oriented databases, storage services which provide web-service interfaces to data objects, storage services which provide block-level programmatic interfaces, and the like. Each data store instance or materialization node may have a corresponding data store manager, implemented for example using some collection of hardware and/or software components, configured to support a respective set of programmatic interfaces in accordance with the syntax and semantics of the associated data store type. Of course, in environments in which partitioning of the kind described above is used, several materialization nodes corresponding to respective partitions of the same data object such as a table may implement a shared or common set of programmatic interfaces. The data stores (including partition-specific data stores) registered at a given time for transaction management via a given logical instance of a journal of a multi-data-store database may be referred to as "member" data stores of that database as of that time. Generally speaking, multiple logical journal instances may be used simultaneously, each associated with a corresponding multi-data-store database with its own member data stores. The terms "multi-data-store database" and "multi-data-store storage system" may be used synonymously herein. Of course, a given storage system or database may, at least at some points in time, comprise just a single member data store—that is, while multiple members may be permitted, the storage system may not be required to have multiple members.

Example System Environment

FIG. 1 illustrates an example system environment in which a journal-based multi-data-store database may be implemented, according to at least some embodiments. System 100 shows a journal manager 101 of a log-structured journal 110 that may be used to store records of state changes of a multi-data-store database. The journal manager may be implemented using one or more computing devices in various embodiments. The journal may be described as being log-structured in the depicted embodiment in that it may comprise an append-only sequence of entries, with in-place modification of entries not permitted. The journal may comprise committed transaction entries 127 stored in the order in which the corresponding transactions or state changes were approved, e.g., in increasing order of commit sequence numbers. The database may include one or more materialization nodes 167, such as 167A-167C, at each of which at least a subset of the database contents are materialized. Each materialization node may include a respective data store 131 (e.g., data stores 131A-131C) and a corresponding data store manager (DSM) 130 (e.g., DSMs 130A-130C) implemented at one or more computing devices. In the depicted embodiment, at least one object Obj1 of the database (such as a table) may be divided into partitions Obj1.P1, Obj1.P2 and Obj1.P3 stored at data stores 131A, 131B and 131C respectively. The database may comprise numerous data objects, some of which (such as Obj1) may be partitioned in accordance with partitioning policies 195 determined at and/or stored by a materialization scalability manager 194. The materialization scalability manager may comprise one or more computing devices of a control plane (administrative) portion of the database in various embodiments. The scalability policy for a given object such as a table may, for example, indicate the technique to be used to map various subsets of the object's data (e.g., various rows or columns of the table) to different partitions such as Obj1.P1, Obj1.P2 or Obj1.P3. In at least some embodiments, the relationship between the partitions of a given object and the materialization nodes at which the partitions are stored, may not necessarily be 1:1—e.g., based on the partitioning policy, an object may be divided into M partitions, which may then be mapped to N materialization nodes. Furthermore, in at least some embodiments, multiple materialization nodes may store replicas of a given partition of a data object. The partitioning policies 195 may be accessed by transaction-submitting client-side components 132 as well as by respective write appliers 133A-133B of the materialization nodes, as indicated by arrows 118A-118D. The partitioning policies may be used by the transaction submitting components, for example, to determine, during transaction request preparation, the particular materialization node to which a read operation directed to a particular subset of a data object such as Obj1 is to be directed. Write appliers 133 may utilize the partitioning policies 195 to select committed reads that are to be propagated to a given materialization node.

In the depicted embodiment, the journal manager 101 may implement a set of programmatic interfaces 192 for write requests 116 (e.g., transaction requests 116 which may at least in some cases result in new committed transaction entries being written to the journal 110), and another set of programmatic interfaces 191 for journal reads 118 (e.g., reads 119A-119C from the write appliers 133A-133C associated with the materialization nodes 167A-167C). Programmatic interfaces 191 and 192 may, for example, comprise respective collections of APIs (application programming interfaces) in various embodiments, although access to the journal may also be provided using web-based consoles, command-line tools, and the like in some embodiments. As described below in further detail, in various embodiments the materialization scalability manager 194 may also implement a set of programmatic interfaces for clients to provide guidance or preferences regarding partitioning.

In general, in at least some embodiments, a given transaction request 116 may include a read set descriptor indicating one or more reads 117 of materialized data, and a write set descriptor indicating proposed writes which may eventually be propagated to one or more materialization nodes, where the set of data stores that are read in the transaction may or may not overlap with the set of data stores affected by the writes. The reads may be performed using the native programmatic read interfaces of the data stores in some embodiments. The transaction requests 116 may be formatted in accordance with a data-store-independent transaction language indicated or referenced in a journal schema of the database in various embodiments. The client-side components 132 may obtain the latest version of the journal schema directly from the journal manager (e.g., via read interfaces 191) and/or via reads from the materialization nodes 167 from which materialized versions of the journal schema may be obtained in a manner similar to the way materialized versions of various data objects are obtained. In at least one embodiment, a journal manager 101 may maintain a materialized version of the journal schema which can be obtained by various client-side components 132. In some embodiments, a client-side component 132 may itself include a module capable of materializing a journal schema after examining a set of journal entries indicating respective journal schema changes. In at least some embodiments, the journal manager may not necessarily check whether a submitted transaction request is compliant with the current version of journal schema—instead, the client-side components 132 may be responsible for ensuring that their requests are formatted in accordance with the journal schema. In other embodiments, the journal manager may verify that a transaction request complies with the current version of the journal schema, and may reject requests that do not comply.

At least some of the writes indicated in a given transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In contrast, an optimistic concurrency control algorithm may be used by the journal manager 101 of FIG. 1, in which no locks may have to be obtained. Instead, in the depicted embodiment, the conflict detector 105 may determine, based at least in part on the contents of the transaction request and on a set of committed transaction entries of the journal 110, whether one or more of the data items read in the requested transaction may have been updated since they were read from their respective data stores. A sequence number based technique may be used to determine whether such read-write conflicts exist in at least some embodiments, as described below in further detail. If the conflict detector 105 determines that none of results of the proposed transaction's reads have been affected by subsequently committed writes, the requested transaction may be accepted for commit, and records representing such accepted-for-commit transactions 114 may be added to the journal 110. The terms "approve" and "accept" may be used as synonyms herein with respect to requested transactions that are not rejected.

If some of the transaction's read data was updated since the corresponding reads occurred (or if a probability that the data was updated is estimated by the conflict detector to be greater than a threshold), a requested transaction may instead be rejected or aborted in the depicted embodiment. This type of approach to concurrency control may be deemed optimistic in that decisions as to whether to proceed with a set of writes of a transaction may be made initially under the optimistic assumption that read-write conflicts are unlikely. As a result, in scenarios in which read-write conflicts are in fact infrequent, higher throughputs and lower response times may be achieved than may be possible if more traditional locking-based techniques are used. In the case where a transaction is accepted for commit, in some embodiments contents of a corresponding journal entry 127 may be replicated at some number of nodes of a replication graph (as described below in further detail with respect to FIG. 12) in the depicted embodiment before the commit is considered successful. In some embodiments, the requesting client-side component 132 may be notified when the requested transaction is committed. In at least one embodiment, the client-side component 132 may be informed when a transaction is rejected, so that, for example, a new transaction request may be generated and submitted for the desired updates.

For each transaction that is committed, in at least some embodiments a commit sequence number (or some other identifier indicative of the commit) may be generated and stored as part of the corresponding journal entry. Such a commit sequence number may, for example, be implemented as a counter or as a logical timestamp. The commit sequence number may be determined, for example, by the conflict detector 105 in some embodiments, or at a different component associated with the journal (such as the committer node of a replication graph being used) in other embodiments.

In the depicted embodiment, after a given data-modifying or schema-modifying transaction is committed and its entry is stored at the journal, at least some of the writes of the transaction may be applied or propagated to one or more of the materialization nodes 167, e.g., by write appliers 133 or cursors using read interfaces 191. As in the case of the partitioned object Obj1, different subsets or partitions of the committed writes may be of interest to, or relevant to, different materialization nodes in some embodiments. In various embodiments, the respective data store managers 130 at the materialization nodes may verify that a given write is compliant with the journal schema before the write is applied. In some implementations, the writes may be applied in an asynchronous fashion to the materialization nodes. Thus, in such implementations, there may be some delay between the time at which the transaction is committed and the time at which the payload of a particular write operation of the committed transaction reaches the corresponding data store. In some embodiments, respective asynchronous write appliers may be used to propagate some or all of the writes to relevant data stores. In some embodiments, the write appliers 133 may be components of (or closely affiliated with) the materialization nodes 167 and may represent respective cursors on the journal, while in other embodiments the write appliers may be components of the journal manager 101. After the data written during a transaction is applied to the corresponding data stores, client-side components may be able to read the updated data using the respective read interfaces of the data stores. In some embodiments, at least one of the write appliers may be capable of performing synchronous writes (e.g., either when explicitly directed to do so by the journal manager or a data store manager, or for all the writes for which the applier is responsible).

In at least some embodiments, as described below in further detail, in addition to a read set descriptor and a write set descriptor, a given transaction request 116 which modifies a data object may include the write payload (i.e., the set of data bytes that are to be stored for each write), a conflict check delimiter (an indication of a subset of the committed transaction entries that should be examined to accept/reject the transaction), and/or other elements such as a transaction type indicator. Some or all of these constituent elements of a transaction request may be stored within the corresponding journal entry together with the commit sequence number for the transaction. In at least one embodiment, the journal manager 101 may provide an indication of the latest committed state of the database (such as the highest commit sequence number generated thus far), e.g., in response to a query from a data store manager or a query from a client-side component. The write appliers may indicate the commit sequence numbers corresponding to the writes that they apply in various embodiments. Thus, at any given point in time, a client-side component may be able (e.g., by querying the data store managers) to determine the commit sequence number corresponding to the most-recently-applied write at a given materialization node 167. In at least some embodiments, during the generation of a transaction request 116, the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client-side component 132 initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 116. The conflict detector 105 may identify journal entries with sequence numbers greater than SN1 as the set of entries to be examined for read-write conflicts for the requested transaction. If any of the write sets of the identified commit records overlaps with the read set of the requested transaction, the transaction may be rejected/aborted; otherwise, the transaction may be approved for commit in this example scenario. Details regarding the manner in which conflict detection operations may be implemented in various embodiments are provided below.

The optimistic concurrency control algorithm illustrated in FIG. 1 may allow more complex types of atomic operations to be supported than may have been possible using the underlying data stores' concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the journal-based approach described above, a single transaction that encompasses writes to multiple locations of the non-relational data store (and/or other data stores as well) may be supported with relative ease.

As mentioned above, a journal schema may specify or govern various aspects of transaction management in system 100—e.g., the syntax of a data-store-independent transaction language in which state change requests (such as transaction requests 116) are to be submitted to the journal manager by client-side components 132, the data types and attributes which can be referenced in such requests, and/or various details regarding partitioning policies 195. Each data store manager may ensure that any changes made to the journal schema are compatible with a local data-store-specific concrete schema in various embodiments. In at least some embodiments, the current journal schema may be stored in materialized form at some or all data stores. Various additional details regarding the journal schema and its relationship with the concrete schemas are provided below.

The data stores 131 may be referred to as member data stores of the database or storage system. In at least some embodiments, some member data stores may differ from others in various characteristics such as their supported data models and/or data manipulation languages, level of data consistency supported, transaction support, data persistence/durability level, and the like. For example, one data store (or a first set of data stores for respective partitions of a data object) may comprise respective instances of a NoSQL or non-relational database that does not implement a standard version of the structured query language (SQL)), another data store (or set of data stores) may comprise instances of a relational database, and so on. If a given data object is divided into P partitions in accordance with a partitioning policy 195, and each partition is mapped to a single materialization node 167, in some embodiments each of the data stores at the P materialization nodes may implement the same data model. In at least some embodiments, the same subset (such as Obj1.P1) of a given data object (such as Obj1) may be materialized at two or more materialization nodes implementing respective data models or respective database instances—e.g., partition P1 may be materialized at one instance of a relational database and at one instance of a non-relational database. Each of the data stores may be registered for transaction management by the journal manager 101 in the depicted embodiment. The terms "concurrency control" and "transaction management", may be used as synonyms herein with respect to the state change management functionality provided by the journal manager. In effect, the journal manager may be responsible for implementing a replicated state machine corresponding to a collection of data objects indicated in a journal schema, with the committed transaction entries expressing state changes in a data-store-independent language in the depicted embodiment. In some embodiments, several different types of entries may be stored in the journal, including entries representing data modifications, journal schema modifications, redactions of other entries, and the like as discussed below in further detail.

The term "data store", as used herein, may refer to an instance of any of a wide variety of persistent or ephemeral data repositories and/or data consumers. For example, some data stores may comprise persistent non-relational databases that may not necessarily provide native support for multi-item transactions, while other data stores may comprise persistent relational databases that may natively support multi-item transactions. In some embodiments, a network-accessible storage service of a provider network that enables its users to store unstructured data objects of arbitrary size, accessible via a web-services interface, may be registered as one of the data stores. Other types of data stores may comprise in-memory databases, instances of a distributed cache, network-accessible block storage services, file system services, and the like. The partitioning algorithms described herein may be applied to the data being managed using the journal 101 in various embodiments, e.g., to help increase the rate at which data can be materialized and/or to control the total amount of data that has to managed at any given materialization node, regardless of the particular type of data repositories at which the data is materialized.

Partitioning Examples

Figure 2:
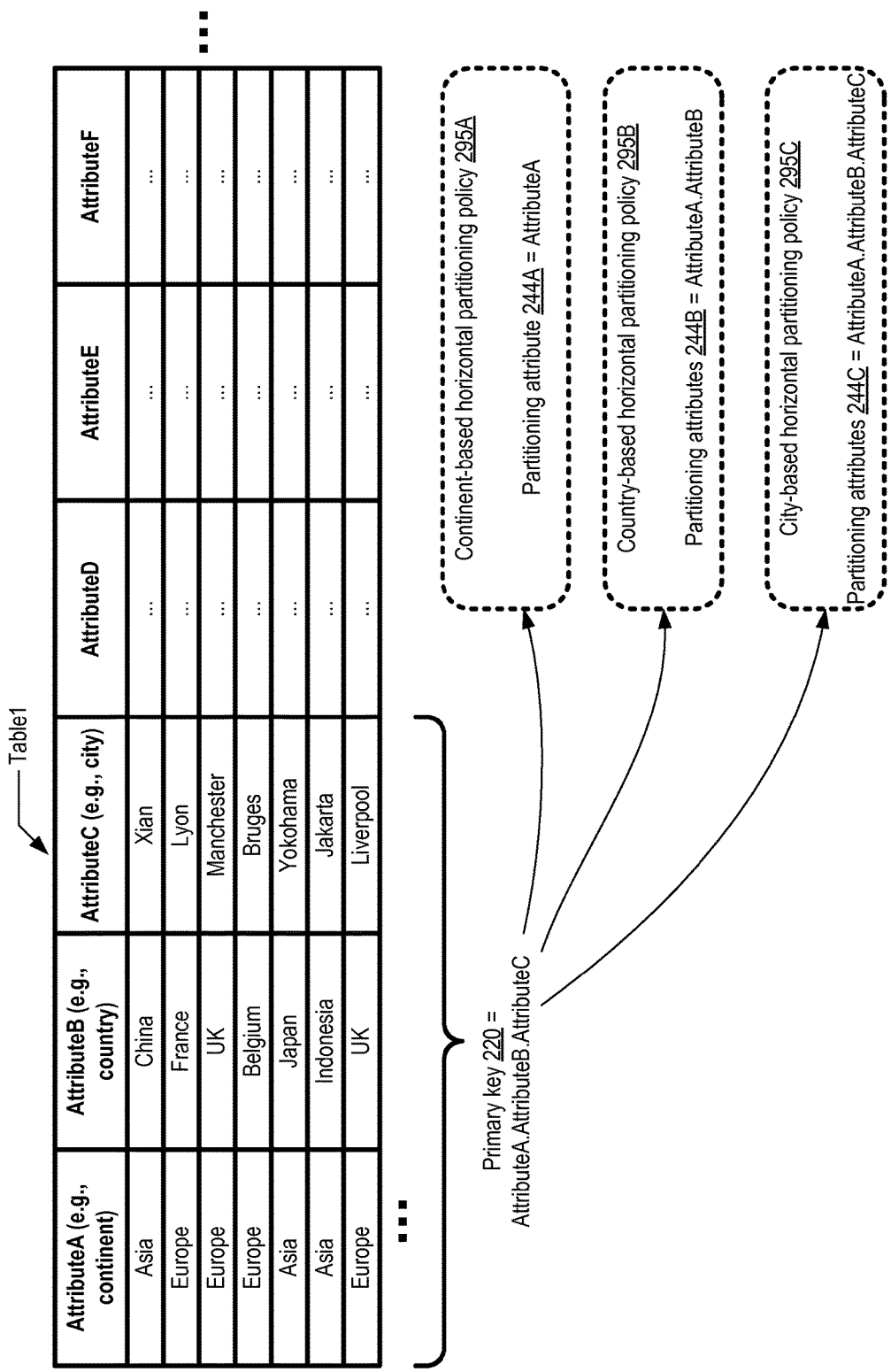
FIG. 2 illustrates examples of partitioning a table of a multi-data-store database horizontally based on values of primary key attributes, according to at least some embodiments.

A number of different algorithms may be used in various embodiments to make the materialization of journal-based data more scalable, including horizontal, vertical and hybrid partitioning. FIG. 2 illustrates examples of partitioning a table of a multi-data-store database horizontally based on values of primary key attributes, according to at least some embodiments. In the depicted embodiment, each row of table Table 1 includes a plurality of attributes or columns, including AttributeA-AttributeF. AttributeA indicates a continent (e.g., Asia, Europe, etc.), AttributeB indicates a country within the continent (e.g., China, Japan, France, etc.), and AttributeC indicates a city within the country (e.g., Xian, Lyon etc.). The primary key 220 of Table comprises the concatenation or combination of AttributeA, AttributeB, and AttributeC: that is, each row of Table 1 is uniquely identifiable by specifying the values of a continent, country and city.

In one simple approach which may be taken with respect to horizontal partitioning, values of some or all of the primary key attributes may be used to define respective partitions. For example, in a continent-based horizontal partitioning policy 295A, all the rows or records pertaining to a given continent (as indicated by their respective AttributeA values) may be designated as parts of the same partition. This may result in a relatively small number of partitions (e.g., if the six continents other than Antarctica are represented in the table, six partitions of Table 1 may be created). In a country-based partitioning policy 295B, AttributeA and AttributeB taken together may demarcate a partition, while in city-based partitioning policy 295C, all three attributes which make up the primary key may be used to define partitions.

For some applications, subdividing the data based on discrete values of attributes such as AttributeA, AttributeB or Attribute C may be useful not just to help balance materialization-related workload and storage requirements, but also because the different partitions may also mesh well with the application's underlying data analysis objectives. For example, it may make sense for the rows of Table 1 to be analyzed on a per-country basis (e.g., using partitioning policy 295B) to obtain a summary of the data for each country represented in Table 1. In at least some embodiments, the clients of the journal-based database may be able to provide programmatic guidance to the materialization scalability manager indicating how the data should be partitioned in view of application requirements, e.g., by specifying the attribute values which should be mapped to various partitions. It is noted that although only the attributes which collectively make up the primary key 220 of Table 1 are used to define partitions in the scenario shown in FIG. 2, non-primary-key attributes may also or instead be used to specify partitions in at least some embodiments.

Figure 3:
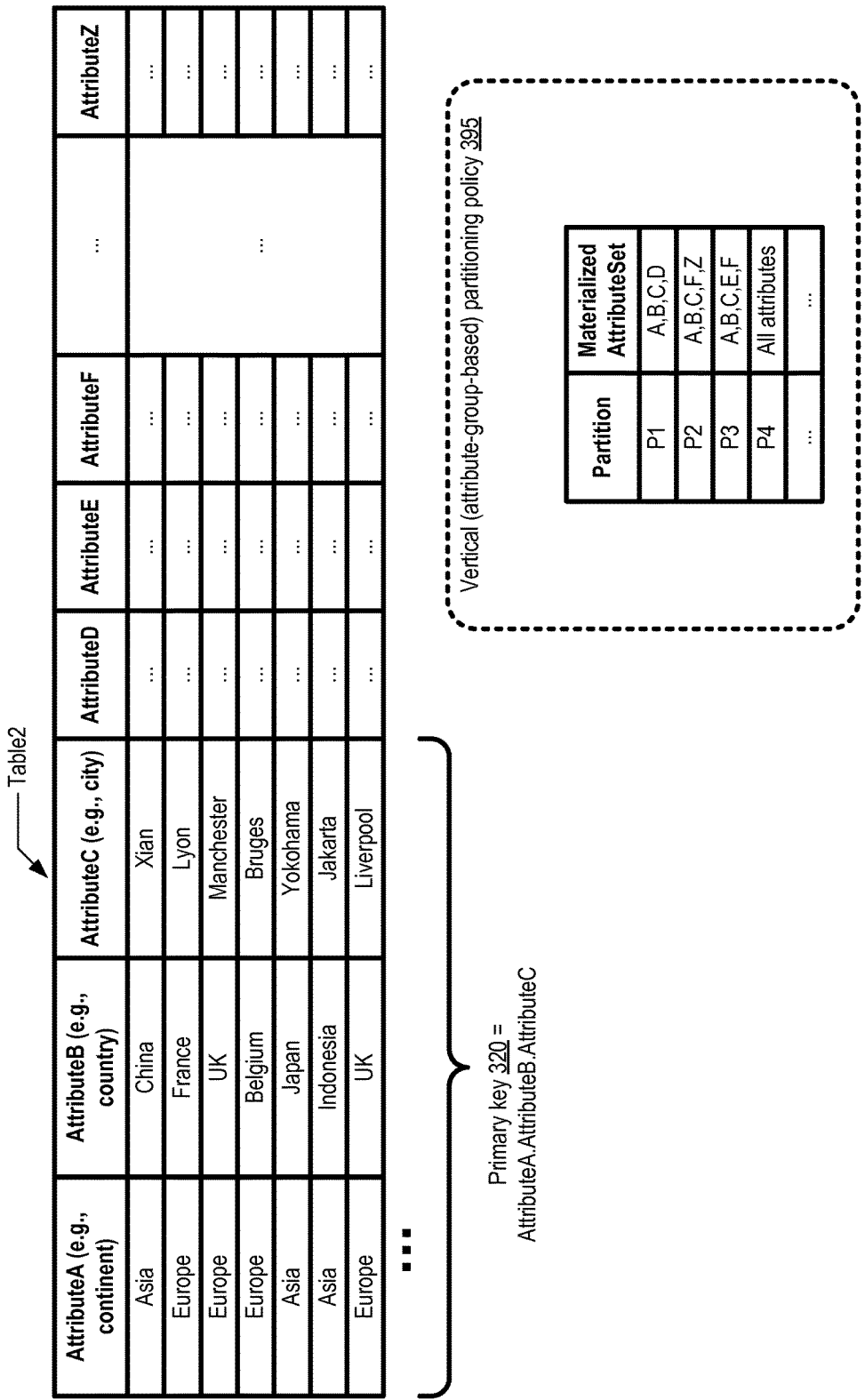
FIG. 3 illustrates an example of vertical partitioning of a table of a multi-data-store database, according to at least some embodiments.

The partitioning policies 295 may be described as "horizontal" because all the attributes of a given row of Table 1 (e.g., AttributeA-AttributeF) may be mapped to the same materialization node. In at least some embodiments, a different approach called vertical partitioning may be used, in which different projections (combinations of attributes) of a table may be materialized at respective materialization nodes. FIG. 3 illustrates an example of vertical partitioning of a table of a multi-data-store database, according to at least some embodiments. In FIG. 3, Table 2 contains attributes AttributeA-AttributeZ, and the primary key 320 comprises the combination of AttributeA, AttributeB and AttributeC.

In at least some databases, a given table such as Table 2 may comprise a very large number of attributes or columns, and not all the attributes may have to be materialized at every data store to meet the needs of various applications using the database. According to vertical partitioning policy 395's partition definitions, at least four partitions with different combinations of Table 2 attributes are defined. With respect to partition P1, only attributes AttributeA, AttributeB, AttributeC and AttributeD may have to me materialized at the corresponding materialization node. At nodes where partition P2 is to be materialized, values of AttributeA, AttributeB, AttributeC, AttributeF and AttributeZ may be stored. For partition P3, values of AttributeA, AttributeB, AttributeC, AttributeE and AttributeF are to be stored. Some partitions such as P4 may include all the attributes in a vertical partitioning policy 395—that is, not all the partitions may consist of strict subsets of the attributes defined for the table being partitioned. It is noted that although all the primary key attributes (AttributeA, AttributeB and AttributeC) are shown as part of each partition's materialized attribute set in the example of FIG. 3, in at least some embodiments one or more vertical partitions may not include some or all attributes of the primary key.

Figure 4:
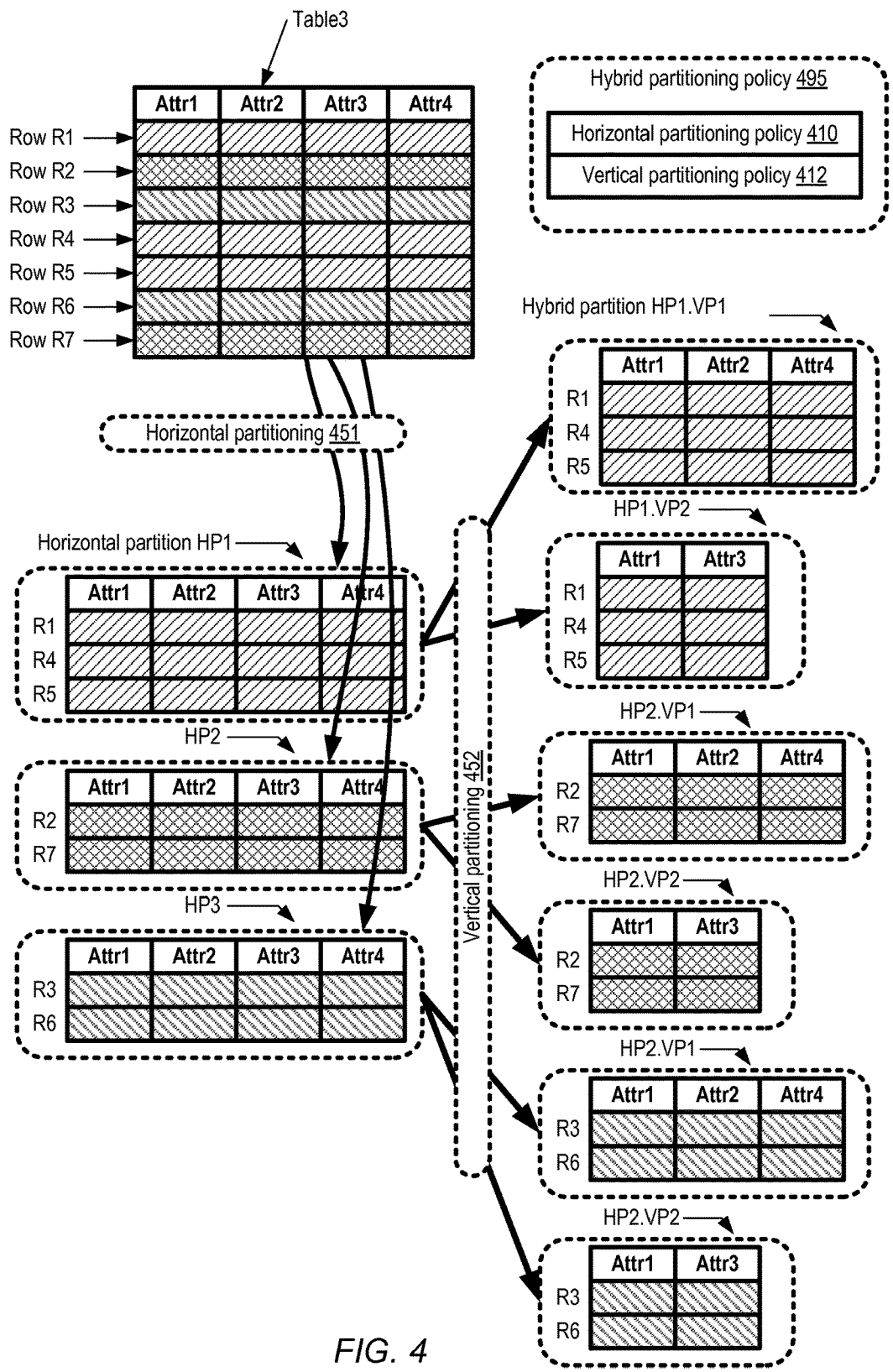
FIG. 4 illustrates an example of a hybrid partitioning policy involving both horizontal and vertical partitioning, according to at least some embodiments.

In some embodiments, a combination of attribute value based partitioning similar to that shown in FIG. 2, and attribute group based partitioning such as that shown in FIG. 3 may be employed. FIG. 4 illustrates an example of a hybrid partitioning policy involving both horizontal and vertical partitioning, according to at least some embodiments. Each row of Table 3 comprises values of four attributes: Attr1, Attr2 Attr3 and Attr4. Hybrid partitioning policy 495 for Table 3 includes a horizontal partitioning policy 410 and vertical partitioning policy 412. Seven rows R1-R7 of Table 3 are shown by way of example.

Conceptually, hybrid partitioning may be thought of as being implemented in two steps—for example, a horizontal partitioning step 451 followed by vertical a vertical partitioning step 452. In a journal based system of the kind described herein, only a single committed transaction's writes may be materialized at a time by a write applier in various embodiments, so the hybrid partitioning policy may be implemented by first identifying the horizontal partitions to which the writes are to be applied, and then by selecting the subset of attributes whose values are to be stored at each materialization node configured for those horizontal partitions. FIG. 4, in which the assignment of the contents of seven rows R1-R7 appears to be occurring concurrently, may thus represent the net result of processing several different committed transaction entries by a set of write appliers. That is, neither the relationships between the rows R1-R7 and committed transaction entries (some of which may affect several different rows), nor the sequence in which the writes may be dealt with by different write appliers, is indicated in FIG. 4.

Based on the horizontal partitioning policy 410 of the hybrid partitioning policy 495 (which in turn may be based on values of come combination of the attributes Attr1-Attr4), rows R1, R4 and R5 may be assigned to a horizontal partition HP1. Rows R2 and R7 may be assigned to horizontal partition HP2, while rows R3 and R6 may be assigned to horizontal partition HP3. In accordance with the vertical partitioning policy 412, the attributes of each of the sets of rows of the horizontal partition may be distributed as follows. Attr1, Attr2 and Attr4 values may be mapped to one vertical partition, while Attr1 and Attr3 may be mapped to a second vertical partition. As shown, the net result of applying the hybrid partitioning policy 495 to the seven example rows of Table 3 includes hybrid partitions HP1.VP1, HP1.VP2, HP2.VP1, HP2.VP2, HP3.VP1 and HP3.VP2. In various embodiments, these hybrid partitions may be stored at some number of materialization nodes, where the number of nodes and the mapping between the partitions and the nodes may also be indicated in the hybrid partitioning policy 495. For example, in one simple mapping, each hybrid partition may be stored at a respective materialization node.

Figure 5:
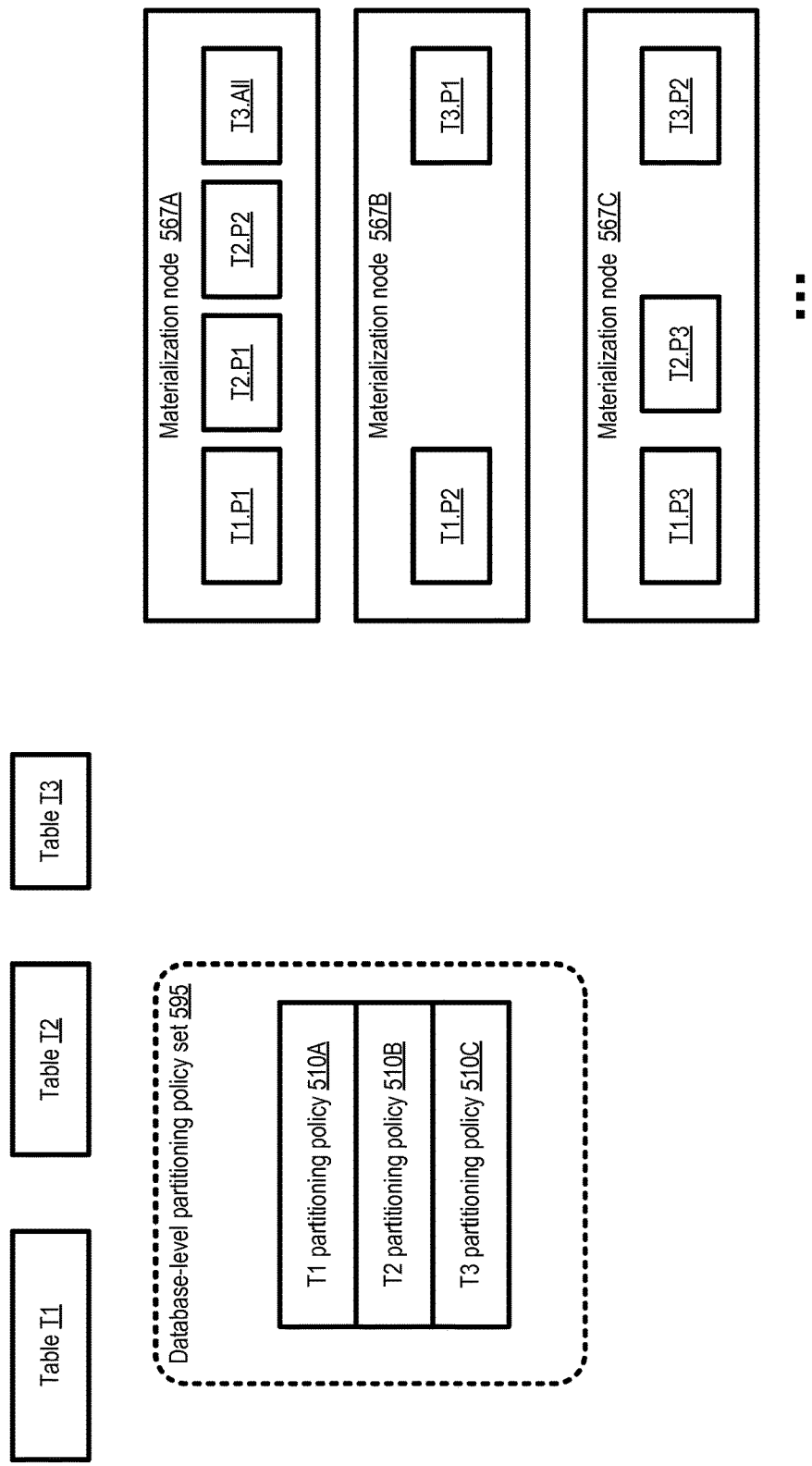
FIG. 5 illustrates a storage system in which partitions of various tables may be distributed non-uniformly across materialization nodes, according to at least some embodiments.

Different tables or other data objects of a multi-data-store journal-based database may grow at different rates, and as a result not all the database objects may have to be partitioned in the same way. FIG. 5 illustrates a storage system in which partitions of various tables may be distributed non-uniformly across materialization nodes, according to at least some embodiments. The database-level partitioning policy set 595 includes separate table-level policies or rules for three tables in the depicted embodiment: policy 510A for table T1, policy 510B for table T2, and policy 510C for table T3.

According to T1's partitioning policy 510A, three partitions of T1 (T1.P1, T1.P2 and T1.P3) are stored at respective materialization nodes 567A, 567B and 567C. T2 is also divided into three partitions; however, two of these partitions T2.P1 and T2.P1 are materialized at node 567A, while the third partition T2.P3 is stored at node 567C. Table T3 has two partitions, T3.P1 and T3.P2. Both partitions of T3 are materialized at node 567A, T3.P1 is materialized at node 567B and T3.P2 is materialized at node 567C. As shown in FIG. 5, depending on the requirements of the client and/or the applications built using a journal-based database, the contents of the database may be distributed across various materialization nodes in a highly flexible and customizable manner in various embodiments. The journal entries of the database collectively contain all the state change information required to materialize the database content. The logical separation of the persistent storing of authoritative state information (in the journal entries) from the materialization operations (which may be performed according to any desired combination of horizontal and/or vertical partitioning algorithms, and may be directed to any desired number of materialization nodes asynchronously and independently) in various embodiments may enable a variety of distribution arrangements for materializing various subsets of the database.

Mapping Attribute Values to Horizontal Partitions

Figure 6:
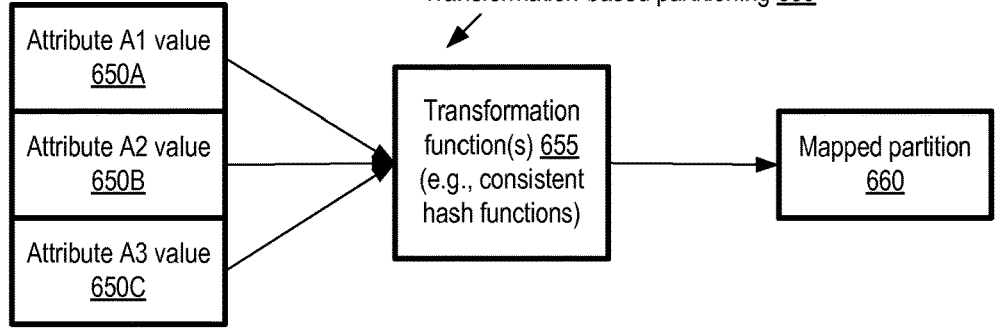
FIG. 6 illustrates alternative approaches which may be taken towards mapping attribute values to partitions at a journal-bases storage system, according to at least some embodiments.

FIG. 6 illustrates alternative approaches which may be taken towards mapping attribute values to partitions at a journal-based storage system, according to at least some embodiments. In a first technique, referred to as untransformed-attribute-value-based partitioning 601, horizontal partitions 602 may be distinguished from one another based directly on the values of one or more attributes. Thus, for example, partition P1 consists of rows whose Attribute A1 is set to Asia, Attribute A2 is set to Japan, and Attribute A3 values in the range 0-10000 in the depicted example. Partition P2 includes rows with Asia as the A1 value, Japan as the A2 value, and A3 values greater than 10000. Similarly, partition P3 corresponds to rows with A1 value Asia, A2 value China, and A3 values in the range 0-10000, while P4 consists of rows with A1 value Asia, A2 value China and A3 values greater than 10000. Assigning a given row to its partition in scenarios in which untransformed attribute values define the partitions may be trivial in various embodiments, and it is easy to verify that the partition selected for any given row is correct. However, if more than a few partitions are to be defined, selecting the partition boundaries or definitions may itself become a time-consuming and/or error-prone task. Dividing the data into just a few partitions may sometimes lead to imbalance: e.g., there may be no easy way to predict whether the sizes of P1, P2, P3 and P4 (or the rates at which writes have to be materialized to each of the partitions) are going to be similar to each other over time, or whether the partitions are going to diverge substantially from one another in storage size and/or performance requirements.

A transformation-based horizontal partitioning approach 660 may be employed in some embodiments. In this approach, a set of attributes such as A1, A2 and A3 of a table may be identified as partitioning attributes for the table. For any given row of the table, the values of the partitioning attributes may be obtained, and one or more transformation functions 655 (e.g., consistent hash functions) may be applied to the values to determine the partition to which the row should be mapped. If transformation functions with the appropriate statistical properties are selected, and if the values of at least some of the partitioning attributes are distributed fairly uniformly across their ranges, this approach may in general lead to a more balanced distribution of partition sizes and corresponding materialization workloads in at least some embodiments. Furthermore, application-specific knowledge (e.g., the "meaning" of various attribute values with respect to the application) may not be required to the same extent when transformation-based horizontal partitioning is used instead of untransformed-attribute value-based partitioning. In some embodiments, storage system components such as a scalability manager may select the transformation function, while in other embodiments clients may select the transformation functions.

Programmatic Interactions Associated with Partitioning

Figure 7:
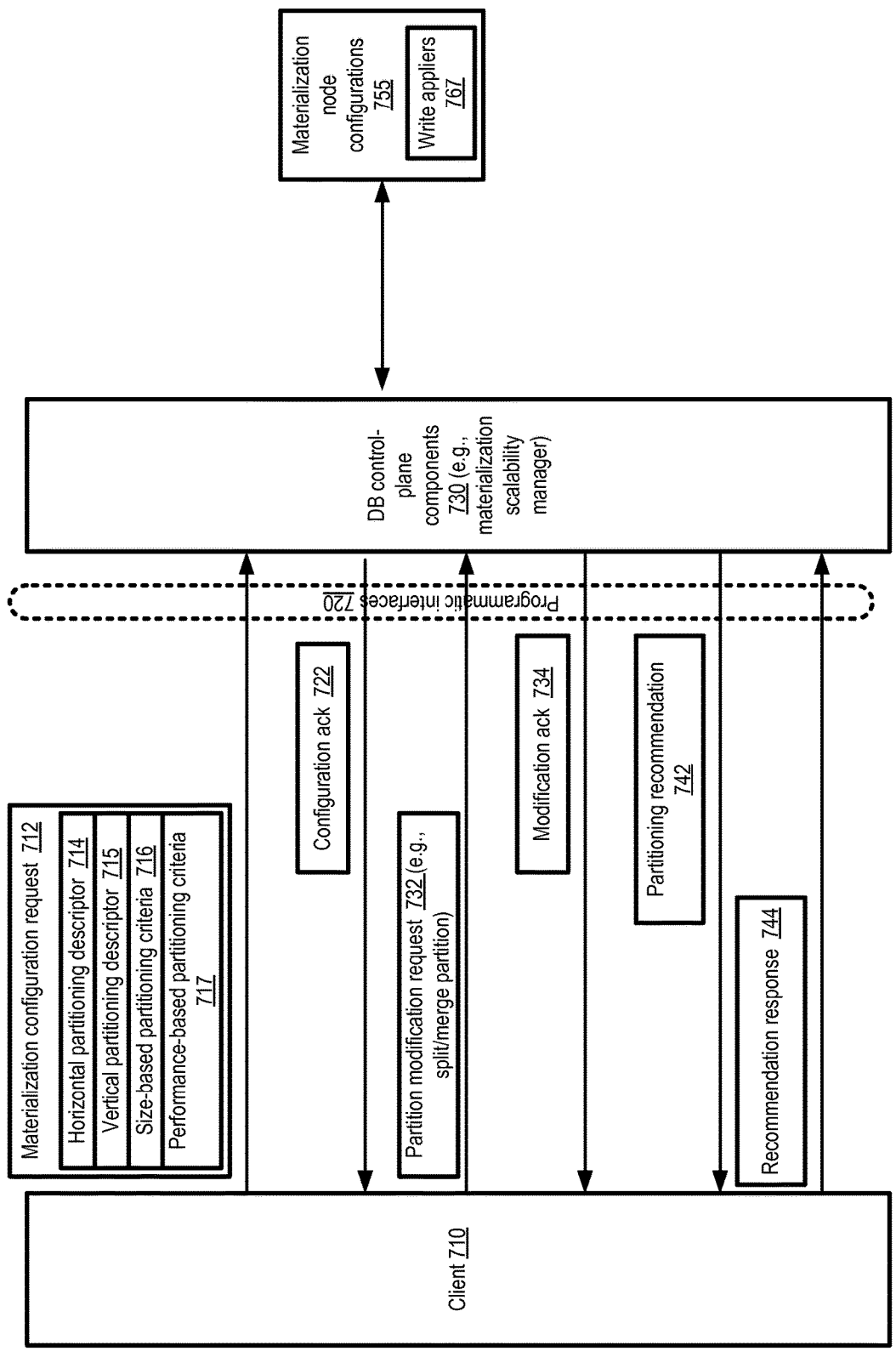
FIG. 7 illustrates example interactions between clients and control plane components of a storage system to manage database partitioning, according to at least some embodiments.

In various embodiments, clients of a journal-based multi-data-store database may provide guidance or requirements related to partitioning various database components. FIG. 7 illustrates example interactions between clients and control plane components of a storage system to manage database partitioning, according to at least some embodiments. The control plane components 730 may include, for example, a materialization scalability manager responsible for establishing and/or verifying the configurations 755 of materialization nodes. As shown, the control plane components may implement a set of programmatic interfaces 720 (e.g., APIs, web-based consoles, command-line tools, graphical user interfaces or the like) which can be used by clients 710 to submit configuration requests, receive responses to such requests and/or recommendations from the control plane components.

Client 710 may submit a materialization configuration request 712 to the control plane components in the depicted embodiment. Any of a number of algorithms may be used in different embodiments to determine the detailed rules to be used to divide one or more data objects into partitions, and to map the partitions to materialization nodes. The configuration request 712 may include, for example, a horizontal partitioning descriptor 714, a vertical partitioning descriptor 715, a set of size-based partitioning criteria 716, and/or a set of performance-based partitioning criteria 717. Depending on the level of control desired by the client with respect to partitioning details, the request 712 may either indicate specific rules (e.g., values or value ranges of attributes of table rows to be mapped to partitions), or may indicate high-level requirements which are translated to more specific rules by the control plane components. Thus, for example, the horizontal partitioning descriptor 714 may simply indicate that one or more of the attributes which make up the primary key of a particular table are to be used for partitioning, or descriptor 714 may specify value sets or ranges of various attributes and their mappings to partitions. In some cases a client may indicate the transformation function(s) (e.g., hash functions or the like) to be used to determine partitions. In other cases, the control plane components may select transformation functions. For example, a client 710 may indicate in a request 712 that for a particular table T1, ten-way horizontal partitioning is desired, and that two attributes Attr1 and Attr2 are to be used as partitioning attributes. In such a scenario, the control plane components may select a transformation function, such as a particular hash function H1. The concatenated values of Attr1 and Attr2 for any given row of the table may be provided as input to H1, and the output of the hash function (modulo 10, since ten partitions are desired) may be used to identify the partition to which that row is to be assigned. In at least some embodiments, if a client's request indicates one or more partitioning attributes as factors to be used for partition selection for a particular data object, the control plane components may verify that at least some of the partitioning attributes form part of the primary key of the data object. In some embodiments, the client need not necessarily indicate the partitioning attributes; instead, the control plane components may select the partitioning attributes based on the other preferences or requirements indicated in the materialization configuration request.

The combinations or groups of attributes which are to be materialized at different nodes may be indicated in rules represented in the vertical partitioning descriptor 715 in some embodiments. For hybrid partitioning, both horizontal and vertical partitioning descriptors or rules may be provided. In some embodiments, clients may specify the maximum sizes (e.g., in gigabytes or any appropriate storage space units) of materialized data to which various materialization nodes are to be limited, and such size-based criteria 716 may be used by the control plane components 730 to determine when new partitions are to be created. In at least one embodiment, performance criteria 717, such as the minimum rates at which writes are to be propagated to any given materialization node, or the bandwidth to be supported for write propagation to various materialization nodes, may be indicated by a client 720 in request 712, and used by control plane components to determine partitioning details. For example, consider a scenario in which a client indicates that a write materialization rate of X writes/second is desired for a particular table T1. Based on estimates or measures of the materialization rates at various materialization nodes, the control plane components may be able to determine that four materialization nodes may be needed to collectively support X writes/second. Accordingly, a hash function may be applied to a set of attributes (which may be selected by the control plane components if they have not been specified by the client), and the output of the hash function may be mapped to four partitions, one per materialization node.

In one embodiment, a partitioning configuration request 712 may indicate a new attribute to be added to a particular data object and used as a partitioning attribute (e.g., for horizontal and/or vertical partitioning) for the data object. A value derivation algorithm to be used to obtain the value of the new attribute for a given row (e.g., based on other attributes) may also be indicated in the configuration request. For example, if attribute Attr1 of the data object consists of 32 characters, a new partitioning attribute PartitionAttr may be generated by extracting the first two characters from Attr1. In another example, if attribute Attr1 of the data object consists of 32 characters and attribute Attr2 takes on integer values between 1 and 5, a new partitioning attribute PartitionAttr may be derived by extracting the first character from Attr1 and concatenating it with a character representation of Attr2. A partitioning rule to be used to map the new attribute to partitions of the data object may also be indicated in the request 712. In response to a materialization configuration request which indicates that such a new partitioning attribute is to be used, values of the new attribute for various rows or records of the data object may be derived, e.g., by write appliers, and the partitioning rule applicable to the derived attribute may be implemented to select appropriate materialization nodes for the various rows or records.

The request 712 may also indicate the mappings between partitions and materialization nodes in various embodiments—e.g., whether each partition is to be materialized at a separate node, or whether multiple partitions of a given object are to be materialized at the same node. In some embodiments, clients may already have established materialization nodes for various partitions, and may simply indicate the rules for partitioning in the request 712 and/or identification information (e.g., IP addresses) of the various write appliers and/or data store managers of the different materialization nodes. In other embodiments, the client 720 may rely on the control plane components to establish or instantiate the materialization nodes, to ensure/verify connectivity and access between the different components (e.g., the journal, write appliers, data store managers, and the like), and so on. In various embodiments, the control plane components may identify the write appliers and/or other components of the initial set of materialization nodes which are required to implement the partitioning policy. In some embodiments, the control plane components may transmit respective messages or commands to various components of the materialization nodes (e.g., to the write appliers) to start processing journal entries for their respective partitions. In one embodiment the control plane components may provide, to each of the write appliers, the respective partitioning rules to be used (e.g., by transmitting either the entire partitioning policy, or a portion of the partitioning policy that is relevant to the write applier). In the depicted embodiment, the control plane components 730 may transmit a configuration acknowledgement message 714, e.g., after verifying that the appropriate initial set of materialization nodes corresponding to the request 712 has been configured.

In at least some embodiments, a client 720 may submit partition modification requests 732, e.g., requests to split and/or merge previously-generated partitions. In response to such a request 732, the control plane components may initiate the required configuration operations (e.g., modifying the metadata used by write appliers to select the writes to be propagated to a given partition, establishing new materialization nodes, and the like). A modification acknowledgement message 734 may be transmitted to the client 720 after the requested changes have been made.

In some embodiments, the control plane components 730 may transmit partitioning recommendations 742 to clients 720. For example, the control plane components may monitor the sizes of the data sets materialized at various nodes, and/or performance metrics associated with materialization, and determine when it may be appropriate or beneficial to create new partitions. In some cases, the recommendations may be based at least in part on criteria (e.g., size criteria or performance criteria indicated in requests 712) previously indicated programmatically by the client, and the control plane components may wish to obtain approval to implement a proposed partitioning policy. In other cases, the recommendations may be based on the database system's internal criteria, rather than on client-specified criteria. The client may provide feedback on the recommendations using programmatic recommendation responses 744 in the depicted embodiment.

Journal Schemas Containing Partitioning Metadata

As mentioned above, in various embodiments the member data stores of a journal-based database may differ from one another in several respects, including for example the kinds of data types supported natively at each data store. A common set of rules and capabilities applicable to all member data stores may be indicated in a journal schema agreed to by all the member data stores in some embodiments. The journal schema may also indicate various aspects of partitioning policies or rules in at least some embodiments.

Figure 8:
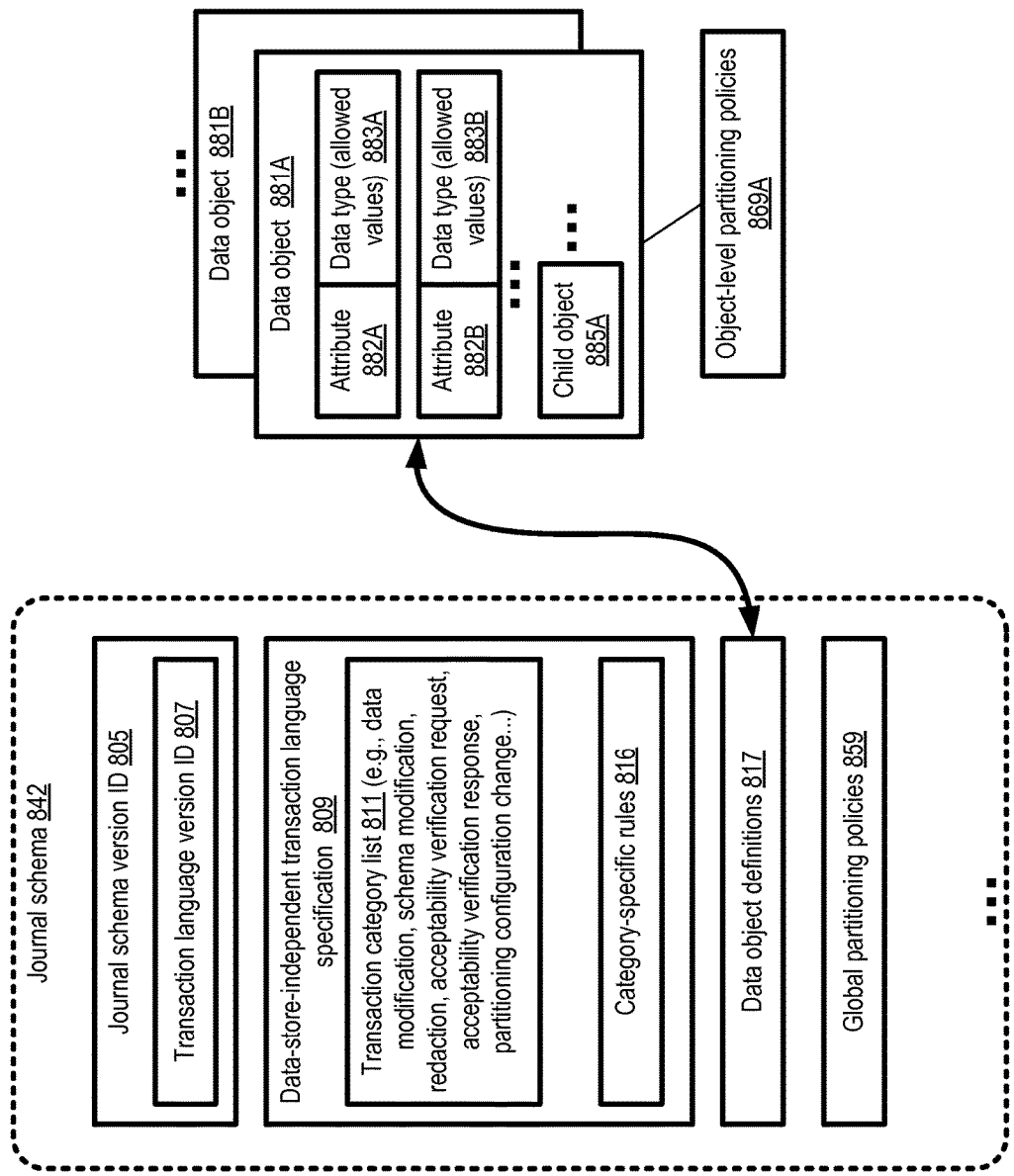
FIG. 8 illustrates example elements of a journal schema which may be employed at a journal-based multi-data-store database, according to at least some embodiments.

FIG. 8 illustrates example elements of a journal schema which may be employed at a journal-based multi-data-store database, according to at least some embodiments. As shown, a journal schema 842 may contain a version identifier 805 in some embodiments. In the depicted embodiment, new versions of the journal schema may take effect after approval by the various data store managers of the materialization nodes of the storage system. In at least one embodiment, a journal schema 842 may include a specification 809 of a data-store-independent transaction language, which is to be used for preparing transaction requests submitted to a journal manager. In some embodiments, the transaction language may have its own separate version number (e.g., because a change to a journal schema version may not necessarily involve a corresponding change to the transaction language). An identifier 807 of the transaction language version may be included in the journal schema 842 in such embodiments, e.g., either embedded within the journal schema identifier or as a separate element of the journal schema.

A number of different transaction or state change categories may be supported at the storage system in various embodiments. For example, supported transaction categories may include data object modification transactions, redactions (operations to cancel earlier-inserted entries of the journal), journal schema changes, proactive acceptability verification requests for potential state changes, responses to such acceptability verification requests, changes to partitioning configurations, and so on. A list 811 of the transaction categories may be indicated explicitly or implicitly in the transaction language specification 809 in the depicted embodiment. Corresponding to some or all of the categories, a respective set of category-specific rules 816 may be indicated in the journal schema 842. For example, the category-specific rules 816 may include data object modification rules, redaction rules, journal schema change rules, partition configuration request rules, and the like. Each set of rules may indicate the acceptable syntax (e.g., the types of transaction verbs such as INSERT, DELETE, UPDATE and the like) for the corresponding types of requests, acceptable format(s) in which the requests are to be expressed, and so on. To prepare a given transaction request, in various embodiments a client-side component may use the category-specific rules of the current version of the journal schema for the kind of transaction which is being requested.

Details regarding the names, attributes and attribute values of data objects of the storage system may be provided in a collection of data object definitions 817. A particular data object such as 881A may include a collection of attributes 882 (e.g., attributes 882A and 882B), each of which may have a data type 883 (e.g., 883A and 883B) indicating a range or set of allowed values, or some other similar indicator of allowed values. In some embodiments, the range of allowed values may be indicated by the name of the data type—e.g., an "int32" data type may indicate that signed integer values which can be expressed using 32 bits are allowed. In various embodiments, the set of values permitted for a given attribute may be determined using a "maximum overlap" approach with respect to the attribute values permitted at the different member data stores, such that each data store is capable of representing or manipulating the set of values. Some data objects may be organized hierarchically (in parent-child relationships) in at least one embodiment—e.g., data object 881A may comprise a set of child objects such as 885A, with each child object having its own attribute set and data types or allowed attribute values. In some embodiments, the data objects 881 may be considered analogous to tables of relational or non-relational databases, with the attributes 882 corresponding to table columns.

In the embodiment depicted in FIG. 8, journal schema 842 may include one or more kinds of partitioning-related information. Global partitioning policies 859 may, for example, indicate criteria to be used to partition several different data objects, or even all the objects of the database. Such global policies may indicate whether partitioning of a given data object is unconditional, or whether partitioning is to be initiated in response to a triggering condition. The criteria to be used to initiate partitioning, such as performance criteria or materialized data set size criteria, may also be indicated in a global partitioning policy in at least some embodiments. In addition to or instead of global partitioning policies, some or all of the data object definitions 817 may also have associated object-level partitioning policies 868 represented in the journal schema in various embodiments. Such object-level partitioning policies may indicate whether a given object is to be partitioned horizontally, vertically, or horizontally as well as vertically, and the parameters governing the partitioning (such as the attribute sets and values which are to determine partitioning, transformation functions to be applied to obtain partition mappings, and so on). Some or all of the partitioning-related information represented in the journal schema 842 may be obtained from client-submitted configuration requests in various embodiments. Transaction-submitters and write appliers may obtain partitioning policies from the journal schema (e.g., from materialization nodes at which the journal schema is stored, or from the journal itself). Journal schemas 842 may comprise additional elements beyond those shown in FIG. 8 in one embodiment, while some of the elements shown in FIG. 8 may not be supported in other embodiments.

In various embodiments, at least a portion of a journal schema 842 may be based on or derived from a collection of concrete schemas of the member data stores of the storage system. The particular details of the attribute values permitted by a given data store's concrete schema may depend on various factors, such as, for example, the limitations on the data types supported at the data store, the choices made by administrators when creating the concrete schemas 355, and so on. Some popular data stores may only provide support for 32-bit integers, for example for historical reasons, while others may support larger integer ranges. When generating a journal schema to be shared for transactions associated with several different data stores, a "maximum overlap" approach towards allowable attribute values may be taken in at least some embodiments. For example, if at least one member data store permits integer values of no more than 32 bits, while all the other data stores support integers of at least 32 bits, then 32-bit integers may be selected for a corresponding integer-valued attribute in the journal schema. In various embodiments, the concept of maximal overlap may be also or instead be employed with respect to the set of attributes indicated in the journal schema—e.g., if one data store's concrete schema defines attributes Attr1, Attr2, Attr3 and Attr4 for a data object, but another data store's concrete schema only includes Attr1, Attr2 and Attr3 for the data object, the journal schema may only include the common set of attributes (Attr1, Attr2, Attr3). If the member data stores support different types of data manipulation operations (e.g., different index creation requests), a common set of data manipulation operations that can be supported at all the data stores may be indicated in a transaction language of the journal schema in at least some embodiments. Thus, the approach of including the maximum overlapping functionality of the member data stores in the journal schema may extend to operation syntax in addition to attribute definitions and allowed value ranges.

Journal-Based Transaction Management Overview

Figure 9:
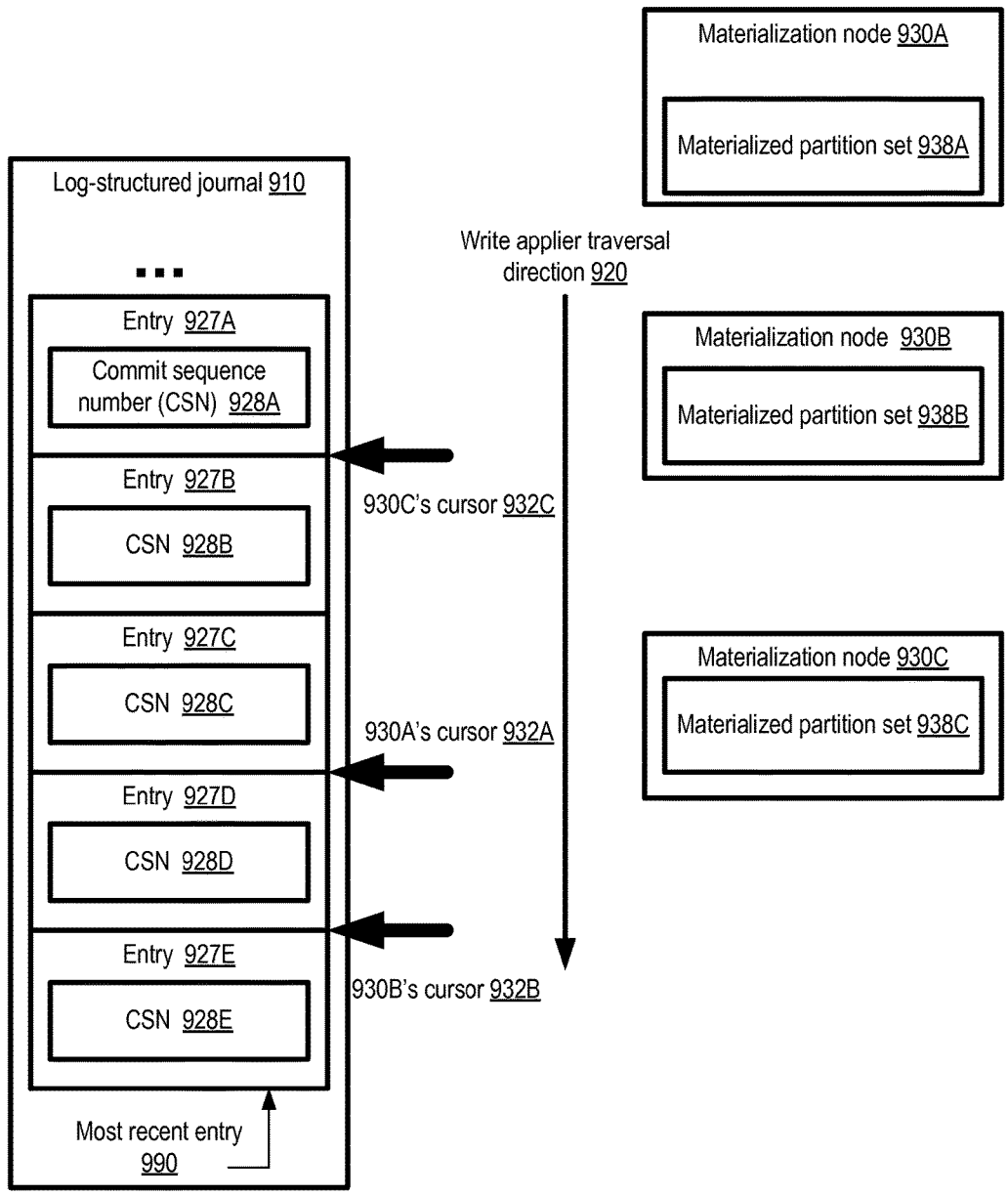
FIG. 9 illustrates an example of asynchronous processing of database journal entries by write appliers associated with various materialization nodes, according to at least some embodiments.

The materialization nodes of a journal-based multi-data-store storage system may differ from each other in various characteristics, including for example the rate at which they are capable of processing or applying committed writes indicated in the journal entries. In various embodiments, the materialization nodes need not always remain synchronized with each other with respect to the replicated state machine represented by the journal set up for the storage system FIG. 9 illustrates an example of asynchronous processing of database journal entries by write appliers associated with various materialization nodes, according to at least some embodiments. At a point of time corresponding to FIG. 9, the journal 910 comprises a plurality of entries 927 inserted in order of respective commit sequence numbers (CSNs) 928, with the most recent entry 990 being entry 927E with CSN 928E. The most recent entry may sometimes be referred to as the "head" of the journal.

In effect, each of the write appliers of the materialization nodes 930 may represent a cursor onto the sequence of commit entries of the journal, and process the writes indicated in the entries in the order in which the entries were inserted into the journal. For example, cursor 932A is established for materialization node 930A at which partition set 938A is materialized, cursor 932B is maintained for materialization node 930B comprising partition set 938B, and cursor 932C is maintained for materialization node 930C at which partition set 938C is stored in the depicted example. A write applier corresponding to each of the cursors 932 may be implemented, for example, as a separate process or thread of execution in some embodiments. As indicated by arrow 920, each of the cursors processes the entries of journal 910 in the same order, e.g., in increasing order of CSNs 928 of the entries. At the point of time illustrated in FIG. 5, writes corresponding to entries with CSNs up to 928C have been processed or applied at node 930A's data store, writes corresponding to CSNs up to 928D have been processed at node 930B, and writes corresponding to CSNs up to 928A have been processed at node 930C. Each materialization node 930 may process journal entries independently of, and asynchronously with respect to, other materialization nodes in the depicted embodiment.

Figure 10:
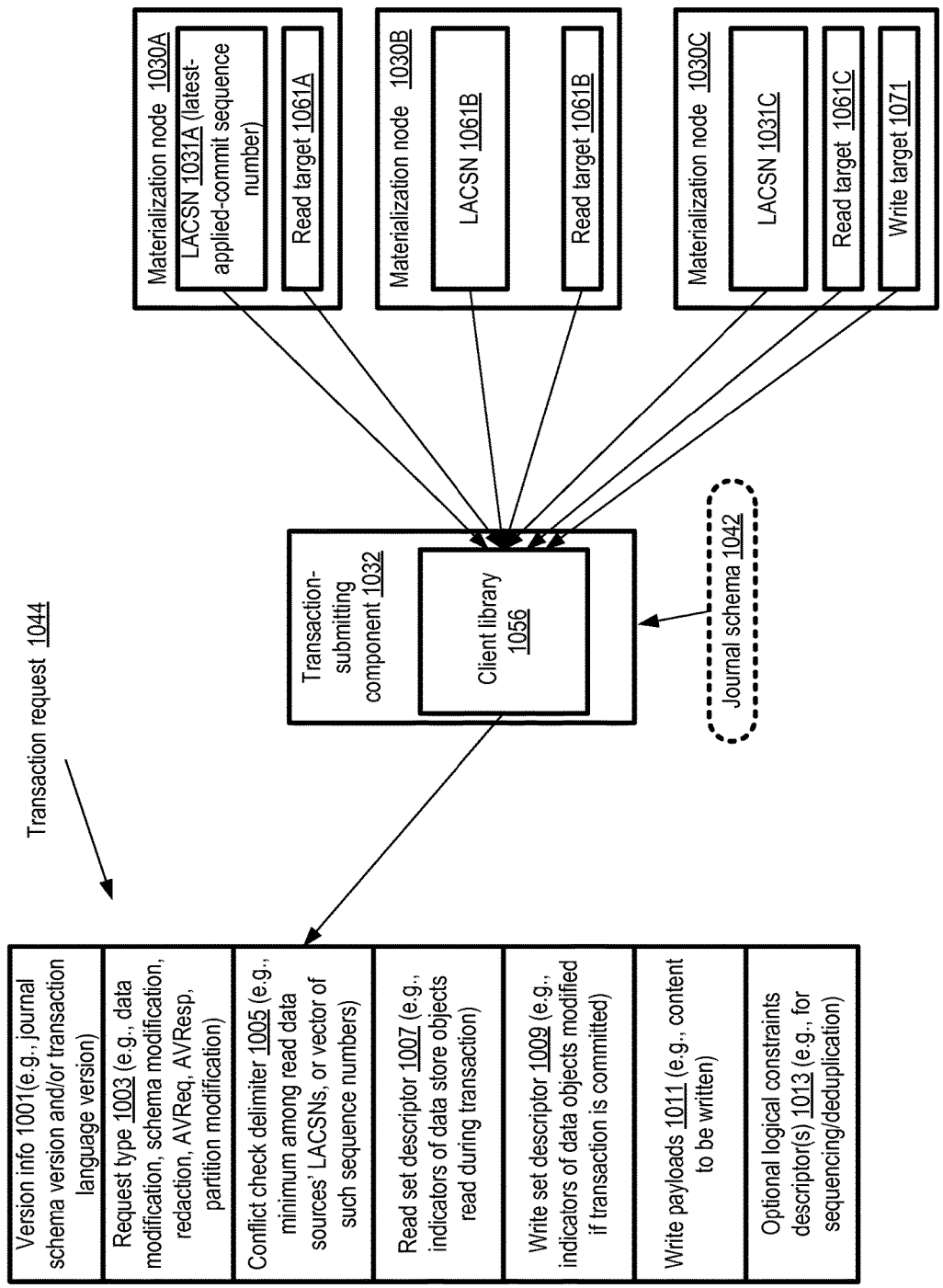
FIG. 10 illustrates an overview of transaction requests which may be submitted to a journal manager of a multi-data-store storage system, according to at least some embodiments.

FIG. 10 illustrates an overview of transaction requests which may be submitted to a journal manager of a multi-data-store storage system, according to at least some embodiments. As shown, transaction request 1044 may include some combination of versioning information 1001, a transaction type indicator 1003, a conflict check delimiter 1005, a read set descriptor 1007, a write set descriptor 1009, write payload(s) 1011 and optional logical constraint descriptors 1013 in the depicted embodiment. A client-side component 1032 comprises a client library 1056 which may be utilized to assemble or prepare the transaction request. In at least some embodiments, the client library may automatically record information about the read targets 1061A, 1061B, and 1061C (e.g., corresponding to respective data objects or data object partitions whose attribute details are specified in the journal schema 1042) respectively within data stores 1030A, 1030B and 1030C from which data is read during the transaction. In some embodiments, the read set descriptors may be generated by applying transformation functions (e.g., hash functions) to the read queries. In various embodiments, information about the write target 1071 (of data store 1030C in the depicted example) to which data is written may also be recorded by the client library 1056, e.g., by applying similar transformation functions to queries whose results may be affected by the writes. In some implementations, the client library 1056 may also obtain, from each of the data stores 1030 of the materialization nodes from which data is being read, a corresponding latest-applied commit sequence number (LACSN) 1031 (e.g., 1031A-1031C) of the most recent transaction whose writes have been applied at the data store. In one embodiment, such LACSNs 1031 may be retrieved before any of the reads of the transaction are issued to the corresponding data stores, for example. In another embodiment, the LACSNs 1031 may be retrieved from a given data store 1030 just before the first read that is directed to that data store within the current transaction is issued.

In the depicted embodiment, the version number of the journal schema 1042 and/or the version number of the data-store independent transaction language being used for the transaction request 1044 may be indicated in version information fields 1001. In some embodiments, the transaction category, such as whether a data object modification is being requested, a journal schema change is being requested, or a partitioning change is being requested, may be indicated in a separate request type field 1003. In other embodiments, the request type may be implicit rather than explicit, e.g., the type of state change being requested may be apparent based on the write set descriptor and/or other elements of transaction request 1044. The conflict check delimiter 1005 may be derived from a function to which the LACSNs 1031 are provided as input in some embodiments. For example, in one implementation, the minimum sequence number among the LACSNs obtained from all the data stores read during the transaction may be used. In another implementation, a vector or array comprising the LACSNs from each of the data stores may be included as the conflict check delimiter 1005 of the transaction request descriptor. The conflict check delimiter 1005 may also be referred to herein as a committed state identifier, as it represents a committed state of one or more data stores upon which the requested transaction depends.

As mentioned earlier, in some embodiments, transformation functions may be applied to read queries to generate the read set descriptor 1007, and/or similar transformation functions may be applied to write-affected queries (a set of queries whose results may be affected by the proposed writes) to generate write set descriptor 1009 in various embodiments. In some embodiments, instead of the query-based transformation, a selected transformation function may instead be applied to the locations/addresses of the read targets to obtain a set of hash values to be included in read descriptor 1007. Similarly, a selected transformation function (either the same function as was used for the read descriptor, or a different function, depending on the implementation) may be applied to the location of the write(s) of a transaction to generate the write set descriptor 1009 in some embodiments. In another embodiment in which read set descriptors and/or write set descriptors are generated based on locations rather than query contents, hashing may not be used; instead, for example, an un-hashed location identifier may be used for each of the read and write set entries. The write payload 1011 may include a representation of the data that is to be written for each of the writes included in the transaction, which may be used (either alone or together with the read set descriptor) to identify the partition to which the writes of the transaction are to be applied. Optional logical constraints 1013 may include signatures used for duplicate detection/elimination and/or for sequencing specified transactions before or after other transactions in some embodiments. Some or all of the contents of the transaction request descriptor 1044 may be stored as part of the journal entries (e.g., committed transaction records) in some embodiments.

It is noted that the read and write targets from which the read set descriptors and/or write set descriptors are generated may represent different storage granularities, or even different types of logical entities, in different embodiments or for different data stores. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used. In at least some implementations, partition identifiers may be included in the identifiers of read and/or write targets. In various embodiments, the journal manager may be responsible, using the contents of a transaction request and the journal, for identifying conflicts between the reads indicated in the transaction request and the committed writes indicated in the journal.

Figure 11:
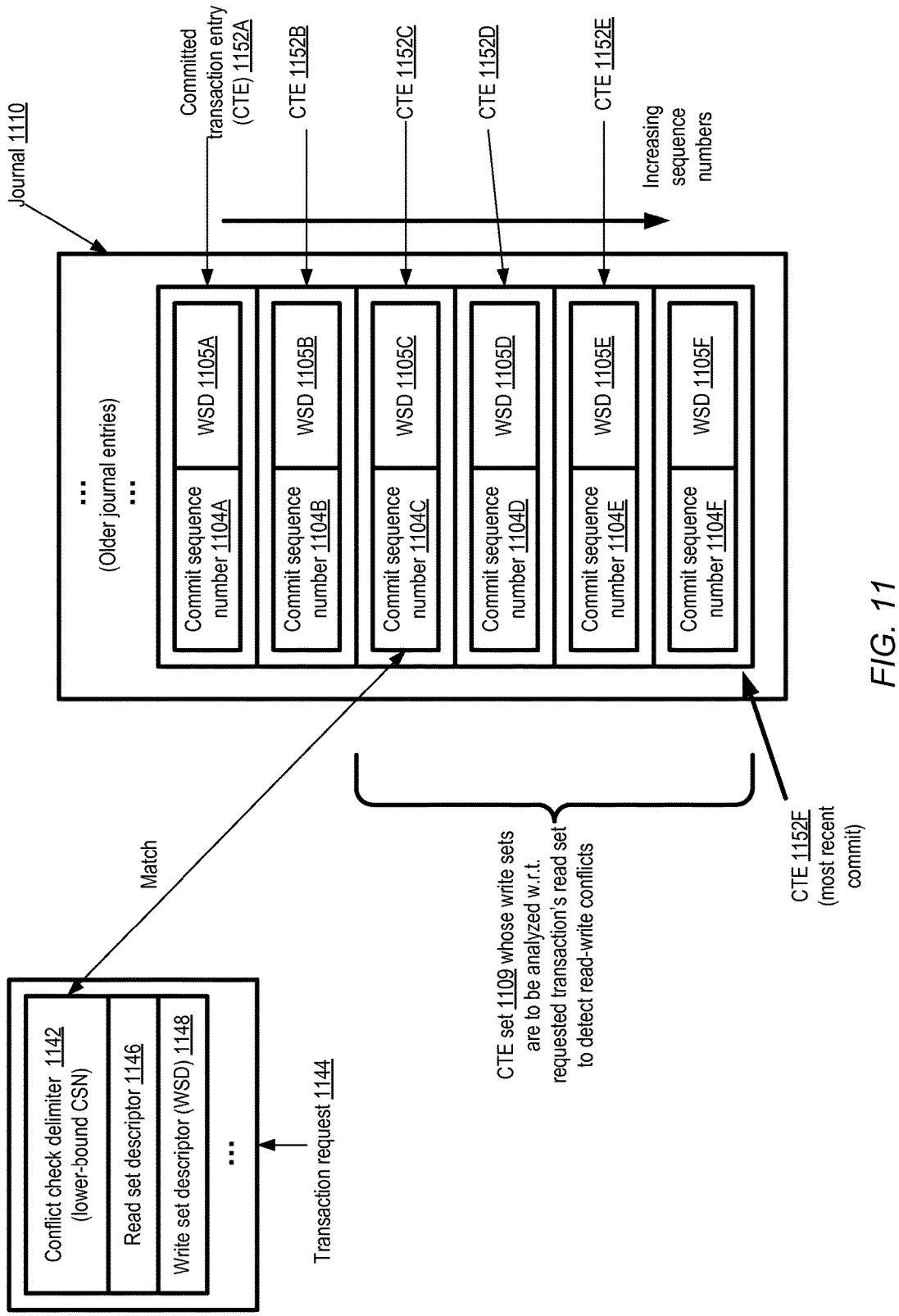
FIG. 11 illustrates an overview of conflict detection operations which may be performed by a journal manager, according to at least some embodiments.

FIG. 11 illustrates an overview of conflict detection operations which may be performed by a journal manager, according to at least some embodiments. In the depicted example, committed transaction entries (CTEs) 1152 stored at journal 1110 are shown arranged in order of increasing commit sequence numbers from the top to the bottom of the figure. The latest or most recently committed transaction is represented by CTE 1152F, with commit sequence number (CSN) 1104F and write set descriptor (WSD) 1105F. Each of CTEs 1152A, 1152B, 1152C, 1152D and 1152E comprises a corresponding CSN 1104 (e.g., CSNs 1104A-1104E respectively) and a corresponding WSD 1105 (e.g., WSDs 1105A-1105E).

As shown, transaction request 1144 includes a conflict check delimiter (or committed state identifier) 1142, a read set descriptor 1146 and a write set descriptor 1148. (The write payload and other components of the transaction are not shown). The conflict detector of the journal manager may be required to identify a set of CTEs of journal 1110 that are to be checked for conflicts with the read set of the requested transaction. The conflict check delimiter 1142 indicates a lower-bound CSN that may be used by the conflict detector to identify the starting CTE of set 1109 to be examined for read-write conflicts with the requested transaction in the depicted embodiment, as indicated by the arrow labeled "Match". Set 1109 may include all the CTEs starting with the matching sequence number up to the most recent committed transaction (11TE 752F) in some embodiments. If any of the writes indicated by the CTE set 1109 overlap with any of the reads indicated in the transaction request 1144, such a read-write conflict may lead to a rejection of the requested transaction. A variety of mechanisms may be used to check whether such an overlap exists in different embodiments. In one embodiment, for example, one or more hashing-based computations or probes may be used to determine whether a read represented in the read set descriptor 146 conflicts with a write indicated in the CTE set 1109, thereby avoiding a sequential scan of the CTE set. In some implementations, a sequential scan of CTE set 1109 may be used, e.g., if the number of records in the CTE set is below a threshold. If none of the writes indicated in CTE set 1109 overlap with any of the reads of the requested transaction, the transaction may be accepted, since none of the data that were read during the preparation of the transaction request can have changed since they were read. In at least one embodiment, a transaction request may also indicate an upper bound on the sequence numbers of journal entries to be checked for conflicts—e.g., the conflict check delimiter may indicate both a starting point and an ending point within the set of CTEs 1152.

Figure 12:
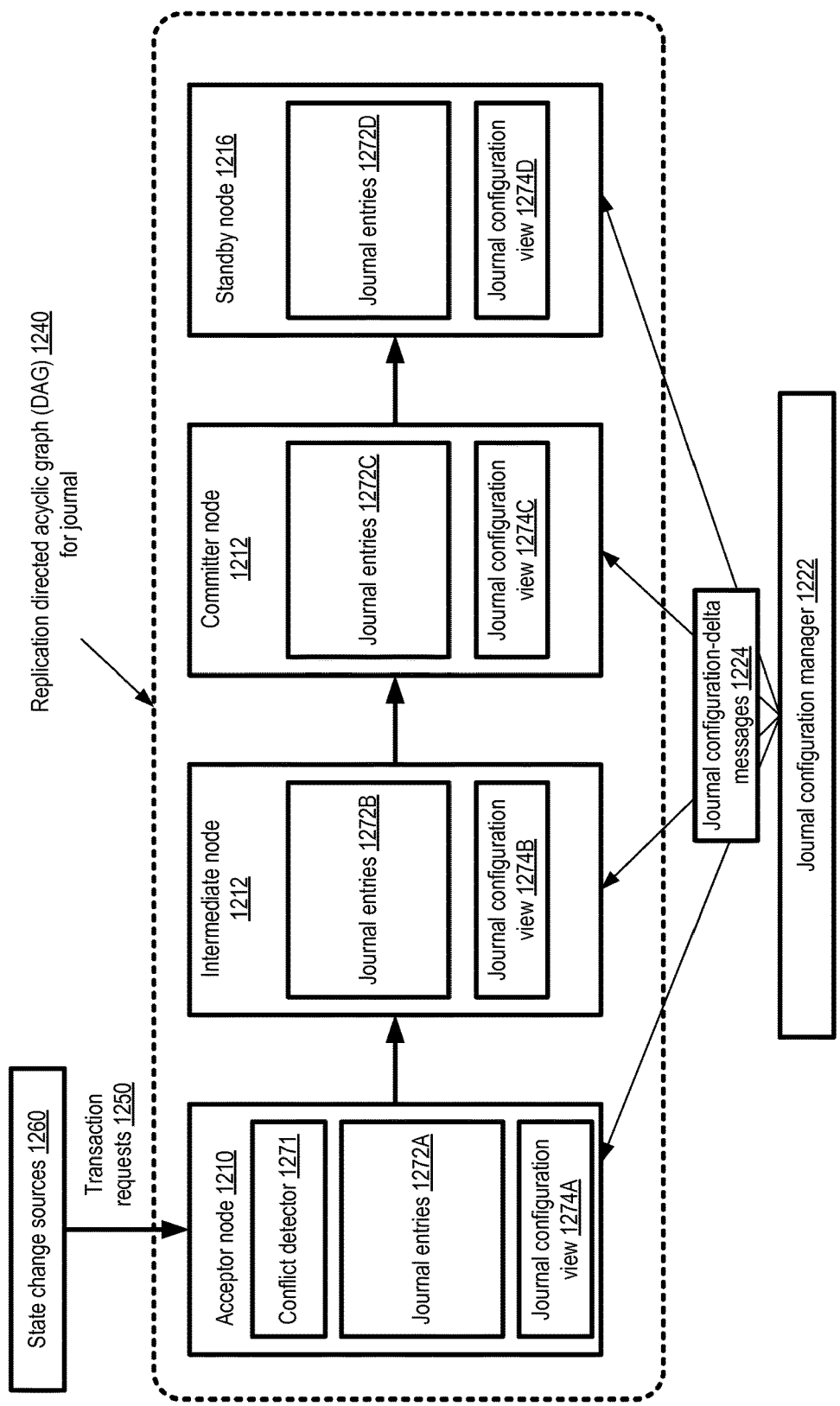
FIG. 12 illustrates an example replication directed acyclic graph (DAG) which may be used to implement a journal of a multi-data-store storage system, according to at least some embodiments.

In some embodiments, the journal of a multi-data-store storage system may be replicated for enhanced data durability and/or higher levels of availability. FIG. 12 illustrates an example replication directed acyclic graph (DAG) which may be used to implement a journal of a multi-data-store storage system, according to at least some embodiments. In general, a replication DAG 1240 may include one or more acceptor nodes 1210 to which transaction requests 1250 may be submitted, one or more committer nodes 1214, zero or more intermediary nodes 1212 each positioned along a replication pathway comprising DAG edges leading from an acceptor node to a committer node, and zero or more standby nodes 1216 that are configured to quickly take over responsibilities of one of the other types of nodes in the event of a node failure. In the embodiment depicted in FIG. 12, the acceptor node includes a conflict detector 1271 of the journal manager. In other embodiments, instead of being incorporated within an acceptor node, the conflict detector may be implemented separately.

In at least some embodiments, each node of a particular replication DAG such as 1240 may be responsible for replicating journal entries. The journal entries may be propagated along a set of edges from an acceptor node to a committer node of the DAG along a replication pathway. In FIG. 12, the current replication pathway starts at acceptor node 1210, and ends at committer node 1214 via intermediary node 1212. For a given journal entry (e.g., an entry indicating a committed data object modification, a committed journal schema change, a change to a partitioning policy, etc.), one replica may be stored at each of the nodes along the replication path, e.g., in journal entries 1272A, 1272B and 1272C. Each journal entry propagated within the DAG may include a respective sequence number or a logical timestamp that is indicative of an order in which the corresponding transaction request was processed (e.g., at the acceptor node 1210). When a particular journal entry reaches a committer node, e.g., after a sufficient number of replicas of the entry have been saved along the replication pathway, the corresponding transaction may be explicitly or implicitly committed. If for some reason a sufficient number of replicas cannot be created, the journal entries may be logically and/or physically removed (e.g., by setting a "removed" flag) in some embodiments from the nodes (if any) at which they have been replicated thus far. After a commit, the writes of the transaction may be propagated or applied to a set of destinations (such as storage devices at which the contents of the member data stores are located) as described earlier, e.g. by respective write appliers. In some implementations, only a subset of the DAG nodes may be read in order to propagate committed writes to their destinations. In other embodiments, journal entries may be read from any of the DAG nodes to propagate the changes. In at least one embodiment, write appliers or cursors may be implemented as respective threads or processes that may run at the same hosts at one or more of the DAG nodes. In other embodiments, write appliers may run on different hosts than the DAG nodes. A journal entry may also be transmitted eventually to standby node 1216, and a replica of it may be stored there after it has been committed, so that the standby node 1216 is able to replace a failed node of the DAG quickly if and when such a failover becomes necessary.

A journal configuration manager 1222 may be responsible for managing changes to DAG configuration (e.g., when nodes leave the DAG due to failures, or join/re-join the DAG) by propagating configuration-delta messages 1224 asynchronously to the DAG nodes in the depicted embodiment. Each configuration-delta message may indicate one or more changes to the DAG configuration that have been accepted or committed at the journal configuration manager 1222. In some embodiments, each replication node may implement a respective deterministic finite state machine, and the journal configuration manager may implement another deterministic finite state machine.

The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for transition record propagation may work correctly even if some of the nodes along a replication pathway have a different view of the current configuration of the journal DAG than other nodes. In FIG. 12, each of the nodes may update its respective journal configuration view 1274 (e.g., 1274A, 1274B, 1274C or 1274D) based on the particular sequence of configuration-delta messages it has received from the configuration manager 1222. It may thus be the case, in one simple example scenario, that one node A of a DAG 1240 continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The configuration manager may not need to request the DAG nodes to pause processing of transactions and corresponding journal entries in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement persistent journals for distributed transaction management. Although a linear replication pathway is shown in FIG. 12, in general, a replication pathway may include branches at least at some points of time (e.g., during periods when some DAG nodes have received different configuration delta messages than others). Under most operating conditions, the techniques used for propagating DAG configuration change information may eventually result in a converged consistent view of the DAG's configuration at the various member nodes, while minimizing or eliminating any downtime associated with node failures/exits, node joins or node role changes. It is noted that in some embodiments, journal entries may be stored without using the kinds of replication DAGs illustrated in FIG. 12.

In at least some embodiments, the nodes of a replication DAG may each be implemented as a respective process or thread running at a respective host or hardware server. The hosts themselves may be physically dispersed, e.g., within various data centers of a provider network. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. Some or all of the data stores for which transaction support is provided using the techniques described herein may be established using network-accessible database services and/or other storage services of a provider network in some embodiments. In one embodiment, a provider network at which journal-based transactions are implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some such embodiments, one or more nodes of a replication DAG 1240 may be implemented at a different availability container than other nodes of the replication DAG, thereby increasing the robustness and durability of the journal.

Partitioned Journal Snapshots

Over time, the number of entries appended to the database journal may become very large. In at least some journal-based databases, new materialization nodes may be added to the system at various points in time (e.g., in response to a creation of a new partition). Newly-added materialization nodes may have to be synchronized with, or brought up-to-date with respect to, the journal contents reflecting the particular partition of the data which is expected to be materialized at the nodes. One way to synchronize a new materialization node may be to analyze all the relevant transaction from the journal. However, for very large journals, such an approach may take a long time. Instead, in at least some embodiments, a snapshot creation mechanism may be implemented, and the newly-added materialization node may be synchronized more efficiently as described below using such snapshots.

Figure 13:
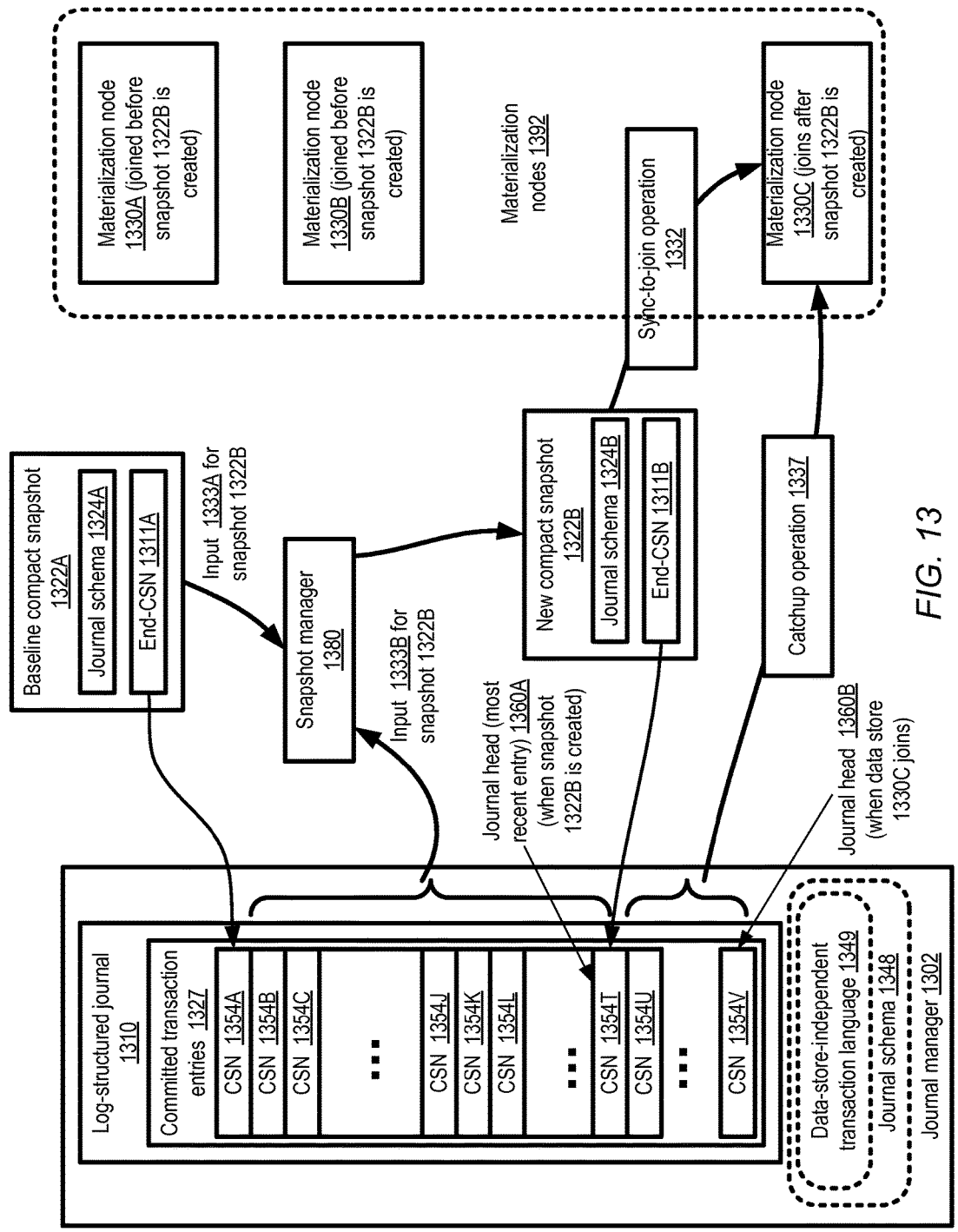
FIG. 13 illustrates an overview of the creation of compact snapshots of journal entries to enable efficient synchronization of a new data store with the state of a journal-based multi-data-store storage system, according to at least some embodiments.

FIG. 13 illustrates an overview of the creation of compact snapshots of journal entries to enable efficient synchronization of a new data store with the state of a journal-based multi-data-store storage system, according to at least some embodiments. The system illustrated in FIG. 13 includes a journal manager 1302, a plurality of materialization nodes 1330 (such as 1330A, 1330B and 1330C) and a snapshot manager 1380. The snapshot manager 1380 may be implemented as a control plane component at one or more computing devices of the storage system in at least some embodiments. To simplify the presentation, FIG. 13 illustrates the snapshot creation process for an un-partitioned database; details regarding the generation and management of partition-level snapshots are provided later.

A log-structured journal 1310 comprises a plurality of committed transaction entries 1327 which are appended or added to the journal in the order in which the corresponding commit decisions were made by the journal manager 1302, e.g., using the kinds of conflict detection and other analysis discussed earlier. Each committed transaction entry 1327 includes a commit sequence number (CSN) 1354 (e.g., 1354A-1354V) indicative of the order of the commit decisions. The most recently added journal entry at a given point in time is referred to as the "head" of the journal. The entries 1327 are added to the journal in response to receiving transaction requests from client-side components of the database (the client-side components are not shown in FIG. 13). The transaction requests and the corresponding journal entries are formatted in accordance with a data-store-independent transaction language 1349 indicated in a journal schema 1348. Various journal entries 1327 may represent respective state changes of a replicated state machine of the multi-data-store database implemented using the journal. Conceptually, the current state of the database may be determined by applying the respective state changes indicated in the journal entries 1327 in the order in which the entries were stored (e.g., in CSN order). The journal may thus be considered the authoritative source of the state of the database in various embodiments.

Each of the member materialization nodes 1392 (e.g., data stores 1330A-1330C) of the storage system may typically materialize at least a subset (e.g., one or more partitions of one or more data objects) of the data objects indicated in the journal schema 1348. In at least some embodiments, different materialization nodes may join the database at different points in time. When a materialization node is added to the database (e.g., by registering it as a member using a programmatic interface), the state of the new node may have to be synchronized with the state of the database so that the data objects materialized at the new node correspond to the state indicated for those objects in the journal 1310. As mentioned earlier, one way to do this would be to traverse all the entries of the journal in CSN sequence, applying the respective relevant state changes (i.e., those state changes whose effects are materialized at the new data store) indicated therein at the new data store. Over time, however, the number of journal entries may grow very large, and performing a sequential scan to process all the entries may not be a very efficient approach.

Accordingly, in various embodiment a snapshot manager 1380 may be configured to create various compact snapshots of the journal 1310 over time. Each compact snapshot may comprise a list of entries, e.g., formatted in the same transaction language as is used for the journal entries, corresponding to the set of data objects which may be materialized at one or more of the materialization nodes. In one simple example, consider a scenario in which the database consists of 100000 records at a given point in time T1, and that at least a portion of each of the 100000 records is materialized at one or more of the nodes 1392. Furthermore, assume that the set of journal entries to be considered for inclusion in a snapshot contains only entries corresponding to record modifications (i.e., no entries for journal schema changes, redactions etc. need to be considered in this example). Some or all of the records may have had several writes committed—e.g., an initial write operation to create the record, followed by some number of updates. Also, some records may have been created and deleted, so that the journal itself may include entries for more than 100000 separate records. In this scenario, a journal snapshot created by the snapshot manager 1380 corresponding to time T1 may contain 100000 entries, with each entry comprising a compact state change representation of the corresponding record. The state change representation of a record may be deemed "compact" in that several different changes committed to the record may be represented by a single cumulative state change. For example, consider a given record which was created with the equivalent of the statement "insert into Table 1 (primaryKey, integerAttribute1) values (pk1, int1)" (in the syntax of the transaction language 1349). Following the creation of the record, the value of integerAttribute1 was set to int2 (e.g., using the equivalent of "update Table 1 set integerAttribute1 to int2 where primaryKey=pk1" in the transaction language 1349), then to int3, and then to int4 in respective transactions represented by corresponding journal entries. In a compact state change representation of the record with primary key pk1, the equivalent of the single insert statement "insert into Table 1 (primaryKey, integerAttribute1) values (pk1, int4)" may suffice to represent the creation of the record as well as all the successive changes of integerAttribute1 from int1 to int2 to int3 to int4.

In short, in cases where one or more changes to a data object are overridden by or masked by a subsequent change, the compact state change representation may be able to exclude the overridden state change(s), and only indicate a single cumulative or "net" state change corresponding to the most recent committed state of the data object. In at least some embodiments, each compact snapshot may include an indication of the last CSN represented in that snapshot (i.e., the CSN of the most recent journal entry that was analyzed to generate the compact snapshot). In one embodiment, no entries may be included in the snapshot for data objects that were deleted during the time period (or CSN range) associated with the snapshot. Thus, depending on the mix of database operations (e.g., how many updates are applied to a given data object on average, or how many objects are created and then deleted), the compact snapshot may at least in some cases contain substantially fewer entries than the cumulative collection of journal entries for the data objects in existence at the time of snapshot creation. Synchronizing a newly-added data store using a compact snapshot may often be much more efficient than if all the journal entries were applied in sequence to the new data store. In some embodiments, a compact snapshot may also include an indication of a journal schema version with which the snapshot's entries are compliant or compatible. For example, if a snapshot Snap-x's last CSN is CSN1, and version Vk of the journal schema of the storage system was in effect when the entry with CSN1 was added to the journal, Snap-x may include a representation of version Vk of the journal schema. In at least some embodiments, the syntax and format of all of a given snapshot's entries may correspond to the journal schema version effective at the time that the snapshot was created (i.e., the journal schema version in effect when the entry with the snapshot's last CSN was inserted into the journal). This approach of ensuring that all the entries comply with a single journal schema version may be used in some embodiments even if the set of journal entries from which Snap-x was generated includes one or more journal schema version modification entries.

New snapshots may often be created relative to earlier-created snapshots, e.g., by using the earlier-created snapshots as baselines and adding (or removing) entries based on more recently-committed state changes. In the embodiment depicted in FIG. 13, for example, a baseline compact snapshot 1322A representing state changes in journal entries with CSNs up to 1354A exists at the time that snapshot manager 1380 starts generating a new compact snapshot 1322B. The journal schema version 1324A with which the entries of compact baseline snapshot 1322A are compliant may be indicated in the baseline snapshot. The end-CSN entry 1311A of baseline snapshot 1322A indicates the most recent journal entry whose changes are represented in the baseline snapshot. At the time that snapshot manager starts generating new compact snapshot 1322B, the head entry 1360A of the journal 1310 has a CSN 1354T in the example scenario shown in FIG. 13. Therefore, new compact snapshot 1322B is created using two inputs: baseline snapshot 1322A as input 1333A, and the collection of journal entries which have been added since baseline snapshot 1322A (i.e., entries with CSNs 1354B-1354T) as input 1333B. To produce new compact snapshot 1322B, the snapshot manager may start with the baseline snapshot 1322A in the depicted embodiment, and process the collection of newer journal entries, adding/removing state change representations for each of the data objects of the database as of the state corresponding to CSN 1354T. As described below in further detail, in at least some embodiments, compact snapshots may be created either at the partition level or for the entire journal. In full journal snapshots, the number of entries (with respect to data objects) in new compact snapshot 1322B may correspond to the number of data objects in the multi-data-store database in a state corresponding to CSN 1354T. The end-CSN entry 1311B of the new compact snapshot may therefore indicate CSN 1354T. The entries of the new snapshot 1322B may be compliant with journal schema version 1324B (which may or may not differ from the baseline snapshot's journal schema version 1324A, depending on whether any journal schema modifications are included in the entries with CSNs 1354B-1354T which were processed for generating the new snapshot). In some embodiments, when the storage system is initially brought online (e.g., without any data objects), a special initial snapshot may be created, containing (a) no state change representations and (b) a representation of the initial journal schema version of the storage system. The special initial snapshot may be used as the baseline for the first snapshot which is to include state change entries corresponding to data objects added to the storage system.

In the example scenario shown in FIG. 13, nodes 1330A and 1330B may have joined the database before snapshot 1322A is created, and may not need to be synchronized using a newer compact snapshot. In contrast, data store 1330C joins the database after snapshot 1322B is created. The head entry of the journal has a CSN 1354V at the time that data store 1330C joins. In order to synchronize the state of data store 1330C with the database, the entries of compact snapshot 1322B may be applied to data store 1330C in sync-to-join operation 1332 in the depicted embodiment. After the new data store has been made up-to-date with respect to compact snapshot 1322B, the entries which have been added since compact snapshot 1322B was created (e.g., entries with higher CSNs than the end-CSN of snapshot 1322B) may also be applied to the new data store 1330C in catchup operation 1337.

As suggested in FIG. 13, a snapshot manager 1380 may operate asynchronously with respect to the commit decisions made by the journal manager 1302 in at least some embodiments. That is, a stream of transaction requests may continue to be processed by the journal manager during the time it takes the snapshot manager to create any given snapshot. In some embodiments, the snapshot manager may be implemented as a separate process, thread of execution, or module from the journal manager. In one embodiment, a snapshot manager may comprise one or more threads of execution of a multi-threaded journal manager. The scheduling of the creation of new compact snapshots may differ from one embodiment to another. In some embodiments, for example, one or more programmatic interfaces such as a web-based console, an API, a command-line tool or the like may be implemented to enable client-side components of the database to request the creation of a new snapshot. In one embodiment, new snapshots may be created periodically, e.g., once every X minutes or hours, and/or each time K new journal entries have been added. In the embodiment depicted in FIG. 13, a compact snapshot such as 1322B may be considered cumulative, in that it takes into account all the state changes that have been incorporated into its baseline snapshot 1322A, so that a new materialization node may only need to apply the changes indicated in the most-recently created snapshot. In other embodiments, incremental rather than cumulative snapshots may be created in at least some cases—e.g., snapshot 1322B may not include at least some of the state information incorporated on earlier-created snapshots. In the latter scenario, a new materialization node may have to be synchronized using a combination of several different snapshots. A combination of cumulative and incremental snapshots may be generated in some embodiments—e.g., once a day, a cumulative snapshot may be created, and incremental snapshots based on that cumulative snapshot may be created every six hours.

Figure 14:
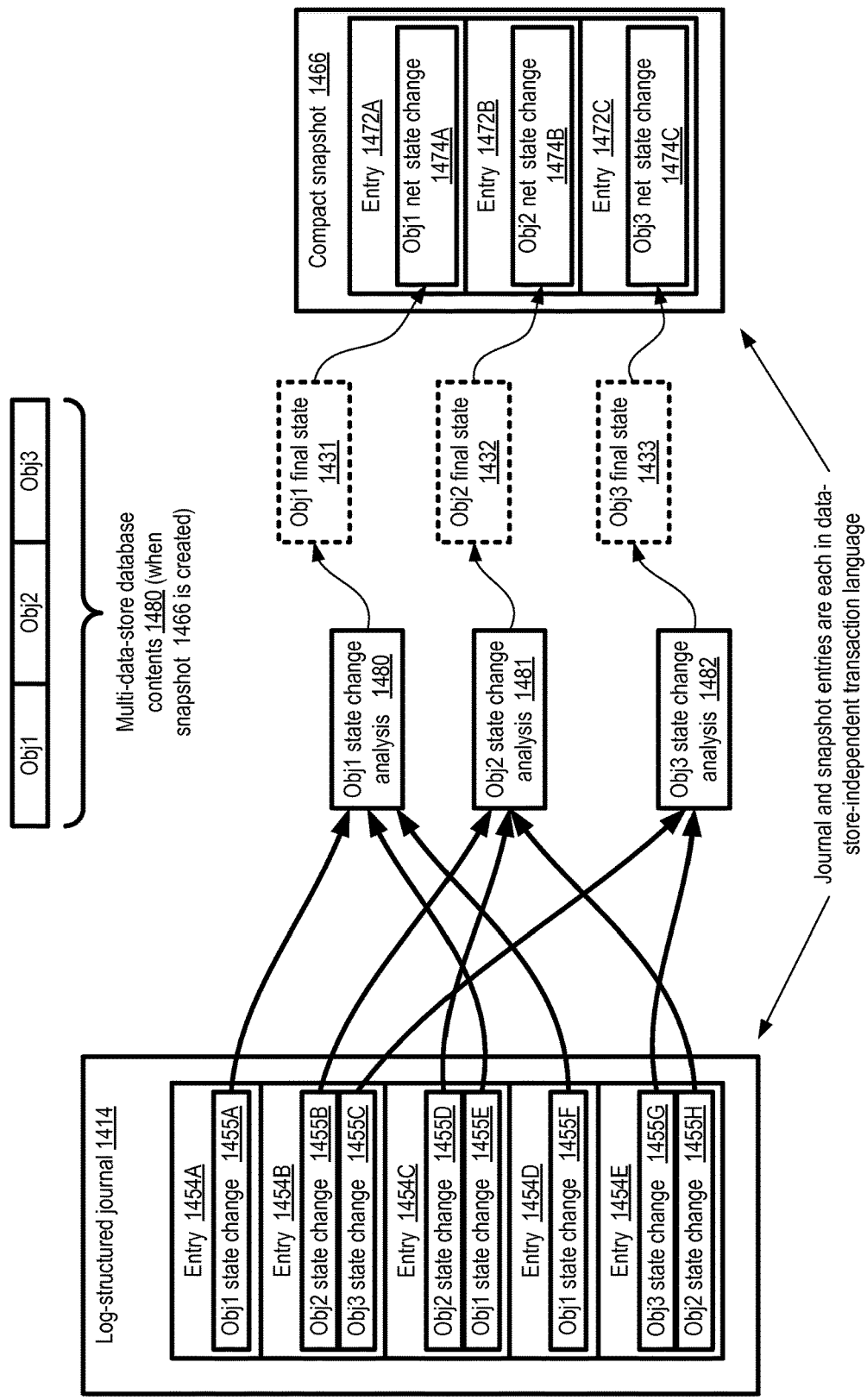
FIG. 14 illustrates example operations that may be performed with respect to each data object of a multi-data-store storage system during snapshot creation, according to at least some embodiments.

FIG. 14 illustrates example operations that may be performed with respect to each data object of a multi-data-store storage system during snapshot creation, according to at least some embodiments. In the extremely simplified scenario depicted in FIG. 14, the multi-data-store database 1480 includes only three objects at the time that a compact snapshot 1466 is created: Obj1, Obj2 and Obj3. No partitioning policy is assumed to be in effect in the example scenario shown in FIG. 14. The collection of committed transaction entries to be processed for the full journal snapshot 1466 comprises entries 1454A-1454E. The snapshot 1466 is the first snapshot created for the database (i.e., there is no baseline snapshot to be consumed as input when generating snapshot 1466) in the example scenario.

To prepare the compact snapshot 1466, the snapshot manager (not shown in FIG. 14) analyzes the entries 1454 in order, identifying all the state changes or write operations that affect each of the data objects. As mentioned earlier, a given committed transaction entry 1454 may in general include writes directed to more than one data object—for example, entry 1454B includes state change 1455B directed to Obj2, as well as state change 1455C directed to Obj3. The snapshot manager's state change analysis 1480 with respect to Obj1 includes consideration of entries 1454A, 1454C and 1454D in the illustrated example. Applying the respective Obj1 state changes (1455A, 1455E and 1455F) indicated in each of those three entries in order, the snapshot manager determines the "final" state 1431 (with respect to snapshot 1466) of Obj1. Similarly, state change analysis 1481 with respect to Obj2 takes the cumulative effects of state changes 1455B, 1455D and 1455H of entries 1454B, 1454C and 1454E respectively into account, arriving at final state 1432 of Obj2. Final state 1432 of Obj3 is determined based on analysis 1482 of state change 1455C (in journal entry 1454B) followed by state change 1455G (in journal entry 1454E).

The snapshot manager generates a respective compact or "net" state change entry corresponding to each data object, and stores three such entries in snapshot 1466—e.g., entry 1472A representing a net state change 1474A to Obj1, entry 1472B representing a net state change 1474B to Obj2, and entry 1472C representing a net state change 1474C to Obj3. The snapshot entries use the same transaction language that is used for journal entries, such that similar machinery or logic to that which is used to apply writes of committed transaction entries in the journal to a given materialization node may be used to apply the entries of the snapshot 1466 in the depicted embodiment. As in the trivial example shown in FIG. 14, the number of entries in a snapshot may often be smaller than the number of journal entries represented in the snapshot. In effect, the work done by the snapshot manager in the embodiment depicted in FIG. 14 may be considered analogous to two transformations for each data object: a first transformation to accumulate effects of all the individual state changes committed to the data object to obtain a "final" state of the data object, and then a transformation of that final state into a net state change request formatted in the data-store-independent language.

Figure 15:
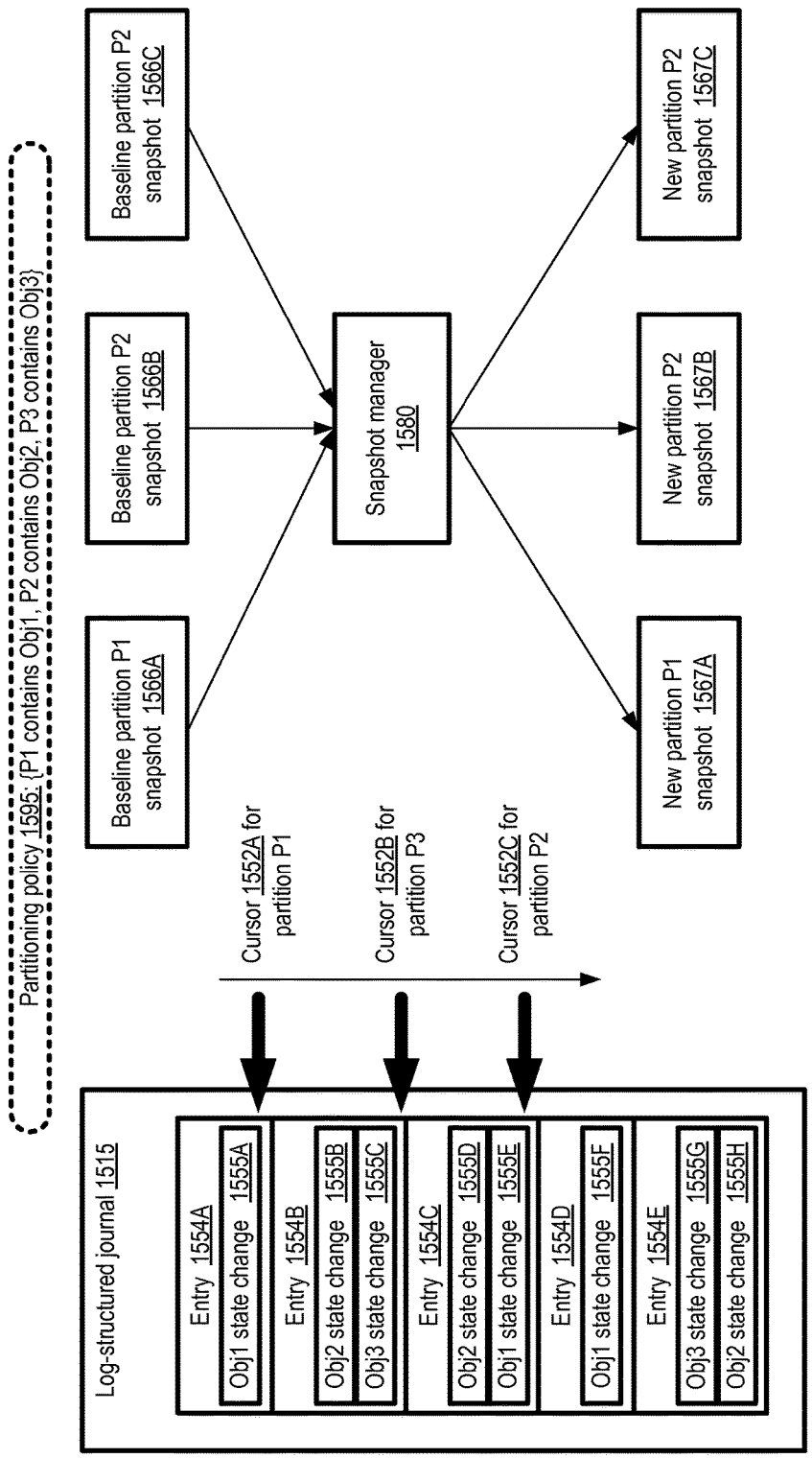
FIG. 15 illustrates the use of partition-based cursors for snapshot creation, according to at least some embodiments.

The concepts related to snapshot creation and usage may be extended to environments in which partitioning algorithms of the kind described earlier may be employed for various data objects and/or or for the database as a whole. FIG. 15 illustrates the use of partition-based cursors for snapshot creation, according to at least some embodiments. In the depicted example, the database comprises objects (e.g., table rows) Obj1, Obj2 and Obj3. According to partitioning policy 1595, partition P1 contains Obj1, partition P2 contains Obj2, and partition P3 contains Obj3. (The partitions may also contain other objects.)

In the embodiment shown in FIG. 15, the snapshot manager 1580 may be requested to create separate new snapshots for each of the three partitions P1, P2 and P3, using the journal entries and baseline snapshots 1566A-1566C. The snapshot manager 1580 may create the new partition-level snapshots independently of each other in some embodiments, maintaining respective cursors 1552A-1552C which examine the journal entries in sequence and extract the committed state changes corresponding to each partition's data objects. The net state change corresponding to ObjA (obtained by analyzing baseline snapshot 1566A and the entries of the journal which affected ObjA, such as entries 1554A, 1554C and 1554D) may be included in new compact snapshot 1567A. Similarly, the net state change of Obj2 (derived from baseline snapshot 1566B and entries 1554B, 1554C and 1554E) may be indicated in new compact snapshot 1567B, and the net state change to Obj3 (obtained from baseline snapshot 1566C and entries 1554B and 1554E) may be represented in new compact snapshot 1567C. Respective cursors 1552 may be created for each horizontal, vertical or hybrid partition for which compact snapshots are to be obtained in various embodiments.

In at least some embodiments, a snapshot manager such as 1580 may be capable of generating snapshots from the materialization nodes, and not just from the journal. Thus, for example, if partition P1 is materialized at node N1, a snapshot manager may generate snapshot entries for P1 from either the journal or node N1, and both types of snapshots may be formatted in the same transaction language that is used for committed transaction entries of the journal. Such a snapshot manager may also be used to detect discrepancies (if any exist) between the authoritative state of a database partition as indicated by the journal, and the materialized representation of the database partition. If such discrepancies are found, the deviating materialization node may be resynchronized using the journal-derived snapshot.

Figure 16:
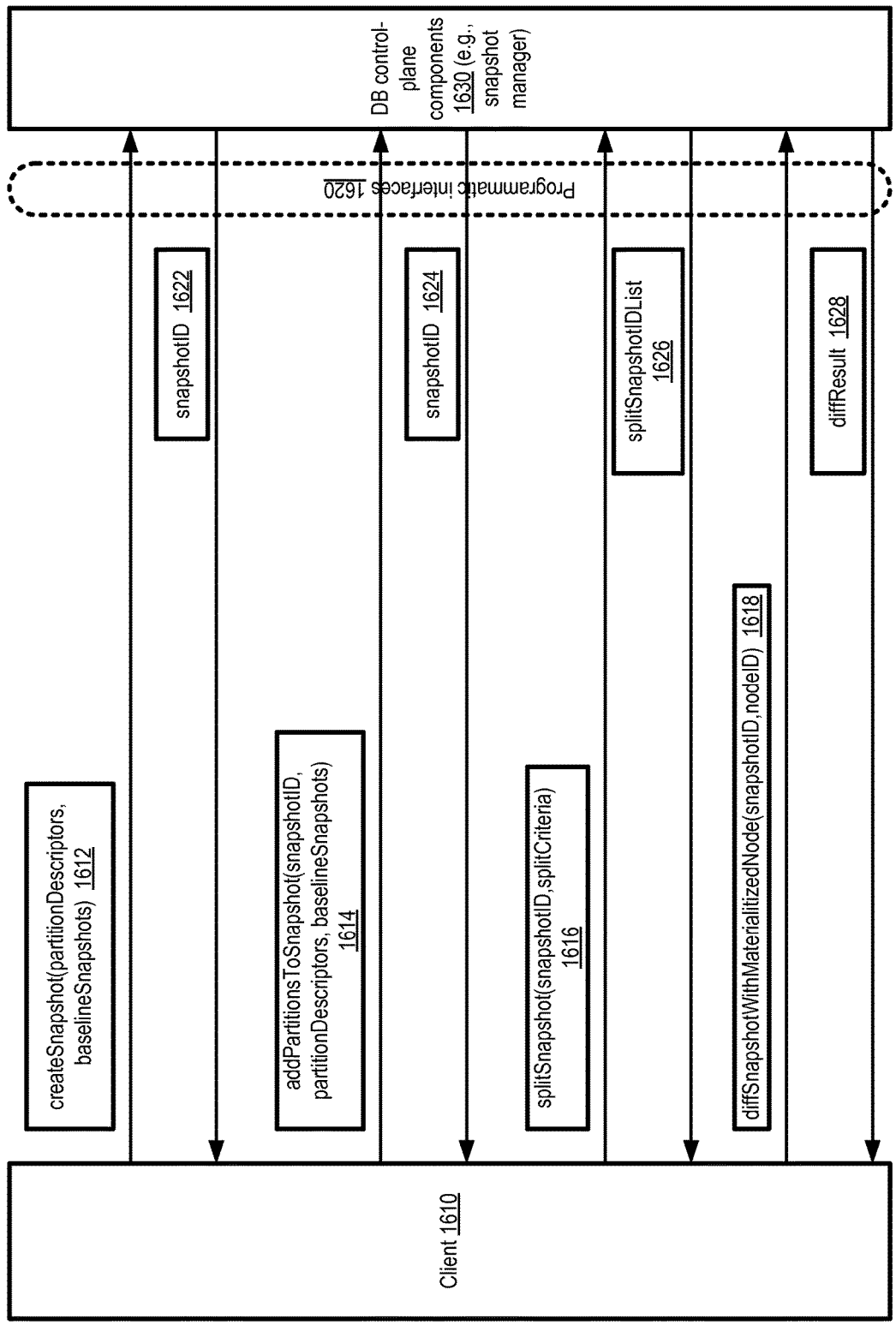
FIG. 16 illustrates example snapshot-related interactions between clients and control plane components of a multi-data-store storage system, according to at least some embodiments.

FIG. 16 illustrates example snapshot-related interactions between clients and control plane components of a multi-data-store storage system, according to at least some embodiments. A snapshot manager, which may be instantiated as a control plane component 1630 of the storage system, may implement a set of programmatic interfaces 1620 (e.g., APIs, web-based consoles, command-line tools, graphical user interfaces, or the like) to enable clients 1610 to submit snapshot-related requests. As shown, a client 1610 may submit a createSnapshot request 1612 via interfaces 1620, which may indicate (via the partitionDescriptors parameter) the set of partitions to be included in the snapshot, and/or a set of baseline snapshots (via the baselineSnapshots parameter) from which the new snapshot is to be derived. The client may select any combination of partitions, e.g., including horizontal, vertical or hybrid partitions, to be included in the snapshot. In at least some embodiments, the client may be able to request the creation of a snapshot of the entire journal (e.g., all the partitions, if any partitions have been created), e.g., by using a keyword "allPartitions" or the like. In one implementation, a materialization node may not necessarily have been established for a given partition (or set of partitions) for which a snapshot is requested by client 1610—that is, the partitionDescriptors may indicate a selection and/or projection criterion to be used to determine the entries of the requested snapshot, without requiring that the snapshot defined by those criteria already be materialized separately from the rest of the database content. In response to the createSnapshot request, after generating and storing the requested snapshot using the techniques described above, the control plane component 1630 may transmit an identifier 1622 of the newly-created snapshot to the client 1610.

In at least some embodiments, a client 1610 may request the addition of one or more partitions to an existing snapshot, e.g., by submitting an addPartitionsToSnapshot request 1614 indicating the snapshot to which the partitions are to be added (identified by the snapshotID parameter), the partitions to be added (indicated by the partitionDescriptors parameter), and any baseline snapshots to be used to add the partitions (indicated by the baselineSnapshots parameter). In some embodiments, if the target snapshot identified by snapshotID parameter already contains the data of a partition P1 indicated in the partitionDescriptors parameter, the inclusion of P1 in the partitionDescriptors parameter may be ignored. In order to add the contents of a partition to an existing snapshot, the snapshot manager may instantiate a cursor corresponding to the to-be-added partition at a point in a journal selected in view of the ending CSN of the corresponding baseline snapshot, examine the committed transaction entries as though a new snapshot of the partition were being created, and combine the entries corresponding to the added partition with those of the pre-existing snapshot in the depicted embodiment. The identifier 1624 of the resulting snapshot may be provided in response to the createSnapshot request 1614.

A splitSnapshot request 1616 may be submitted by client 1610, indicating criteria to be used to split an existing snapshot into a plurality of partition-based snapshots. The splitCriteria parameter may indicate, for example, the same type of horizontal and/or vertical partitioning descriptors that were discussed in the context of the materialization configuration request shown in FIG. 7. The snapshot manager may subdivide the existing snapshot identified by the snapshotID parameter, and return a list 1626 of snapshot IDs of the resulting snapshots.

In some embodiments, the snapshot manager may create snapshots from either a journal or from a materialization node, as mentioned earlier. A diffSnapshotWithMaterializedNode request 1618 to determine the difference between the set of entries of an existing snapshot, and a snapshot obtained from a specified materialization node, may be submitted via programmatic interface 1620 in the depicted embodiment. In response, the snapshot manager may generate a new snapshot from the materialization node if no pre-existing node-based snapshot is available, compare the entries of the node-based snapshot with the journal-based snapshot indicated by the snapshotID parameter, and return the results of the comparison in the form of a diffResult message 1628 to the client 1610.

Methods for Partitioning-Based Materialization Scaling

Figure 17:
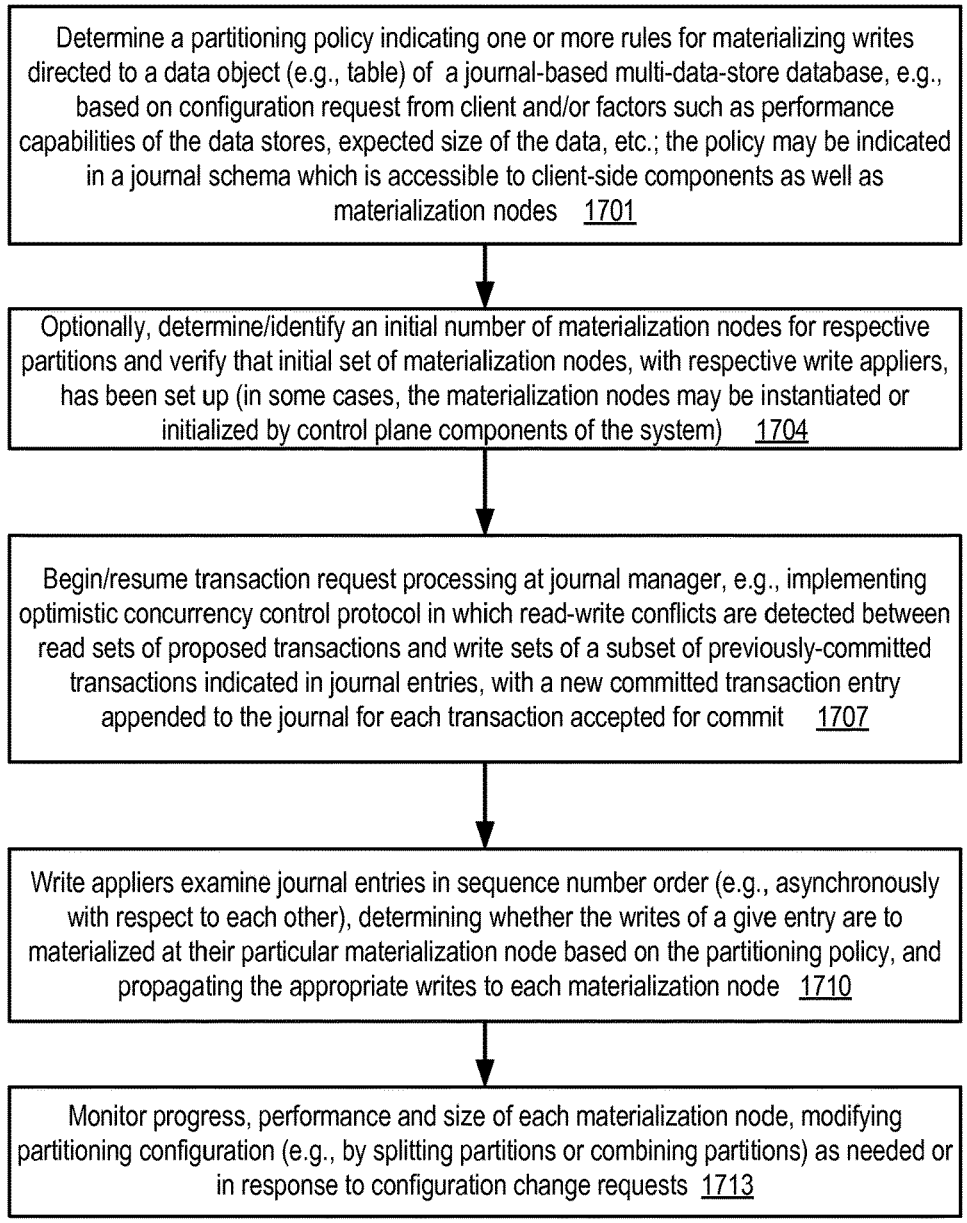
FIG. 17 is a flow diagram illustrating aspects of operations that may be performed at control plane components of a multi-data-store storage system to manage scalability of data object materialization operations, according to at least some embodiments.

FIG. 17 is a flow diagram illustrating aspects of operations that may be performed at control plane components of a multi-data-store storage system to manage scalability of data object materialization operations, according to at least some embodiments. As shown in element 1701, a partitioning policy to be used to distribute the data materialization workload of a journal-based multi-data-store database may be determined, e.g., by control plane components of the database such as a scalability manager. In some embodiments the partitioning policy may be derived from or indicated in client-submitted configuration requests, while in other embodiments the control plane components may determine the partitioning policy without specific client-provided directives or preferences. In some cases a partitioning policy may be determined for a data object before any writes to the data object have been proposed, e.g., at the time that the data object is created; in other cases, a partitioning policy may be determined after at least a portion of the object has been created and/or materialized (in which case the rules of the policy may be applicable to writes which are committed after the policy is determined). A partitioning policy may include one or more rules to be used to determine the partitions to which various portions of a data object are to be mapped, and/or the particular materialization nodes at which a given partition is to be stored. The partitioning rules may be based, for example, on attribute values (which may correspond to horizontal partitions of the data object), or on attribute groups (which correspond to vertical partitioning). Both attribute value based partitioning rules and attribute group based partitioning rules may be included in a given partitioning policy in some embodiments. In at least some embodiments the partitioning policy may be based on storage space considerations (e.g., so that growing data sets can be materialized across the storage devices of multiple data stores) and/or on performance considerations (e.g., so that the rate at which writes are materialized at any given node remains relatively balanced with respect to other nodes, or remains below a threshold).

In one embodiment, the partitioning policy may be indicated in a journal schema of the database, which may be accessible by transaction-submitting client-side components and/or by the write appliers of various materialization nodes. The write appliers, which may typically examine the writes of committed transaction entries of the journal in sequential order, may choose the particular writes to be propagated to their respective materialization nodes based on the partitioning policies. The client-side components may utilize the partitioning policies to select the particular materialization nodes to which reads should be directed, and/or to prepare transaction request components submitted to the journal manager for commit analysis.

In some embodiments, policies for horizontal partitioning of the contents of the database (in which, for example, all the attributes of a given row of a table are assigned to the same partition, and different groups of rows are assigned to respective partitions based on some or all attributes which collectively form the primary key of the table), vertical partitioning (in which, for example, subgroups of attributes, rather than all attributes, may be included in respective partitions) or combinations of horizontal and vertical partitioning may be implemented. Partitioning policies may indicate two types of mappings in some implementations: a first mapping that is used to assign, for a given subset of the data contents of the storage system (e.g., values of one or more attributes of a given row of a table), the particular partition to which the subset is assigned, and a second mapping which indicates the particular materialization node at which the subset of data is to be stored or materialized. In some embodiments, each partition may be assigned its own materialization node, while in other embodiments, several partitions of a given data object such as a table may be materialized at the same node.

For a given partitioning policy to be enforced, a plurality of materialization nodes may be required. For example, if one of the attributes Attr1 which forms a subset of a particular table's primary key can take on one of four values V1, V2, V3 and V4, and separate partitions with corresponding materialization nodes are to be established for each of the four distinct Attr1 values, four materialization nodes may be required. In some embodiments, control plane components of the storage system (such as a scalability manager) may be responsible for determining the appropriate initial number of materialization nodes, and verifying that a set comprising at least the initial number of materi-alization nodes (with respective write appliers) have been instantiated (element 1704). In some implementations, the clients on whose behalf a partitioning policy is implemented may be responsible for setting up the appropriate set of materialization nodes, and the control plane components may be provided metadata identifying the materialization nodes (e.g., via IP addresses, ports, process identifiers, and the like). In other embodiments, especially in scenarios in which the details of the partitioning policies are determined by the control plane components rather than by the clients, the control plane components may establish or instantiate the needed materialization nodes. Depending on the partitioning policy, the number of materialization nodes may be changed over time in at least some embodiments (e.g., in response to changing workloads or client-submitted configuration change requests).

After the set of materialization nodes needed for the partitioning policy has been established, the processing of transaction requests may be begun (element 1607). Transaction requests conforming to the current version of the journal schema may be submitted by client-side components to a journal manager of the storage system. The journal manager may implement an optimistic concurrency control protocol involving read-write conflict detection. To determine whether a given transaction has conflicts, the journal manager may check whether contents of a read set indicated in the transaction request (with one or more reads directed to one or more partitions of the data) may have been overwritten by writes of committed transactions indicated in a subset of the journal entries, where the subset of entries being selected based on a conflict check delimiter indicated in the transaction request. If no conflicts are found, the transaction may be accepted for commit, and a new committed transaction entry may be appended to the journal.

Asynchronously and/or independently with respect to each other and with respect to the addition of any given entry to the journal, the write appliers associated with the materialization nodes may process the entries of the journal (e.g., in commit sequence number order) in the depicted embodiment (element 1610). The writes indicated in a given journal entry may be checked in view of the partitioning policy to determine whether the writes affect the partition(s) of the materialization node(s) with which a given write applier is associated. If a given write belongs to the partitions for which the write applier is configured, that write may be propagated to the write applier's materialization node, and a record representing the write may be stored at the materialization node's storage devices. The control plane components may monitor the progress of data materialization at the various nodes, collecting various performance (e.g., response time or throughput) and data size metrics (element 1613). Depending on the partitioning policies in effect and/or based on additional configuration requests from clients, the partitioning configuration may be modified over time—e.g., by merging/combining partitions or splitting existing partitions in the depicted embodiment.

Figure 18:
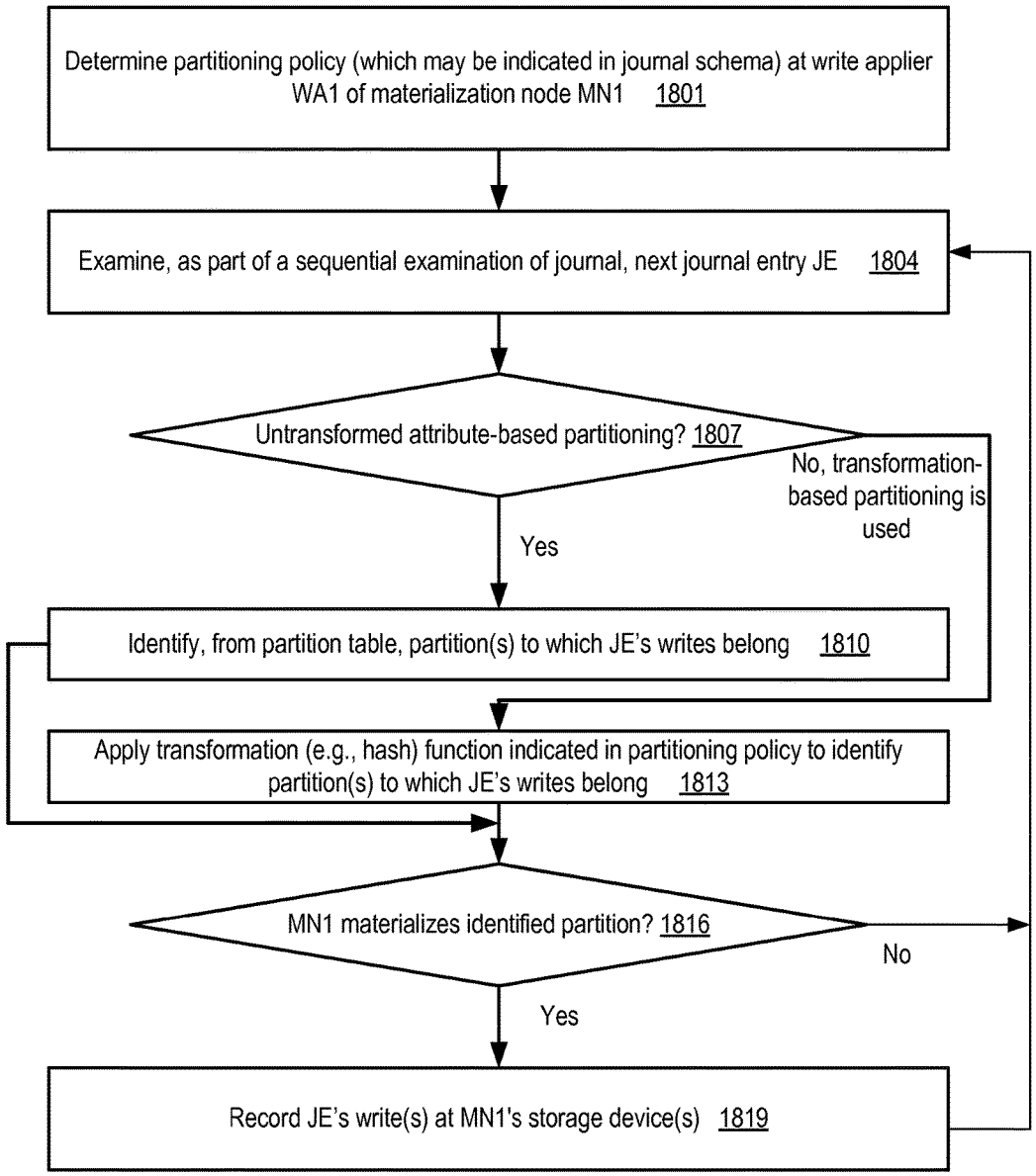
FIG. 18 is a flow diagram illustrating aspects of operations that may be performed at a write applier of a multi-data-store storage system at which partitioning policies are implemented, according to at least some embodiments.

FIG. 18 is a flow diagram illustrating aspects of operations that may be performed at a write applier of a multi-data-store storage system at which partitioning policies are implemented, according to at least some embodiments. As shown in element 1801, a given write applier WA1 may determine the partitioning policy applicable to it, e.g., from a materialized version of a journal schema which may be stored at the materialization node MN1 with which the write applier is affiliated, and/or from configuration metadata used to instantiate WA1. WA1 may be responsible for processing the committed transaction entries of a journal of the storage system in sequence number order, at least some of which may indicate one or more writes. During the processing, a particular journal entry JE may be examined (element 1804) by WA1.

If an untransformed-attribute-value-based partitioning policy is being used (as detected in element 1807), the values of one or more attributes indicated in JE may be examined to determine the partition(s) to which the writes of JE belong (element 1810), e.g., using a partition table similar to that shown in FIG. 6. If a transformation-based partitioning policy is in effect (as also detected in element 1807), selected attribute values indicated in JE may be provided as input to one or more transformation functions (e.g., hash functions indicated in the policy), and the output of the transformation functions may be used to identify the partition(s) to which JE's writes belong (element 1813).

The write applier WA1 may then determine whether the partition(s) identified for the JE writes are among the partitions stored/materialized at MN1 (element 1816). If a given write belongs to a partition materialized at MN1, the write may be directed to MN1, and a record of that write may be stored at MN1's storage device(s). After the write(s) have been propagated to MN1, or if none of the writes of JE affect any of the partitions materialized at MN1, the write applier may process the next entry of the journal—i.e., the operations corresponding to elements 1804 onwards may be repeated. In some embodiments, the write applier may determine (e.g., during the normal course of its sequential journal processing) whether a given journal entry indicated a committed change to the partitioning policy itself. If such a partitioning policy change is detected, the write applier may process subsequent journal entries in accordance with the change. In other embodiments, a materialization node component such as a data store manager responsible for materializing journal schema changes (which may include partitioning policy changes) may inform a write applier such as WA1 if/when the partitioning policy or policies affecting the write applier are modified Journal Forking As described above, a single journal manager may perform commit analysis for transactions associated with a number of materialization nodes in various embodiments, appending committed transaction entries in sequence number order to a single logical journal (with several replicas of the journal being maintained in some implementations in the form of a replication DAG). As the workload of the storage system grows and the number of committed transaction entries increases, a single journal and/or a single journal manager may no longer be sufficient to meet the service level requirements of customers of the storage system. In some cases, the applications built using the storage system may also evolve such that it may become advantageous to separate the processing of some subsets of the data from the processing of other subsets of the data. Furthermore, committed transaction entries that were stored a long time ago may be accessed relatively infrequently; thus, retaining very old entries in the same journal as more recent entries may not be particularly cost-effective. For these and other reasons, a mechanism to safely branch off new journals from existing journals for various subsets or portions of the data, while maintaining desired data consistency and durability levels for all of the data may be supported in at least some embodiments.

Figure 19:
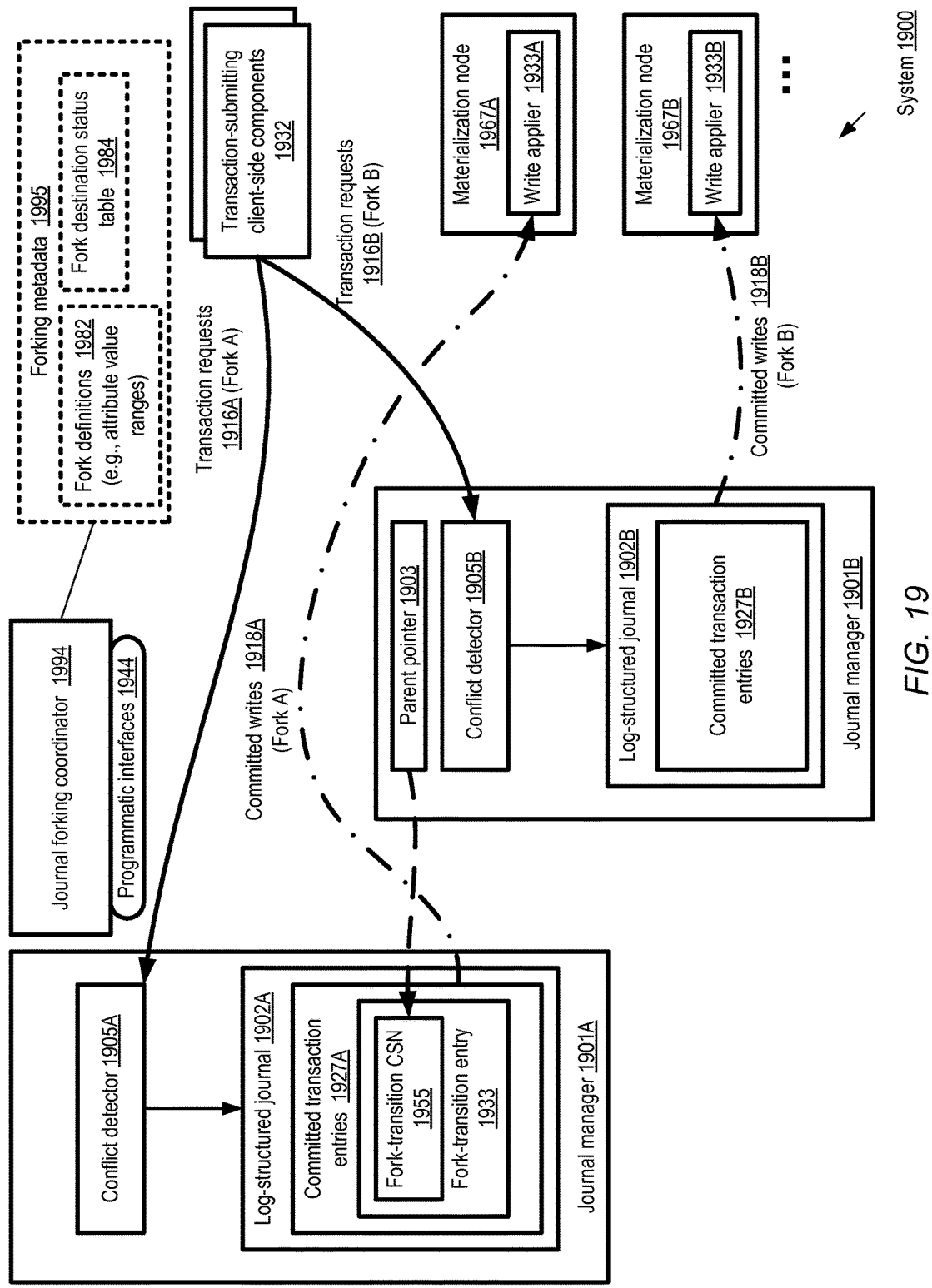
FIG. 19 illustrates an example system environment in which a new journal may be forked from a parent journal of a multi-data-store database, according to at least some embodiments.

FIG. 19 illustrates an example system environment in which a new journal may be forked from a parent journal of a multi-data-store database, according to at least some embodiments. In system 1900, committed transaction entries 1927 associated with all the data of a multi-data-store database may initially be stored at a single journal 1902A, e.g., after conflict detector 1905A has performed commit analysis on transaction requests received from client-side components 1932. Initially, respective write appliers such as 1933A or 1933B for materialization nodes 1967A and 1967B may each examine the contents of journal 1902A sequentially, and apply the relevant subset of writes identified in committed transaction entries 1927A at the materialization nodes. In some embodiments, contents of the database may be materialized based on a partitioning policy of the kind described earlier—e.g., materialization node 1967A may store one partition, while materialization node 1967B may store a different partition.

The control plane of the multi-data-store storage system may include a journal forking coordinator 1994 in the depicted embodiment. The forking coordinator 1994 may determine that a forking criterion has been met with respect to journal 1902, and orchestrate a transition to the use of a second journal 1902B for a subset of the database, such that committed transaction entries pertaining to that subset of the database and approved after a certain point in time are stored at the second journal 1902B. The second or forked journal 1902B may be referred to as the child journal with respect to the original or parent journal 1902A. The subset or portion of the data for which committed transaction entries are stored in child journal 1902B is referred to as fork B in the context of FIG. 19, while the remainder of the data, for which committed transaction entries continue to be added to parent journal 1902A, is referred to as fork A. Child journal 1902B may contain a parent pointer 1903 indicating a fork-transition entry 1933 of the parent journal. For example, the commit sequence number (CSN) of the fork-transition entry, labelled fork-transition CSN 1955 in FIG. 19, may be indicated in the parent pointer in some embodiments. The forking transition entry 1933 may represent the final committed entry stored in parent journal 1902A with respect to fork B—that is, entries corresponding to fork B with sequence numbers smaller than or equal to the fork-transition CSN 1955 may be found in parent journal 1902A, and entries corresponding to fork B with sequence numbers greater than fork-transition CSN 1955 may be found in child journal 1902B.

The forking coordinator 1994 may implement a set of programmatic interfaces 1944 in the depicted embodiment, which may be used by clients of the database to submit forking requirements and/or to indicate forking-related preferences. In at least some embodiments, forking metadata 1995 accessible to client-side components 1932 may include the definitions 1982 or boundaries of the subsets or forks of the database, and the current status of various destination journals (e.g., in a fork destination status table 1984). The metadata records 1995 may be generated and updated by the forking coordinator during the implementation of an algorithm which ensures that committed transaction data is not lost or stored in the wrong journal, as described below in further detail. During at least one phase of the transition to a forked journal environment, transaction processing associated with the fork B (the portion of the database for which the new journal is being created) may be temporarily suspended or deferred in some embodiments, while transaction processing associated with the remainder of the database may continue without interruptions or deferrals. The fork destination status table 1984 may indicate whether processing is currently suspended with respect to any of the forks, and the particular journal managers (e.g., 1901A for the parent journal, and 1901B for the child journal) responsible for commit processing associated with each fork. In addition to the client-side components 1932 which may use the forking metadata 1995 to identify the particular journal manager 1901 to which they should submit any given transaction request, the forking metadata 1995 may also be used by the write appliers 1933 to determine which journal (e.g., the parent journal or the child journal) should be examined to apply writes corresponding to forks A and B. The propagation of committed writes may be suspended temporarily for one of the forks (such as fork B) during the transition to the multi-fork environment in at least some embodiments, e.g., while the new journal 1902B is being instantiated and configured. As a result of examining the metadata 1995, a write applier 1933 may defer examination and/or write propagation of one or more journal entries in the depicted embodiment. Similarly, based on the contents of metadata records 1995, a client-side component 1932 may defer preparation and/or submission of a particular transaction request.

In the scenario depicted in FIG. 19, after the child journal 1902B has been set up and the forking metadata 1995 has been updated by the forking coordinator to indicate that transaction processing with respect to fork B can be resumed, a transaction-submitting entity such as a client-side component 1932 may direct some transaction requests (e.g., transaction requests 1916A associated with fork A) to the parent journal manager 1901A, and other transaction requests (e.g., transaction requests 1916B associated with fork B) to the child journal manager 1901B. Write appliers for fork A may read committed transaction entries from journal 1902A (as indicated by arrow 1918A). With respect to fork B, write appliers may read committed transaction entries with sequence numbers greater than the fork-transition CSN 1955 from journal 1902B. If and when entries for fork B with sequence numbers smaller than or equal to fork-transition CSN 1955 have to be read, the parent-pointer 1903 may indicate that such entries are to be read from parent journal 1902A. For example, if a transaction request 1916B is received at journal manager 1901B with a conflict check delimiter sequence number smaller than fork-transition CSN 1955, journal manager 1901B may examine at least some entries of journal 1902A to perform commit analysis for the transaction in the depicted embodiment.

In at least some embodiments, attribute values or value ranges may be used to define the boundaries of various forks, in a manner analogous to the definition of horizontal partitions discussed above. However, partitioning for materialization purposes may be implemented independently of journal forking in at least some embodiments. That is, partitioning policies may be used whether journal forking is used or not, and journal forking may be used regardless of whether the data is partitioned across multiple materialization nodes. Furthermore, in embodiments in which materialization partitioning and journal forking are both being used, the boundaries of partitions used for materialization workload distribution need not necessarily match the boundaries of forks defined in the context of journal forking. Multiple child journals may be instantiated from the same parent journal in some embodiments, in effect distributing the transaction processing and committed transaction entry storage workload among a plurality of resources. For example, if one attribute Attr1 of a table can take on any one of values V1, V2, V3 or V4, four forked child journals (each corresponding to V1, V2, V3 or V4) may be set up for Attr1-based subsets or portions of the database. Multi-level forking may be supported in at least some embodiments. For example, if child journal CJ1 is forked from parent journal PJ1, another child journal CJ2 may be forked from child journal CJ2 as needed. In at least some embodiments in which several different child journals (CJ1, CJ2, . . . ) are forked from a given parent journal PJ1, the child journals may each be forked one at a time using the phased approach described below. In other embodiments, multiple child journals corresponding to respective forks may be instantiated or configured in parallel. In at least some embodiments, a parent journal may be "retired" (e.g., eventually taken offline) after a sufficient set of child journals have been forked from it, such that no new transaction requests have to be handled at the parent journal manager.

Figure 20:
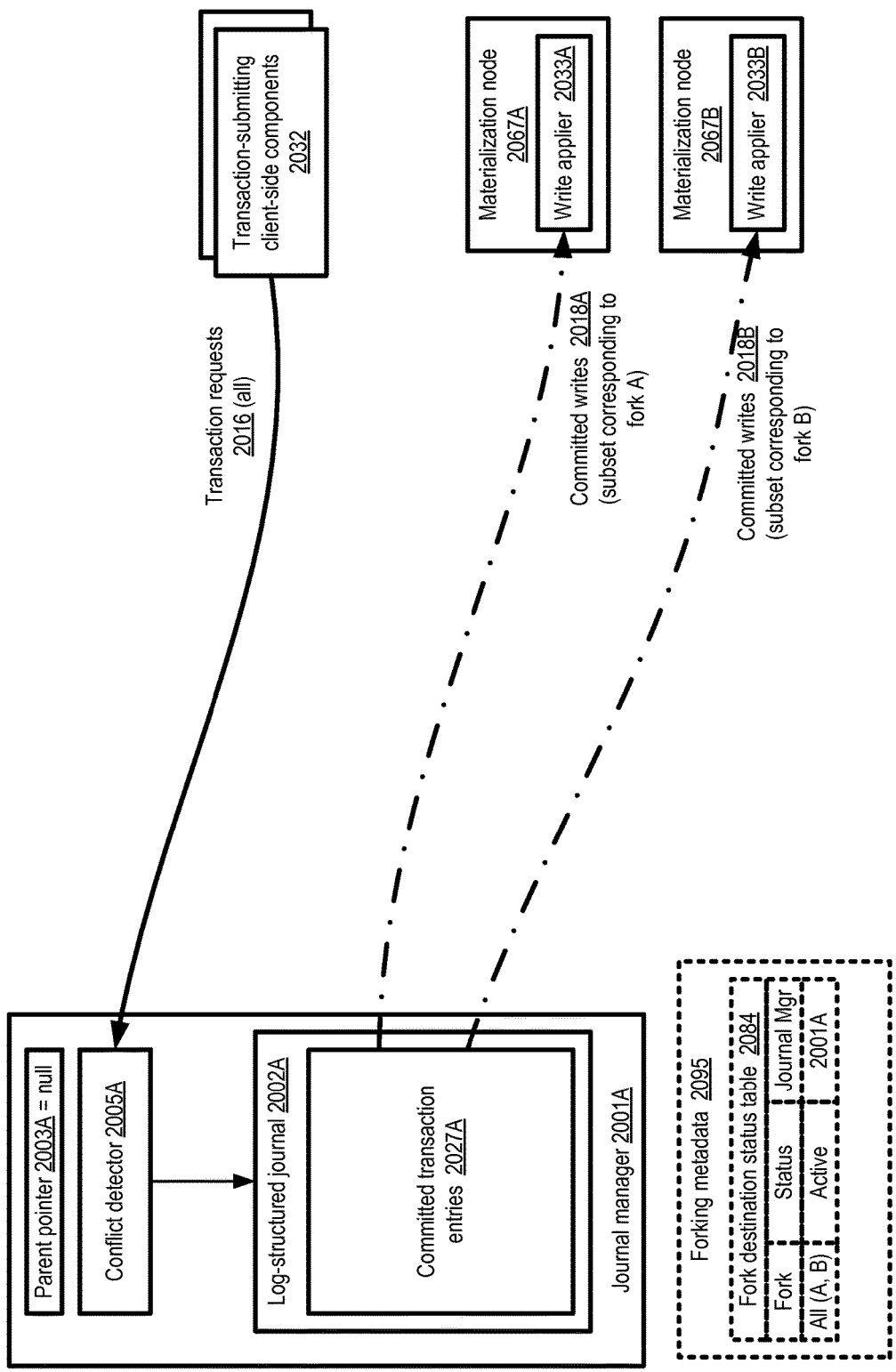
FIG. 20-23 collectively illustrate the execution of an algorithm for forking new journals at a multi-data-store storage system, according to at least some embodiments.

FIG. 20-23 collectively illustrate the execution of an algorithm for forking new journals at a multi-data-store storage system, according to at least some embodiments. The state of the system prior to any forking operations is illustrated in FIG. 20. The forking metadata 2095 indicates that transaction processing operations for the entire database are currently permitted (as indicated by the "Active" status for "All" forks), and that journal manager 2001A is the destination to which transaction requests for the entire database should be submitted. Accordingly, a client-side component 2032 may submit a transaction request 2016 (with writes directed to any part of the database) to journal manager 2001A. The conflict detector 2005A may examine the read set of a proposed transaction, select a subset of previously-committed transaction entries 2027A from journal 2002A based on a conflict check delimiter indicated in the proposed transaction, and determine whether a conflict exists between the read set of the proposed transaction and the write sets of the subset of entries. If no conflict is detected, the transaction request may be accepted for commit, and a new committed transaction entry 2027 may be appended to the journal 2002A. Write appliers 2033A and 2033B may each independently examine the committed transaction entries 2027A of journal 2002A in sequence number order, and propagate the appropriate set of committed writes 2018 (e.g., writes 2018A and 2018B) to nodes 2067A or 2067B for materialization. In the scenario depicted in FIG. 20-FIG. 23, a subset of the writes corresponding to fork A (which may not yet have been defined in forking metadata 2095, but may for example be defined in a partitioning policy) is materialized at node 2067A, and a subset of the writes corresponding to a different fork B (which may not yet have been defined in forking metadata 2095) is materialized at node 2067B. In some embodiments, each journal manager may store a respective parent pointer, such as parent pointer 2003A of journal manager 2001A. The parent pointer may be set to null for journals which have not been forked from other journals. In some embodiments, prior to any forking decisions, forking metadata of the kind shown in FIG. 20 may not have to be stored explicitly; that is, the information indicated in metadata 2095 may be implicit (or indicated in non-forking-related metadata associated with journal 2002A) rather than explicit prior to the first forking with respect to journal 2002A.

Figure 21:
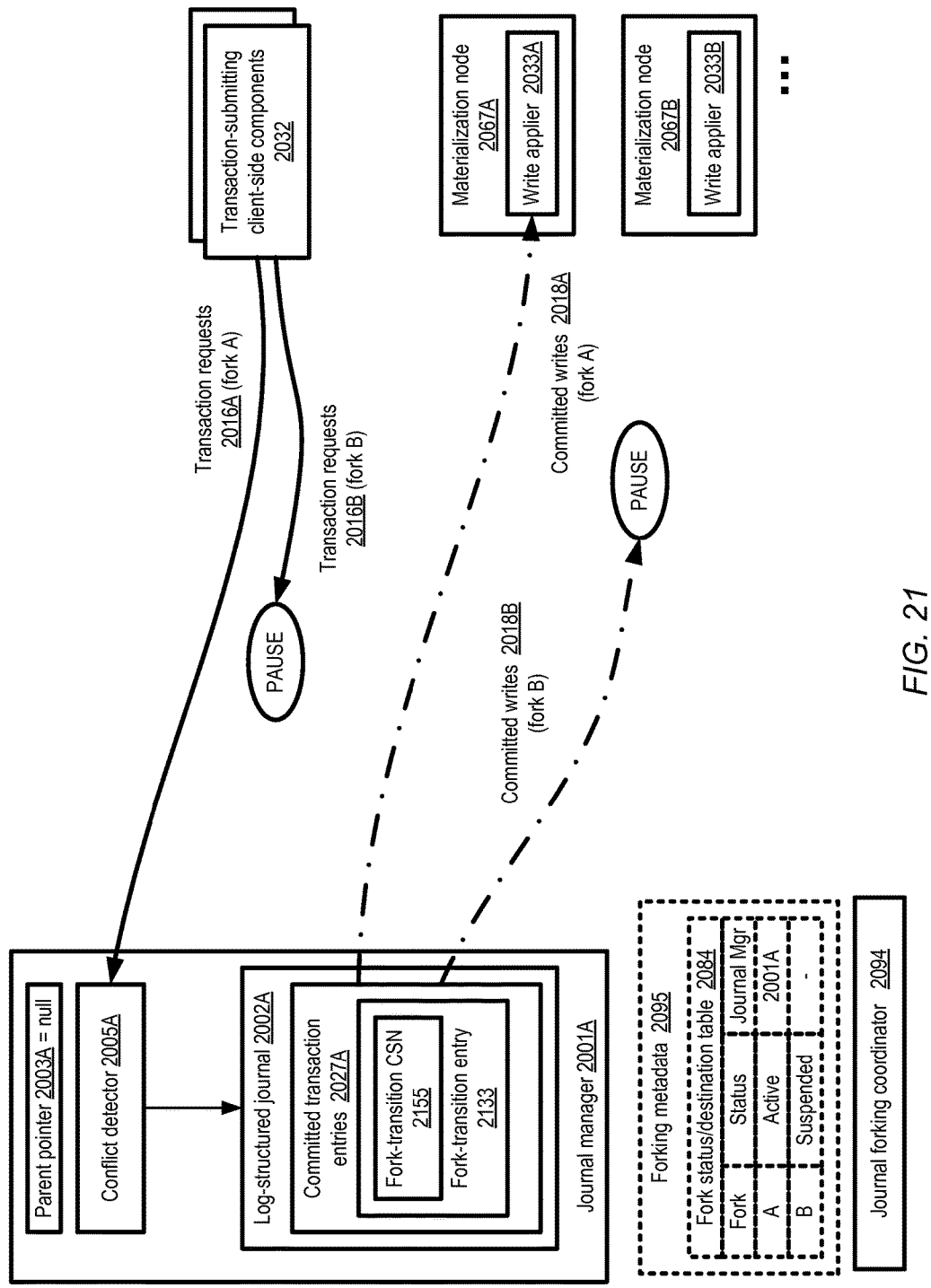

In the state of the system illustrated in FIG. 21, a forking coordinator 2094 has determined that journal 2001A is to be forked, e.g., based on one or more system-defined or client-defined forking criteria and/or on a client request. The definition of a new fork (fork B) of the data, e.g., in terms of values of one or more attributes of one or more data objects, may be stored in forking metadata 2095. In some embodiments, an explicit definition of fork A (corresponding to data which is not included in fork B) may also be stored in forking metadata 2095. In other embodiments, any data for which a fork definition is not explicitly indicated may be considered part of a "remainder" fork (e.g., fork A). As shown, the status of fork B may be indicated as "suspended" in metadata 2095, e.g., to enable the forking coordinator to perform the operations required to instantiate and configure a forked or child journal. The status of fork A may remain active, and journal manager 2001A may be indicated as the destination for transaction requests associated with fork A.

Based on the contents of metadata 2095, transaction requests 2016A directed to fork A may continue to be transmitted to journal manager 2001A by client-side components 2032. However, due to the "suspended" status of fork B indicated in metadata 2095, transaction requests directed to fork B may be deferred or paused. Similarly, the propagation of writes 2018A with respect to fork A by write applier 2033A may continue, and the propagation of writes 2018B with respect to fork B may be deferred or paused. In the depicted embodiment, the forking coordinator may identify the last committed transaction entry associated with fork B which was appended to journal 2001A prior to the suspension of transaction requests 2016A, and designate that entry as the fork-transition entry 2133. The sequence number of entry 2133 may be designated as the fork-transition sequence number 2155. In at least some embodiments, the fork-transition sequence number 2155 may be indicated in the forking metadata 2095. In at least one embodiment, after the status of fork B is set to "suspended" in metadata 2095, any new transaction requests directed to fork B which are received at journal manager 2001A may be rejected.

Figure 22:
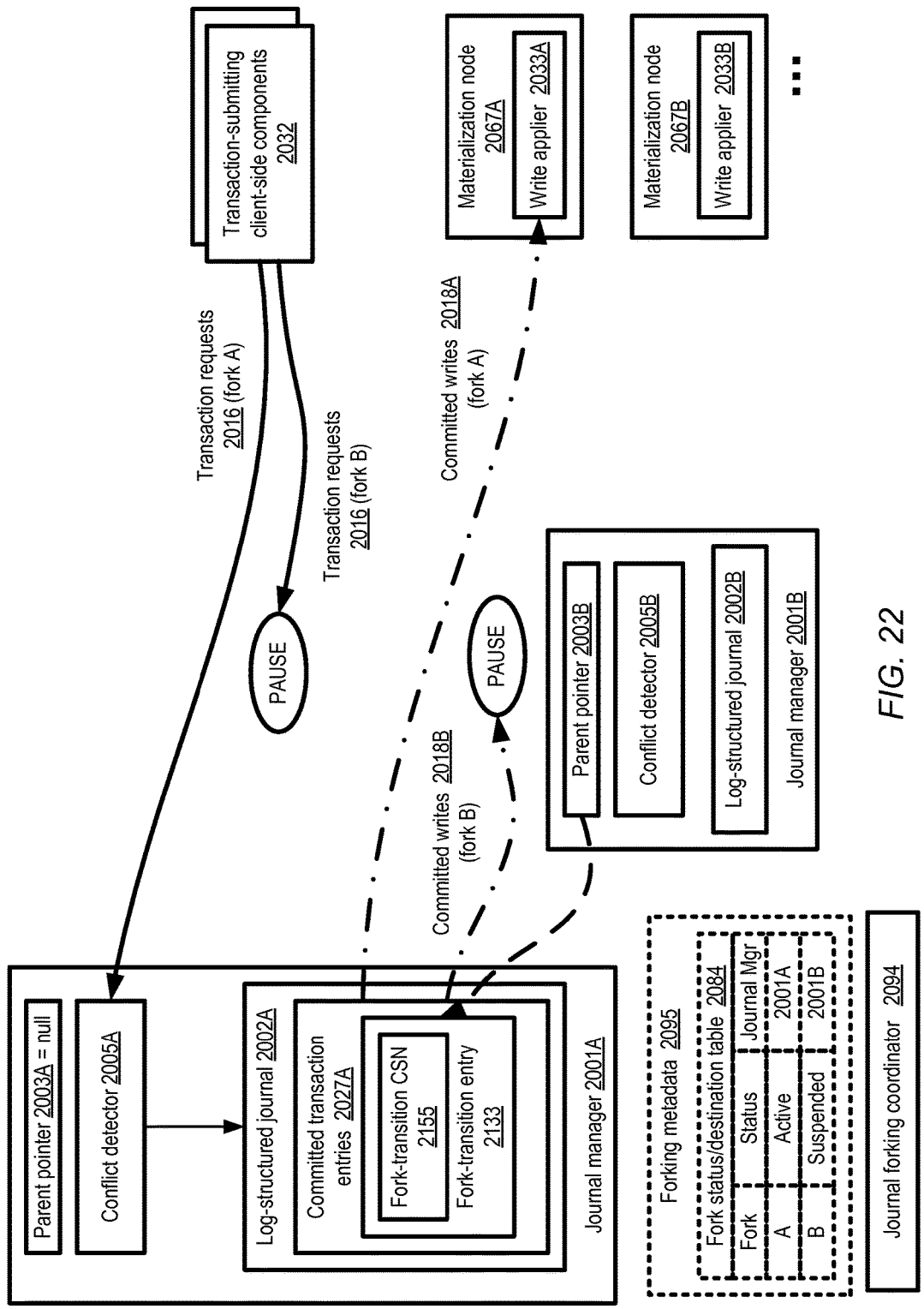

After temporarily suspending processing of transactions associated with fork B, the forking coordinator 2094 may instantiate and perform initial configuration operations on a forked journal 2002B with journal manager 2001B, as indicated in FIG. 22. In implementations in which replication DAGs of the kind shown in FIG. 12 are used for journals, a plurality of DAG nodes may be set up for journal 2002B. Parent pointer 2003B may be set to indicate the fork-transition entry 2133, a conflict detector 2005B may be established, and the required networking configuration (e.g., IP (Internet Protocol) address assignment etc.) to enable traffic to and from journal manager 2001B to flow may be performed. The forking metadata 2095 may be updated to indicate that the new journal manager 2001B has been established for fork B. Transaction requests to fork B, and write propagation for materializing fork B, may both remain suspended in the state illustrated in FIG. 22, while transaction request processing as well as write propagation with respect to other forks such as fork A may remain active. In at least some implementations, after journal manager 2001B has been set up, the configuration of write applier 2033B may be modified (e.g., at the request of the forking coordinator 2094), such that write applier 2033B changes the source from which committed writes directed to fork B are to be read.

Figure 23:
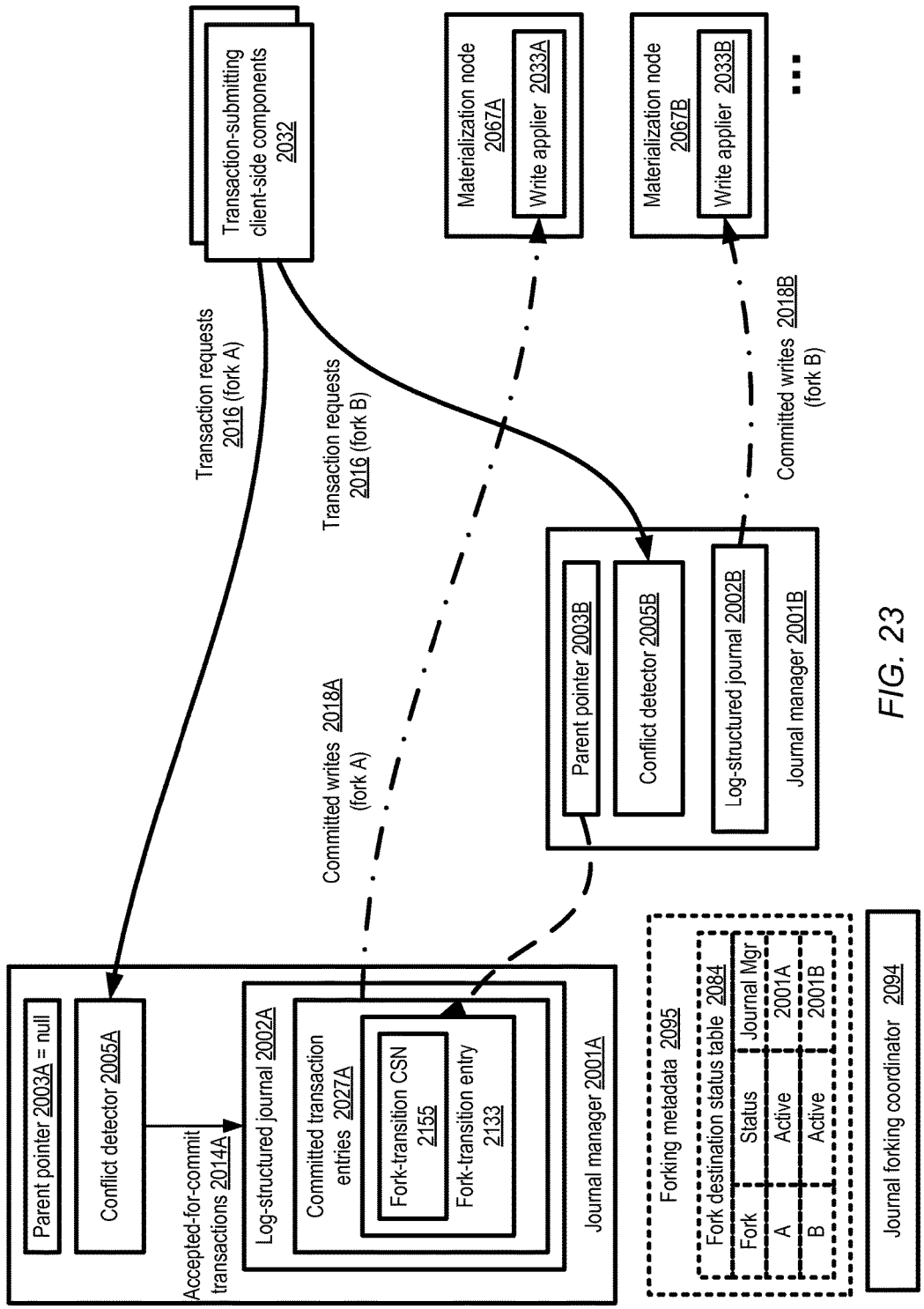

In the scenario shown in FIG. 23, the forking coordinator 2094 has completed the initial configuration of journal 2002B and journal manager 2001B has become operational. The status of fork B in metadata 2094 has been changed to "active" by the forking coordinator, indicating that transaction processing (e.g., including commit analysis as well as write propagation) is to be resumed. Based on the metadata 2094, transaction submitters such as client-side components 2032 may now transmit new transaction requests 2016B directed to fork B to journal manager 2001B. Write applier 2033B may start propagating writes 2018B from journal 2002B to materialization node 2067B. Transaction requests 2016A directed to fork A may flow as before to journal manager 2001A, and committed writes 2018A may continue to be propagated from parent journal 2002B to materialization node 2067A. In at least some implementations, the duration for which transaction processing associated with fork B is suspended may be relatively short. In one implementation, transaction requests directed to fork B may be queued while processing of fork B is suspended, and may be resumed when the status of fork B is set to active—e.g., the journal manager 2001A may queue up any fork B requests received during the suspension period and send them to journal manager 2001B when journal manager 2001B has been activated. In at least one embodiment, the transaction submitters may be responsible for selecting the correct journal manager to which a given transaction is to be submitted. If, for example, journal manager 2001A receives a new transaction request directed to fork A after journal manager 2001B has been brought online and the metadata 2094 has been updated to indicate that journal manager 2001B is active, the new transaction request may be rejected. In at least one embodiment, the forking metadata 2094 may be included in a journal schema which is accessible to client-side components and/or to materialization node components such as write appliers 2033. In one embodiment, forked journals may be merged under certain conditions. For example, based on various internally-generated merging criteria or on client requests, a forking coordinator may orchestrate the logical inverse of the operations illustrated in FIG. 20-23 such that transaction processing which was previously distributed among journal managers 2001A and 2001B may be consolidated at one of the two journal managers (e.g., either at 2001A or 2001B).

Figure 24:
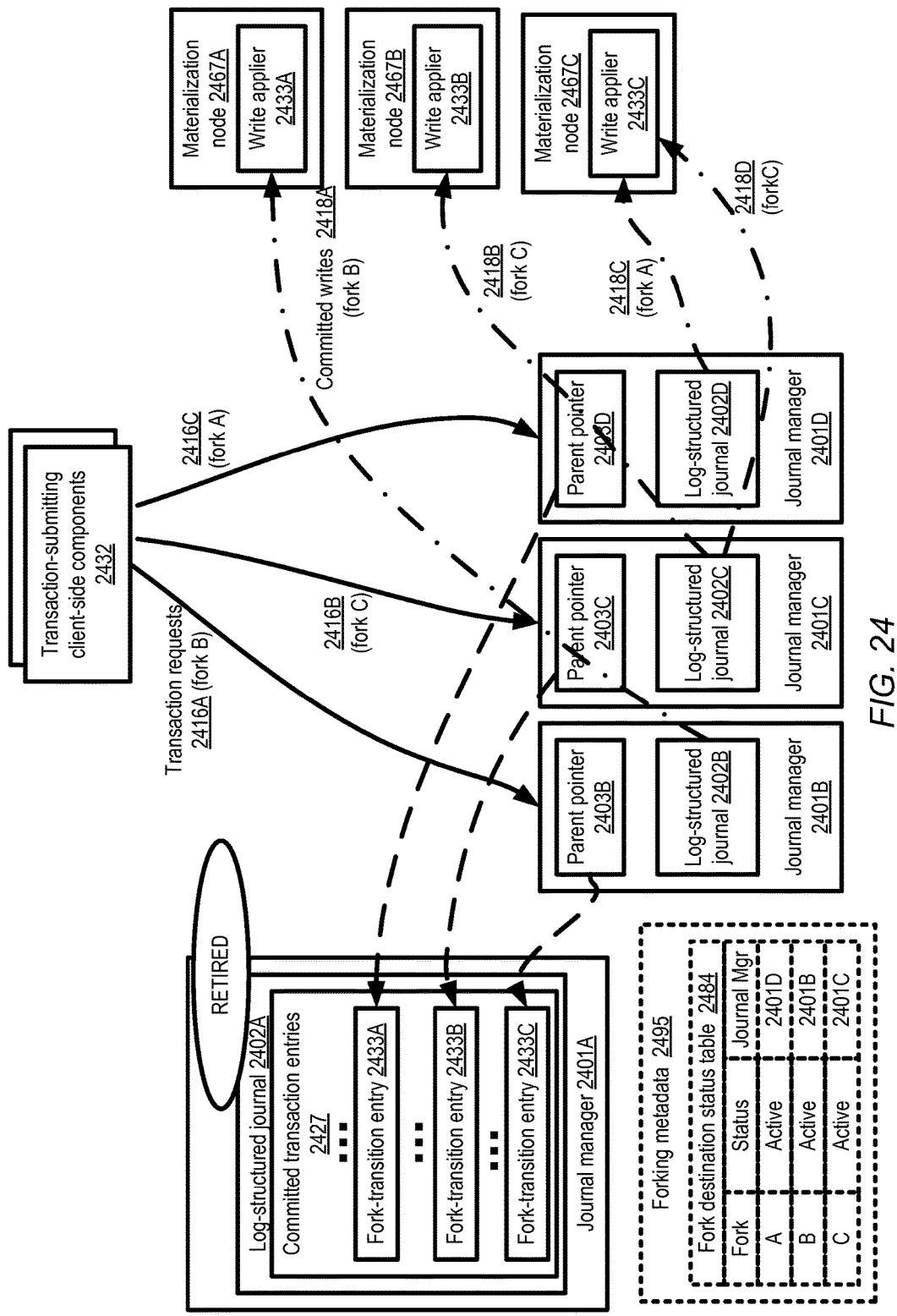
FIG. 24 illustrates an example system environment in which a parent journal may be retired from a multi-data-store database after a set of forked journals are created, according to at least some embodiments.

Over time, several new child journals may be forked from a given parent journal, each associated with a respective subset or portion of the data which was originally being handled by the parent journal. The role of the parent journal may thus get smaller over time, with smaller and smaller fractions of the transaction processing workload being handled at the parent journal as new child journals come online. Eventually, in some cases, it may become possible to retire or shut down the parent journal, e.g., after enough child journals to collectively handle transactions for the entire database have been configured (and new transactions no longer have to be checked for conflicts with old committed transaction entries of the parent journal). FIG. 24 illustrates an example scenario in which a parent journal may be retired from a multi-data-store database after a set of forked journals are created, according to at least some embodiments. In the depicted example, the contents of the multi-data-store database have been logically divided into three subsets (forks A, B and C), such that any transaction request generated by client-side components 2432 can be mapped to at least one of the three subsets.

Prior to the forking of child journals, commit processing for all transactions was managed by journal manager 2401A, and committed transaction entries directed to any of the data were appended to parent journal 2402A. Respective fork-transition entries 2433A, 2433B and 2433C of parent journal indicate that child journals 2402D, 2402C and 2402B have been forked in that order, with respective parent pointers 2403D, 2403C and 2403B indicating the fork-transition entries. At the point of time corresponding to FIG. 24, the establishment and configuration operations for the three child journals have been completed, as indicated by the "active" status entries in fork destination table 2484 of metadata 2494. Based on the entries of table 2484, when a new transaction request is prepared by a client-side component 2432, one of the three child journal managers 2401B, 2401C or 2401D may be selected as the target to which the transaction request is transmitted. Transaction requests 2416C directed towards fork A may be sent to journal manager 2401D, transaction requests 2416A for fork B may be sent to journal manager 2401B, and transaction requests 2416B with respect to fork C may be sent to journal manager 2401C in the depicted example.

The write appliers 2433A-2433C of materialization nodes 2467A-2467C respectively may read committed writes from any combination of the three child journals in the depicted embodiment, depending on the manner in which the database is to be materialized. As shown, for example, committed writes 2418A of fork B may be materialized at node 2467A, committed writes 2418B and 2418D corresponding to fork C may be materialized at node 2467B, while committed writes 2418C of fork A may be materialized at node 2467B in the depicted embodiment. In at least some embodiments, as in the example shown in FIG. 24, there may not be a 1:1 mapping between forks and materialization nodes— e.g., a given node may store data belonging to one or more of the forks. In one embodiment in which a given transaction's read set and/or write set may span multiple forks, or may have conflict check delimiters such that not all the committed writes that have to be examined for a commit analysis of a given transaction are available in a single journal, one journal manager 2401 may be able to inspect entries of other journals (either a parent journal, or another child journal) to complete commit processing. For example, if necessary, journal manager 2401B may inspect committed transaction entries of journals 2402A, 2402C ore 2402D in addition to its own journal 2401B. In one embodiment, transaction requests whose commit analysis requires access to multiple child journals may be rejected.

The parent journal 2402A may be taken offline or retired in the depicted embodiment, e.g., after a sufficient amount of time has expired such that no new transactions require access to the committed transaction entries 2427 of journal 2402A. In some implementations, for example, after child journals that collectively can handle new transactions directed to the entire database have been established, the number of transactions per unit time whose commit processing involves examination of committed writes from journal 2402A may be tracked. If no entries from journal 2402A have to be read for conflict detection for some threshold duration T1, journal 2402A may be retired (e.g., by shutting down the journal manager 2401A, setting the parent pointers of the child journal to null, archiving the transaction entries of journal 2402A in a less expensive repository, or the like). In other embodiments, parent journals may not necessarily be taken offline or retired, e.g., even when the transaction commit processing and storage workload of the entire database has been passed on to a set of child journals similar to those shown in FIG. 24. In embodiments in which journal merges are supported, any combination of child journals 2402B, 2402C and 2402D may be merged if the forking coordinator determines that merging criteria have been met.

Figure 25:
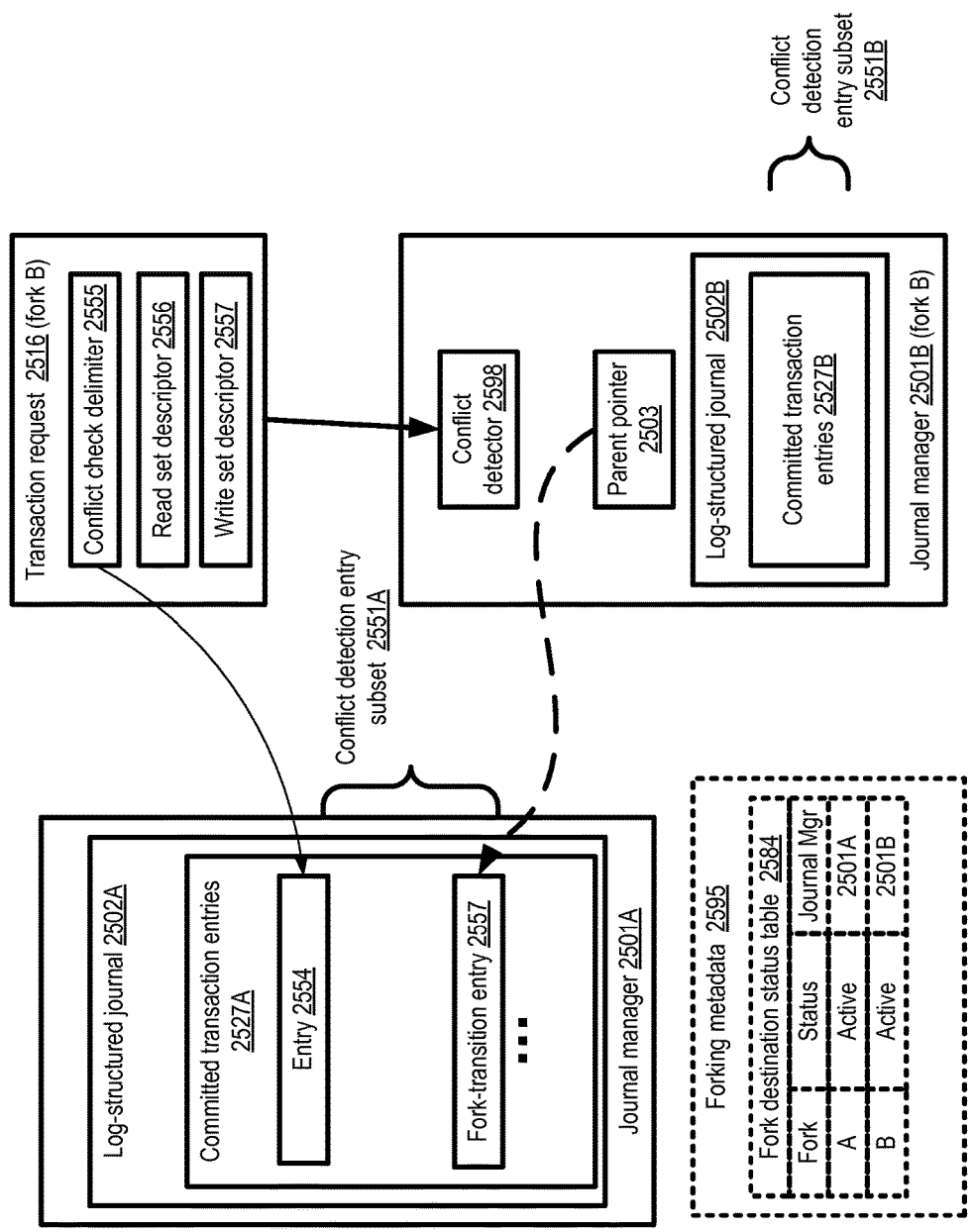
FIG. 25 illustrates an example of a conflict detection operation in which entries from a parent journal and a forked journal may be examined, according to at least some embodiments.

FIG. 25 illustrates an example of a conflict detection operation in which entries from a parent journal and a forked journal may be examined, according to at least some embodiments. Forking destination status table 2584 of metadata 2595 indicates that transactions associated with fork A are to be directed to journal manager 2501A associated with parent journal 2502A, while transactions associated with fork B are to be directed to journal manager 2501B of child journal 2502B. Transaction request 2516, directed to fork B, is received at conflict detector 2598 of journal manager 2501B in accordance with the forking metadata 2594. Conflict check delimiter 2555 of the transaction request 2516 points to a sequence number of entry 2554 in parent journal 2502A, i.e., the transaction's reads (indicated in read set descriptor 2556) may have been performed before journal 2502B was forked from journal 2502A.

In order to check for read-write conflicts with respect to the read set descriptor 2556, the journal manager (2501B in this example) which receives the transaction request may have to examine the committed writes of all the transaction entries for fork B starting with sequence numbers higher than the conflict check delimiter 2555, and ending at the most recently committed entry with respect to fork B in journal 2502B. Thus, one or more entries from parent journal 2502A (referred to as conflict detection entry subset 2551A), and one or more entries from journal 2502B (referred to as conflict detection entry subset 2551B) may be inspected for read-write conflict detection in the depicted example scenario. In order to identify the subset 2551A, in at least one embodiment the journal manager 2501B may follow the parent pointer 2503, which indicates the location of the fork-transition entry 2557. Writes directed to fork B in entries between the conflict check delimiter entry 2555 and the fork-transition entry 2557 may be included in the subset 2551A in the depicted example.

In some embodiments, a different approach than that shown in FIG. 25 may be taken with respect to proposed transactions whose commit analysis is performed at the journal manager of a child journal after the forking transition. In this alternative approach, transaction requests for which conflict detection would require accessing both a parent journal (e.g., journal 2502A of FIG. 25) and a forked or child journal (e.g., journal 2502B) may be rejected. In one implementation, a committed transaction entry representing a journal schema modification may be inserted as the first entry (or one of the first few entries) of the forked journal 2502B (e.g., at the request of the forking coordinator or as part of the initialization of the forked journal). The journal schema modification entry may be assigned a lower sequence number than any other entry in the forked journal, for example. In addition, a rule that prohibits the acceptance of transaction requests whose preparation overlaps with a journal schema change may be enforced. Such a rule may be employed in various embodiments because inconsistencies may result if a journal schema (which, as discussed earlier, defines the data-store-independent language used for transaction requests, the acceptable data types of various objects referenced in transaction requests, etc.) is modified after a portion of the transaction request was prepared, and before the commit decision corresponding to the transaction request is made. After the journal schema modification entry has been added to the forked journal, when a new transaction request is received at the forked journal's manager (e.g., 2501B), the conflict check delimiter sequence number of the new transaction request may be examined. If the conflict check delimiter sequence number is smaller than the sequence number of the journal schema modification entry (indicating that a pre-fork-transition state of the database was observed during transaction request preparation), the rule prohibiting overlapping of transaction preparation with journal schema changes would result in the rejection of the new transaction request.

Figure 26:
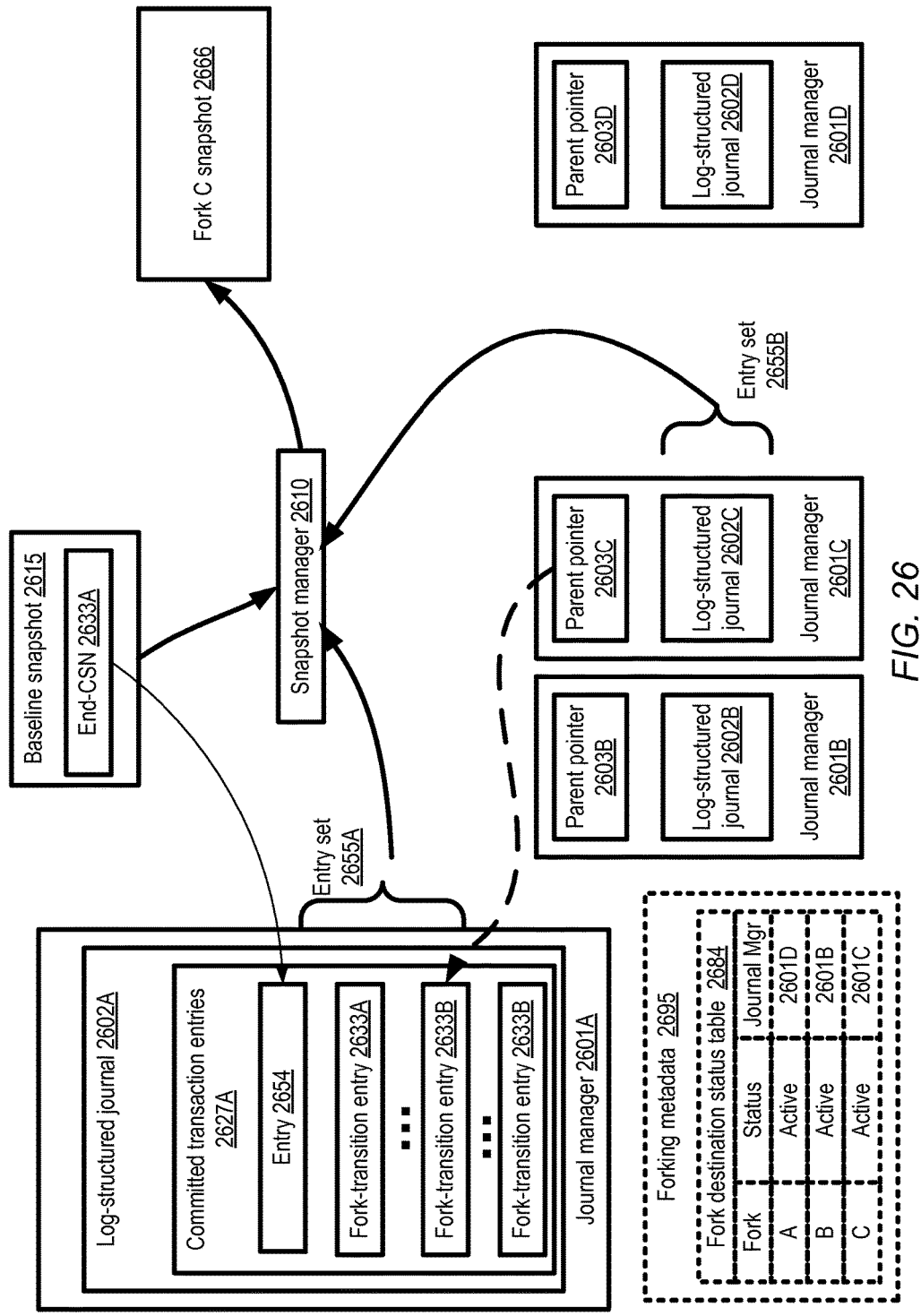
FIG. 26 illustrates an example of a snapshot creation operation in which entries from a parent journal and a forked journal may be examined, according to at least some embodiments.

As described above (e.g., in the context of FIG. 13-FIG. 16), in some embodiments compact snapshots of journal entries of a multi-data-store storage system may be created, in which a sequence of state changes which may have been applied to a given portion of data may be condensed into one net change. The creation of compact snapshots may also sometimes require examination of entries from both parent and child journals. FIG. 26 illustrates an example of a snapshot creation operation in which entries from a parent journal and a forked journal may be examined, according to at least some embodiments. The forking metadata 2695 indicates that three child journals 2602B, 2602C and 2602D have been forked from parent journal 2602A. Journal manager 2601C of journal 2602C is responsible for managing new transaction requests directed at fork C of the database. A baseline snapshot 2615 with an end-CSN (ending commit sequence number) 2633A, corresponding to an entry 2654 with a lower sequence number than the fork-transition entry 2633B associated with forked journal 2602C, may be available as one of the inputs from which a new snapshot of fork C is to be created by snapshot manager 2610.

In order to generate the new snapshot of fork C, the snapshot manager 2610 may have to examine journal entries with writes directed to fork C after the baseline snapshot 2610 was created. In the example scenario shown in FIG. 26, some of these entries (entry set 2655A) may be present in parent journal 2602A, while the remainder (entry set 2655B) may be present in child journal 2602C. Snapshot manager 2610 may combine the contents of the baseline snapshot 2610 with the entries 2655A and 2655B to determine the net state changes for which entries formatted in the data-store-independent transaction language of the storage system are to be included within new post-forking-transition snapshot 2666 of fork C in the depicted embodiment. In some embodiments, depending for example on how much time has elapsed since a baseline snapshot was created, and on how many forking operations were performed during that time, a snapshot manager may have to examine entries in several different journals in a chain of parent-child journals. For example, if a journal J3 is forked from journal J2, and J2 was earlier forked from J1, entries from J1, J2 and J3 may have to be analyzed to generate a compact snapshot in some cases.

In some embodiments, a new snapshot may be generated from the parent journal when a child journal is forked (e.g., at the request of the forking coordinator, or in response to a determination by the snapshot manager that a child journal is being, or has just been, forked). Such a snapshot may incorporate all the state changes made up to and including the fork-transition entry (including changes to the forked subset of the database and/or other portions of the database). As a result of creating such a snapshot, the operations illustrated in FIG. 26, in which entries from the parent and the forked or child journal are processed to create a new post-forking-transition snapshot (similar to snapshot 2666), may not be required in some embodiments. Instead, the snapshot created at the time of the fork may be used as a baseline snapshot for any subsequent snapshots prepared for the forked subset of the data, so that entries of the parent journal do not have to be examined for generating the subsequent snapshots. In one embodiment, instead of creating a snapshot to accompany the fork, an index may be created, pointing to those committed transaction entries stored in the parent journal pertinent to the forked subset of the data. Such an index may be used to quickly look up any entries which have to be read from the parent journal (e.g., entry set 2655A of FIG. 26) when a post-forking-transition snapshot is created.

As discussed earlier, in various embodiments a journal schema may indicate a set of rules governing various aspects of the operations of a multi-data-store database (including the data-store-independent language used for transaction requests). In some embodiments, when a new journal is forked, it may initially use the same journal schema as its parent journal. However, over time, the child journal's schema may be changed (e.g., after approvals from all the materialization nodes associated with the child journal), and thus may diverge from the journal schema of the parent journal. In effect, in some cases forking may be considered one step towards the establishment of a new database, with a different set of rules than the set of rules in effect at the parent database. In other cases, the same journal schema may continue in effect indefinitely for the child journal as was used for the parent journal.

Figure 27:
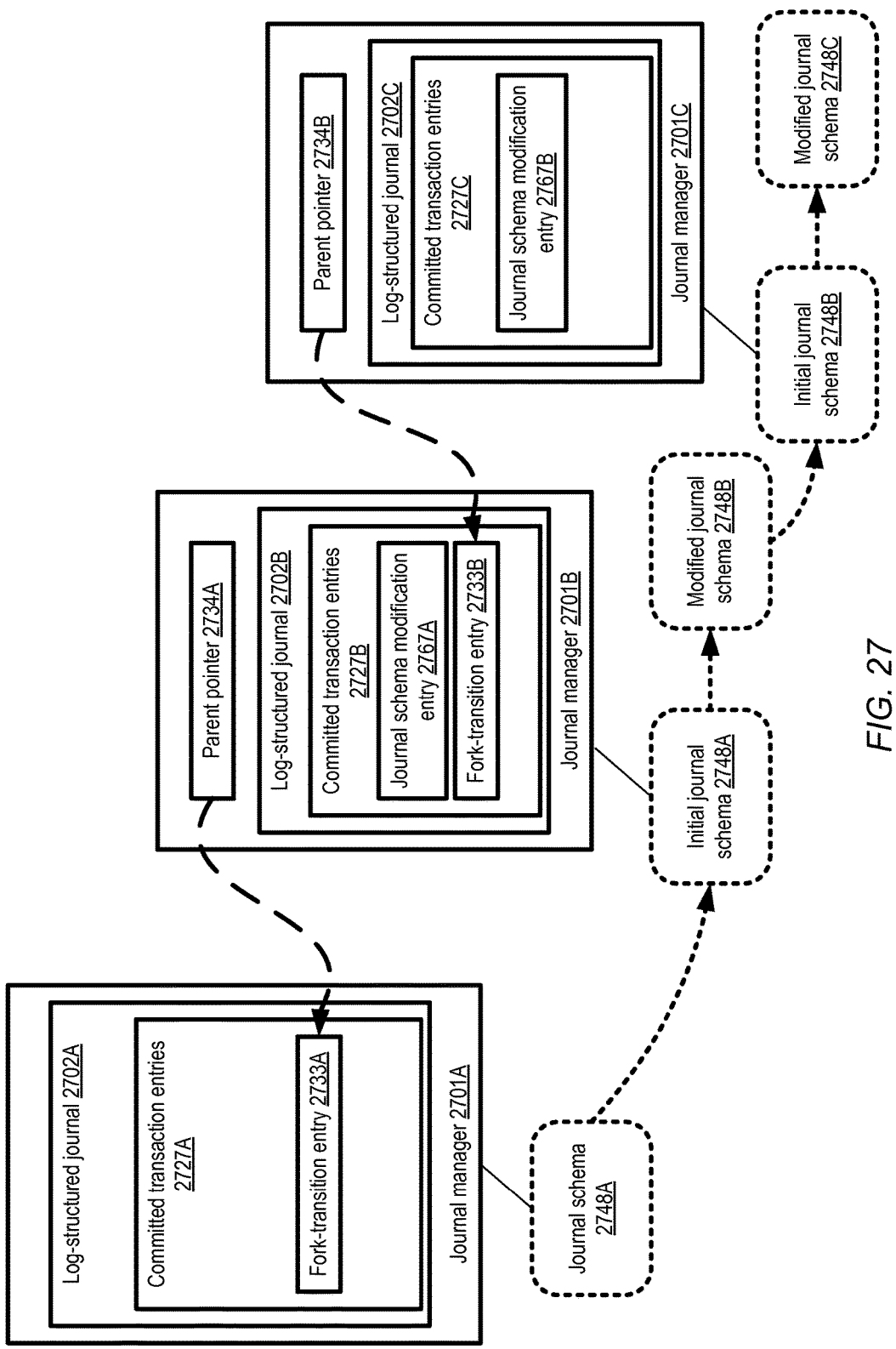
FIG. 27 illustrates an example of the evolution of journal schemas subsequent to journal forking events, according to at least some embodiments.

FIG. 27 illustrates an example of the evolution of journal schemas subsequent to journal forking events, according to at least some embodiments. In the depicted example, journal 2702B is forked from journal 2702A (as indicated by parent pointer 2734A to fork-transition entry 2733A). Journal 2702C is eventually forked from journal 2702B (as indicated by parent pointer 2734B to fork-transition entry 2733B). At the time that journal 2702B is forked from journal 2702A, journal schema 2748A is in effect at journal 2702A, so journal schema 2748A is also used as the initial journal schema of the child journal. At some point after the forking of journal 2702B, a committed transaction entry 2767A indicating a journal schema modification is appended to journal 2702B. As a result, modified journal schema 2748B takes effect at journal 2702B in the depicted embodiment. Journal schema 2748B, which happens to be in effect when child journal 2702C is forked, in turn is selected as the initial journal schema for child journal 2702C. After committed schema modification transaction entry 2767B is added to journal 2702C, modified journal schema 2748C comes into effect in the depicted embodiment. As shown, the journal schemas of child journals may eventually diverge from the journal schemas of the parent journals in at least some embodiments. In one embodiment, such journal schema divergence may not be allowed among the journals which have been established as result of one or more forks from a given parent journal. If and when a journal schema of a given parent journal is modified in such an embodiment, the changes may be propagated to the set of child journals which were forked from the parent, for example. Similarly, if and when a child journal's schema is modified, the changes may be propagated to its parent journal (and any other child journals of the parent journal).

Figure 28:
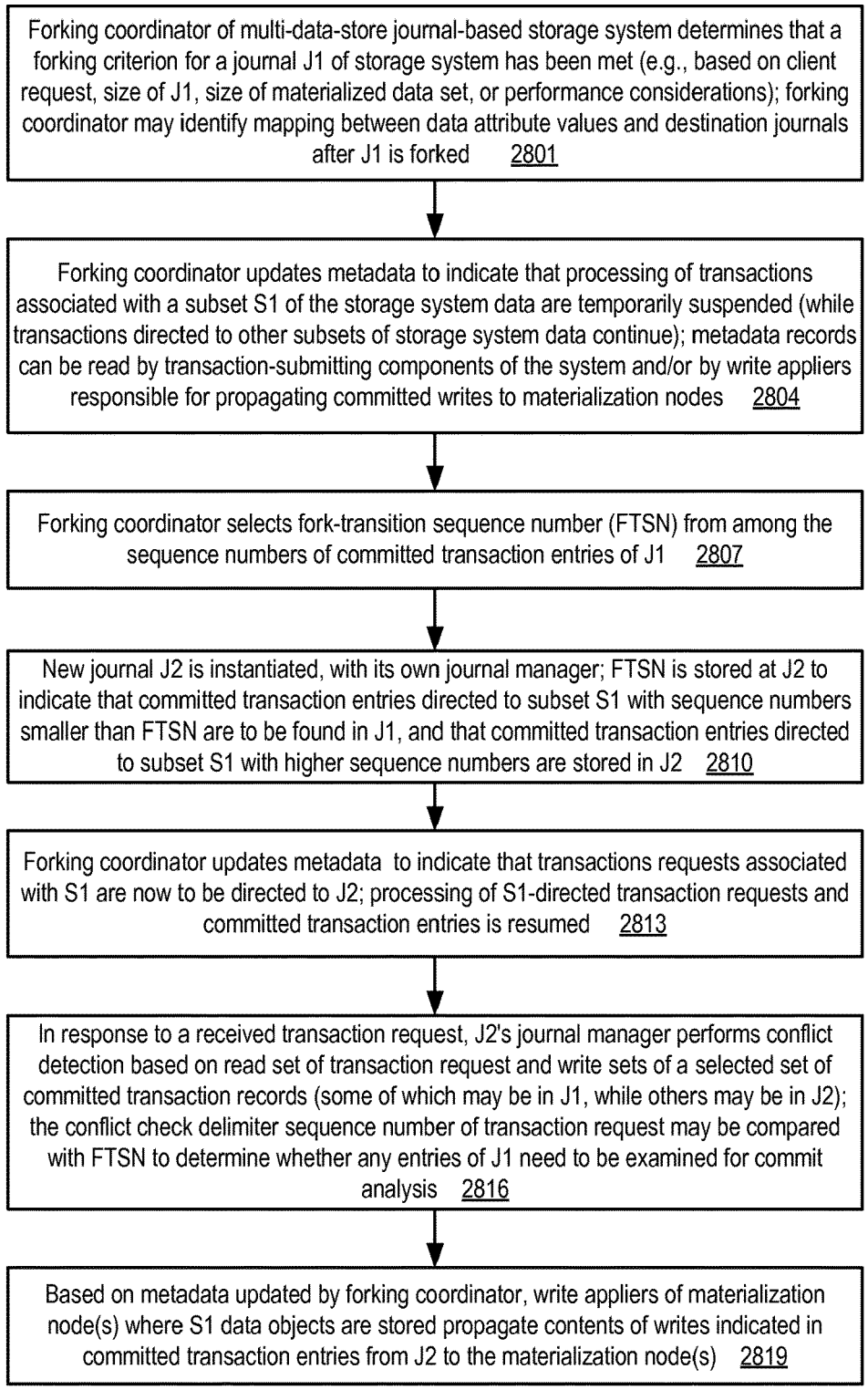
FIG. 28 is a flow diagram illustrating aspects of operations that may be performed by a journal forking coordinator of a multi-data-store database, according to at least some embodiments.

FIG. 28 is a flow diagram illustrating aspects of operations that may be performed by a journal forking coordinator of a multi-data-store database, according to at least some embodiments. As shown in element 2801, the forking coordinator may determine that a forking criterion for a journal J1 has been met. Such a determination may result from internal measurements or metrics (e.g., metrics indicating that the size of the journal J1 has exceeded a threshold, that the size of the materialized data of the database has exceeded a threshold, or that the response time or throughput associated with one or more journal-related operations has reached a threshold) of the database in some embodiments. In other embodiments the forking coordinator may receive a journal forking request from a client indicating that the forking criterion has been met. In at least some embodiments, the forking coordinator may identify the boundaries of the to-be-forked subsets of the database: e.g., mappings between data attribute values and the destination journals to which transactions associated with the data attribute values may be identified. For example, if a given attribute Attr1 of a table can take on integer values between 1 and 50, the forking coordinator may determine that transactions involving rows with Attr1 values less than 25 are to be transmitted to the parent journal, while transactions involving rows with Attr1 values greater than or equal to 25 are to be transmitted to the yet-to-be created child journal. The portion of the database content for which transaction processing is to be handled (after the fork) using a child journal may be referred to as forked subset S1 of the database. In some embodiments, a client may indicate fork boundaries programmatically: e.g., a fork request submitted by the client may specify the attribute values or other criteria to be used to identify the subset of data for which the new journal being forked is to be used. As mentioned earlier, in at least one embodiment, a partitioning policy for data object materialization may be defined at a storage system in which journal forking is also supported. In such an embodiment, the fork boundaries may or may not coincide with the partition boundaries—e.g., forked journals may be responsible for different subsets of the data than materialization nodes, and/or the number of journals in use may differ from the number of materialization partitions.

In the depicted embodiment, a set of forking-related metadata records which can be accessed by client-side components and/or by journal entry consumers such as the write appliers of various materialization nodes may be maintained by the forking coordinator. In some implementations, such metadata may be stored in a repository other than the journal, e.g., in a set of control plane tables or data structures of the database. In at least one embodiment, the metadata may be stored in a special entry of the parent journal J1. The forking coordinator may update the metadata to indicate that processing of transactions associated with the forked subset S1 of the database is temporarily suspended (element 2804). As a result of examining the forking metadata, the transaction-submitting components of the system and/or the write appliers may defer or delay one or more of their operations associated with forked subset S1. Transaction request submissions with respect to other subsets of the database may continue uninterrupted in the depicted embodiment, and the propagation of committed writes directed to subsets of the database other than S1 may also continue. In some embodiments, if a new transaction request with reads or writes directed to S1 is received at J1's journal manager after the forking-related metadata has been updated to indicate the suspension of S1-related processing, J1's journal manager may reject the transaction. In other embodiments, such transaction requests may be placed in a queue and transmitted later to the child journal's manager (after the child journal has been brought online).

The forking coordinator may select a fork-transition sequence number (FTSN) from among the sequence numbers of J1 entries in the depicted embodiment (element 2807). In some embodiments, the FTSN may be selected such that J1 does not contain any entries directed to the forked subset S1 of the data with higher commit sequence numbers than FTSN. For example, if, prior to the suspension of transaction-processing operations associated with S1, the highest commit sequence number of any J1 entry directed to subset S1 was 10000, FTSN may be set to 10000 in one implementation. As indicated by the name, the FTSN may serve as a transition-indicating boundary within journal J1, with no S1-related committed transaction entries with sequence numbers greater than FTSN being stored within J1, and all S1-related committed transaction entries with sequence numbers greater than FTSN expected to be stored in the child journal of J1.

The forking coordinator may initiate the establishment of a new journal J2, with its own journal manager components separate from J1's journal manager element 2810). For example, in implementations in which a replicated DAG of the kind illustrated in FIG. 12 is used, various DAG nodes may be instantiated, together with a DAG configuration manager. Network configuration operations (e.g., the assignment of IP addresses, and the creation of routing table entries) for the new journal to be accessed from client-side components and write appliers may be performed in the depicted embodiment. The FTSN may be stored, e.g., as part of a parent pointer entry, in the new journal J2 or in metadata associated with the new journal J2 in some embodiments. The FTSN may indicate that journal entries associated with S1 with higher sequence numbers (than the FTSN) are to be added to J2, while journal entries with lower sequence numbers than FTSN are to be found in J1.

After the new journal J2 has been brought online, the forking coordinator may update the forking metadata to indicate that transaction processing with respect to forked subset S1 can be resumed, with J2 as the destination journal (element 2813). Client-side components which had suspended their transaction submissions may start transmitting new transaction requests directed to S1 to J2's journal manager based on the updates to the forking metadata. In response to such a transaction request, J2's journal manager may perform conflict detection using techniques similar to those discussed above (element 2816). If the proposed transaction's conflict check delimiter corresponds to a sequence number smaller than the FSTN, some of the committed transaction entries whose write sets are examined for conflicts with the proposed transaction's read set may be read from the parent journal J1. Write appliers of materialization nodes at which S1 data is to be stored may start scanning the contents of J2 based on the updated forking metadata, and propagate the writes from J2 to the materialization nodes (element 2819).

It is noted that in various embodiments, some of the operations shown in the flow diagrams of FIG. 17, FIG. 18 and FIG. 28 may be implemented in a different order than that shown in the figure, or may be performed in parallel rather than sequentially. Additionally, some of the operations shown in one or more of the flow diagrams may not be required in one or more implementations.

Use Cases

The techniques described above, of partitioning the content of a journal-based multi-data-store storage system such that different subsets of the data are materialized at respective nodes, and of forking child journals from a given journal as needed, may be useful in a variety of environments. Journal-based optimistic concurrency control techniques of the kind described herein may often be utilized for mission-critical applications with very high transaction rates. The total amount of data that has to be materialized per unit time in such environments may become too large to be processed by a write applier of a single materialization node, and/or the storage devices available at a given materialization node may become overloaded as the materialization workload increases. Furthermore, from both an application logic perspective and a performance perspective, it may sometimes make sense to distribute respective subsets of the data (e.g., with each subset corresponding to a sub-range of the primary key values of a table, or corresponding to a group of attributes of a table) among different materialization nodes. The types of horizontal and/or vertical partitioning algorithms described may help improve overall scalability with respect to the materialization workloads at large data stores. Over time, the journal of a multi-data-store storage system may also become extremely large, and a single journal manager may no longer be able to handle the offered transactions with the desired levels of responsiveness. The phased journal forking algorithm described may help to distribute the concurrency control-related workload of the system among multiple journal managers, thereby enabling higher transaction rates than may be supportable by a single journal manager. Furthermore, forking may also be useful to transition to a new set of transaction-processing rules for a selected subset of the data, e.g., with a different journal schema and/or a modified transaction language.

Illustrative Computer System

Figure 29:
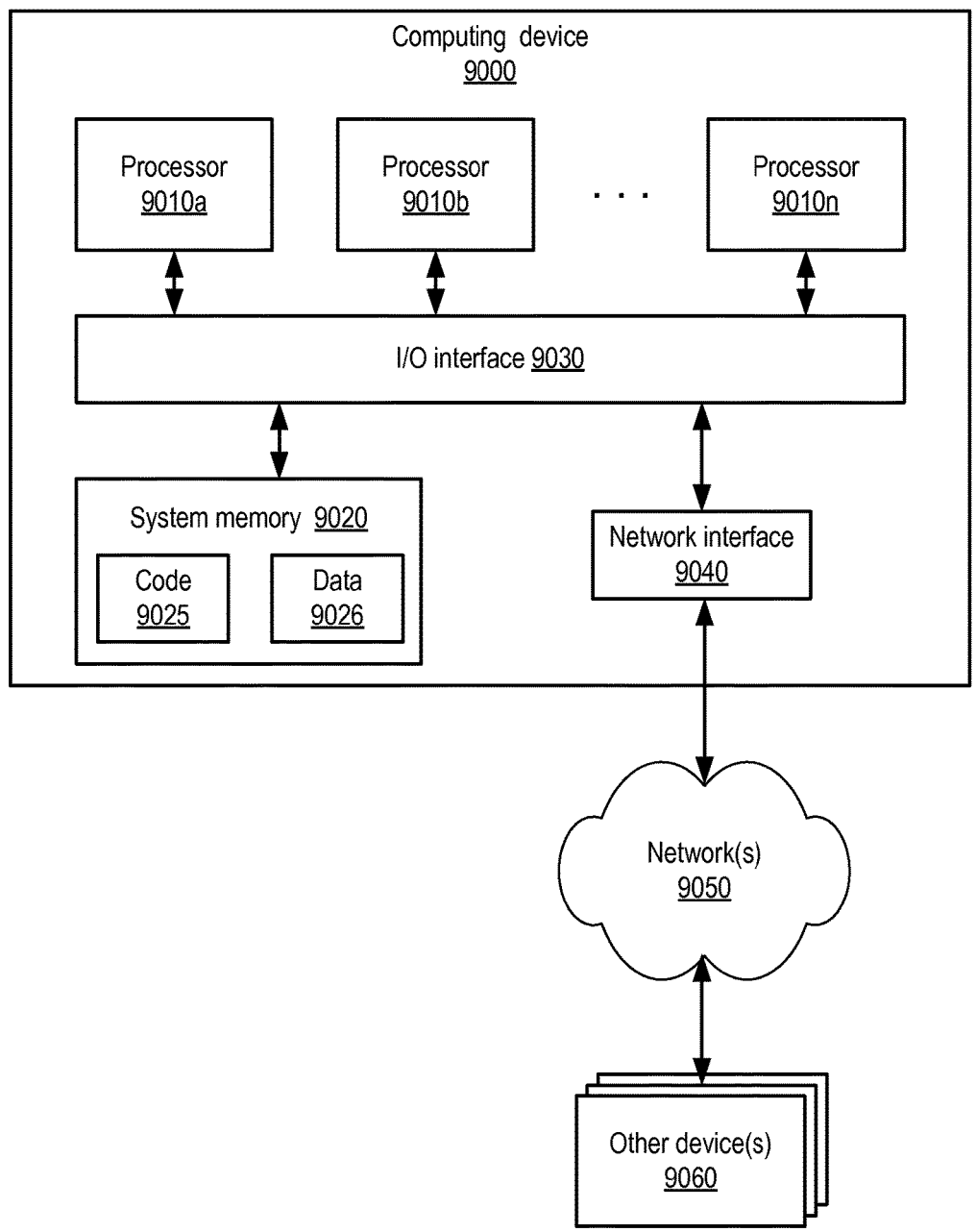
FIG. 29 is a block diagram illustrating an example computing device that may be used in at least some embodiments.

In at least some embodiments, a server that implements one or more of the techniques described above for transaction management, partitioning, and/or journal forking at a journal-based multi-data-store storage system (including for example the operations of journal managers, data store managers, client-side components, write appliers, scalability managers and/or forking coordinators) may include a general-purpose computer system that includes or is configured to access one or more computer-accessible media. FIG. 29 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 28, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 28 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 29 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
determining, by a forking coordinator implemented at one or more computing devices of a multi-data-store database, that a forking criterion has been met with respect to a first journal of the multi-data-store database, wherein the first journal includes a plurality of committed transaction entries indicating respective approved state changes of the multi-data-store database, and wherein individual ones of the committed transaction entries include respective sequence numbers indicative of an order in which corresponding commit decisions were made by a first journal manager implementing an optimistic concurrency control protocol;
storing, by the forking coordinator, one or more metadata records to indicate that processing of transaction requests comprising writes directed to a particular subset of the multi-data-store database is suspended, wherein the one or more metadata records are accessible to at least a client-side component authorized to submit transaction requests;
selecting, by the forking coordinator, a fork-transition sequence number corresponding to a particular committed transaction entry of the first journal;
instantiating, by the forking coordinator, a second journal, wherein the second journal indicates that committed transaction entries with sequence numbers smaller than the fork-transition sequence number are stored at the first journal;
updating, by the forking coordinator, the one or more metadata records to indicate that (a) transaction requests comprising writes directed to the particular subset are to be transmitted to a second journal manager of the second journal, and (b) processing of transaction requests comprising writes directed to the particular subset is to be resumed; and
appending, by the second journal manager, based at least in part on a result of a conflict detection operation corresponding to a new transaction request received from the client-side component after said updating, a new committed transaction entry to the second journal, wherein the new committed transaction entry indicates a write directed to the particular subset.

2. The method as recited in claim 1, further comprising:
receiving, by the forking coordinator via a programmatic interface, a fork request indicating that the forking criterion has been met.

3. The method as recited in claim 1, wherein the multi-data-store database comprises a plurality of records, wherein individual ones of the plurality of records comprise values of one or more attributes, and wherein the particular subset of the multi-data-store database comprises one or more records identified from the plurality of records based at least in part on a value of a particular attribute of the one or more attributes.

4. The method as recited in claim 1, further comprising:
determining, by a first write applier associated with the particular subset, based at least in part on examining the one or more metadata records, that processing of transaction requests comprising writes directed to the particular subset is suspended; and
deferring, by the first write applier, an examination of at least one committed transaction entry of the first journal.

5. The method as recited in claim 1, further comprising:
processing, by the first journal manager, a particular transaction request directed at a different subset of the multi-data-store database, wherein said processing is performed (a) after said storing, by the forking coordinator, the one or more metadata records to indicate that processing of transaction requests comprising writes directed to the particular subset is suspended and (b) before said updating, by the forking coordinator, the one or more metadata records to indicate that processing of transaction requests comprising writes directed to the particular subset is to be resumed; and
appending, to the first journal by the first journal manager, a committed transaction entry corresponding to the particular transaction request.

6. A system, comprising:
a forking coordinator implemented by one or more processors and memory at one or more computing devices associated with a multi-data-store database, wherein the forking coordinator is configured to:
determine that a forking criterion has been met with respect to a first journal of the multi-data-store database, wherein the first journal includes a plurality of committed transaction entries indicating respective approved state changes of the multi-data-store database, and wherein individual ones of the committed transaction entries include respective sequence numbers indicative of an order in which corresponding commit decisions were made by a first journal manager;
store an indication that processing of transaction requests comprising writes directed to a particular subset of the multi-data-store database is suspended;
instantiate a second journal to store committed transaction entries corresponding to the particular subset of the multi-data-store database, wherein metadata associated with the second journal indicates that committed transaction entries with sequence numbers smaller than a selected fork-transition sequence number are stored at the first journal; and store an indication that (a) transaction requests directed to the particular subset of the multi-data-store database are to be directed to a second journal manager of the second journal and (b) processing of transaction requests comprising writes directed to the particular subset of the multi-data-store database has been resumed.

7. The system as recited in claim 6, wherein the forking coordinator is further configured to:
implement a programmatic interface enabling clients of the multi-data-store database to submit a fork request, wherein a receipt of a particular fork request from a particular client via the programmatic interface indicates that the forking criterion has been met.

8. The system as recited in claim 6, wherein the multi-data-store database comprises a plurality of records, wherein individual ones of the plurality of records comprise values of one or more attributes, and wherein the particular subset of the multi-data-store database comprises one or more records selected from the plurality of records based at least in part on a value of a particular attribute of the one or more attributes.

9. The system as recited in claim 6, further comprising a client-side component of the multi-data-store database, wherein the client-side component is authorized to submit transaction requests to the multi-data-store database, wherein the client-side component is configured to:
examine metadata of the multi-data-store database to obtain the indication that processing of transaction requests comprising writes directed to the particular subset of the multi-data-store database is suspended; and
defer submitting at least one transaction request based on the metadata.

10. The system as recited in claim 6, further comprising a first write applier associated with the particular subset of the multi-data-store database, wherein the first write applier is configured to:
examine metadata of the multi-data-store database to obtain the indication that processing of transaction requests comprising writes directed to the particular subset of the multi-data-store database is suspended; and
defer an examination of at least one committed transaction entry of the first journal based on the metadata.

11. The system as recited in claim 6, wherein after the forking coordinator stores the indication that processing of transaction requests comprising writes directed to the particular subset of the multi-data-store database is suspended, and before the forking coordinator stores the indication that processing of transaction requests comprising writes directed to the particular subset of the multi-data-store database has been resumed, the first journal manager is configured to:
process a particular transaction request directed at a different subset of the multi-data-store database; and
append, to the first journal, a committed transaction entry corresponding to the particular transaction request.

12. The system as recited in claim 6, wherein the second journal manager is configured to:
examine, to perform conflict detection for a particular transaction request in accordance with an optimistic concurrency control protocol, at least one committed transaction entry of the first journal, and at least one committed transaction entry of the second journal.

13. The system as recited in claim 6, wherein after the forking coordinator stores the indication that processing of transaction requests comprising writes directed to the particular subset of the multi-data-store database is suspended, the first journal manager is configured to:
in response to receiving a particular transaction request directed to the particular subset of the multi-data-store database, reject the particular transaction request.

14. The system as recited in claim 6, wherein at least a first subset of the committed transaction entries of the first journal and a second collection of the committed transaction entries of the second journal are formatted in accordance with a data-store-independent transaction language indicated in a particular version of a journal schema, further comprising a snapshot manager implemented at one or more computing devices associated with the multi-data-store database, wherein the snapshot manager is configured to:
receive a request to generate a compact snapshot of at least the particular subset of the multi-data-store database, wherein the compact snapshot is to include a plurality of entries formatted in the data-store independent transaction language; and
examine at least one committed transaction entry of the first journal, and at least one committed transaction entry of the second journal, to generate the compact snapshot.

15. The system recited in claim 6, wherein at least a first subset of the committed transaction entries of the first journal and a second subset of the committed transaction entries of the second journal are formatted in accordance with a data-store-independent transaction language indicated in a particular version of a journal schema, further comprising a snapshot manager implemented at one or more computing devices associated with the multi-data-store database, wherein the snapshot manager is configured to:
generate, in response to an indication that the second journal has been instantiated, a particular compact snapshot representing state changes indicated in committed transaction entries with sequence numbers no greater than the selected fork-transition sequence number, wherein the particular compact snapshot comprises a plurality of entries formatted in the data-store independent transaction language; and
prepare, based at least in part on an analysis of (a) the particular compact snapshot and (b) one or more committed transaction entries of the second journal, a different compact snapshot corresponding to the particular subset of the multi-data-store database.

16. The system as recited in claim 6, wherein the second journal manager is configured to:
insert, into the second journal, a first committed transaction entry indicative of a modification of a journal schema of the multi-data-store database, wherein the journal schema indicates a data-store-independent transaction language used for transaction requests, wherein the first committed transaction entry includes a particular sequence number, and wherein the second journal does not include a committed transaction entry with a sequence number smaller than the particular sequence number; and
determine, in response to receiving a particular transaction request, a first sequence number indicating a state of the multi-data-store database observed by a client-side component to prepare the particular transaction request; and
reject the particular transaction request based at least in part on detecting that the first sequence number is smaller than the particular sequence number.

17. The system as recited in claim 6, wherein at least a first subset of the committed transaction entries of the first journal are formatted in accordance with a first version of a journal schema, wherein at least a first subset of the committed transaction entries of the second journal are formatted in accordance with the first version of the journal schema, wherein the second journal manager is configured to:
- append, to the second journal, a journal schema modification entry indicating a second version of the journal schema to be used to prepare transaction requests directed to the particular subset of the multi-data-store database, wherein a corresponding journal schema modification entry is not appended by the first journal manager to the first journal.

18. A non-transitory computer-accessible storage medium storing program instructions that when executed on one or more processors implement one or more control plane components of a multi-data-store database, wherein the one or more control plane components are configured to:
- determine that a forking criterion has been met with respect to a first journal of the multi-data-store database, wherein the first journal includes a plurality of committed transaction entries indicating respective approved state changes of the multi-data-store database, and wherein individual ones of the committed transaction entries include respective sequence numbers indicative of an order in which corresponding commit decisions were made by a first journal manager;
- store an indication that processing of transaction requests comprising writes directed to a particular subset of the multi-data-store database is suspended;
- instantiate a second journal to store committed transaction entries corresponding to the particular subset of the multi-data-store database, wherein metadata associated with the second journal indicates that committed transaction entries with sequence numbers smaller than a selected fork-transition sequence number are stored at the first journal; and
- store an indication that (a) transaction requests directed to the particular subset of the multi-data-store database are to be directed to a second journal manager of the second journal and (b) processing of transaction requests comprising writes directed to the particular subset of the multi-data-store database has been resumed.

19. The non-transitory computer-accessible storage medium as recited in claim 18, wherein the one or more control plane components are configured to:
- implement a programmatic interface enabling submission of fork requests, wherein a receipt of a particular fork request from a particular client via the programmatic interface indicates that the forking criterion has been met.

20. The non-transitory computer-accessible storage medium as recited in claim 19, wherein the fork request indicates the particular subset of the multi-data-store database.

21. The non-transitory computer-accessible storage medium as recited in claim 18, wherein to determine that the forking criterion has been met, the one or more control plane components are configured to examine one or more of (a) a performance metric of the first journal, or (b) a size metric of the first journal.

22. The non-transitory computer-accessible storage medium as recited in claim 18, wherein the one or more control plane components are configured to:
- after instantiating a third journal for processing transaction requests associated with the portion of the multi-data-store database which is not included in the particular subset, disable the first journal manager.

* * * * *